United States Patent
Rivers et al.

(10) Patent No.: US 10,456,883 B2
(45) Date of Patent: Oct. 29, 2019

(54) SYSTEMS, METHODS AND APPARATUS FOR GUIDED TOOLS

(71) Applicant: SHAPER TOOLS, INC., San Francisco, CA (US)

(72) Inventors: Alec Rothmyer Rivers, Oakland, CA (US); Ilan Ellison Moyer, Belmont, MA (US); Matthew Wyatt Martin, Fairfax, CA (US); Christian Reed, Chelsea, MA (US)

(73) Assignee: SHAPER TOOLS, INC., San Francisco, CA (US)

( * ) Notice: Subject to any disclaimer, the term of this patent is extended or adjusted under 35 U.S.C. 154(b) by 0 days.

(21) Appl. No.: 15/573,465

(22) PCT Filed: May 12, 2016

(86) PCT No.: PCT/US2016/032224
§ 371 (c)(1),
(2) Date: Nov. 11, 2017

(87) PCT Pub. No.: WO2016/183390
PCT Pub. Date: Nov. 17, 2016

(65) Prior Publication Data
US 2018/0126507 A1    May 10, 2018

Related U.S. Application Data

(60) Provisional application No. 62/161,179, filed on May 13, 2015.

(51) Int. Cl.
*B23Q 15/22* (2006.01)
*B23Q 3/16* (2006.01)
(Continued)

(52) U.S. Cl.
CPC .............. *B23Q 15/22* (2013.01); *B23B 49/00* (2013.01); *B23Q 3/16* (2013.01); *B23Q 11/005* (2013.01);
(Continued)

(58) Field of Classification Search
CPC .. B23Q 15/22; B23Q 17/2409; B23Q 11/006; B23Q 11/005; B23Q 11/0046;
(Continued)

(56) References Cited

U.S. PATENT DOCUMENTS 4,199,814 A    4/1980 Johnson
4,326,824 A    4/1982 Lasermann
(Continued)

FOREIGN PATENT DOCUMENTS

CN    101376194 B    2/2011
DE       3942901       6/1991
(Continued)

OTHER PUBLICATIONS

PCT/US2016/032224 International Preliminary Report on Patentability Chapter 1, dated Nov. 14, 2017, 8 pages.
(Continued)

*Primary Examiner* — Nathan L Laughlin
(74) *Attorney, Agent, or Firm* — Almanac IP Advisors LLP

(57) ABSTRACT

The present disclosure is directed to calibrating position detection for a tool. The tool can use a sensor to detect a first value of a parameter. The tool can use a motor to extend the working member of the tool towards a working surface. The tool can include a base. The tool can detect, with the working member in contact with the working service, a second value of the parameter. The tool can determine a z-axis position of the working member relative to the working surface.

20 Claims, 30 Drawing Sheets

(51) Int. Cl.
   *B23Q 17/22* (2006.01)
   *G05B 19/404* (2006.01)
   *G05B 19/402* (2006.01)
   *B23Q 11/00* (2006.01)
   *B23Q 17/24* (2006.01)
   *B23B 49/00* (2006.01)

(52) U.S. Cl.
   CPC ........ *B23Q 11/006* (2013.01); *B23Q 11/0046* (2013.01); *B23Q 17/2233* (2013.01); *B23Q 17/2409* (2013.01); *B23Q 17/2428* (2013.01); *G05B 19/402* (2013.01); *G05B 19/404* (2013.01); *G05B 2219/37355* (2013.01); *G05B 2219/37404* (2013.01); *G05B 2219/37405* (2013.01); *G05B 2219/37613* (2013.01); *G05B 2219/45127* (2013.01); *G05B 2219/45229* (2013.01); *Y10T 409/306608* (2015.01)

(58) Field of Classification Search
   CPC .. B23Q 17/2428; B23Q 17/2233; B23Q 3/16; B23B 49/00; G05B 19/402; G05B 19/404
   See application file for complete search history.

(56) References Cited

U.S. PATENT DOCUMENTS

| | | |
|---|---|---|
| 4,552,493 A | 11/1985 | Schultshick |
| 4,598,380 A | 7/1986 | Holmes |
| 4,678,976 A | 7/1987 | Inoue |
| 4,734,845 A | 3/1988 | Kawamura |
| 4,752,160 A | 6/1988 | Murray |
| 4,788,481 A | 11/1988 | Niwa |
| 4,789,931 A | 12/1988 | Kuragano |
| 4,907,169 A | 3/1990 | Lovoi |
| 4,912,625 A | 3/1990 | Glatfelter |
| 4,949,270 A | 8/1990 | Shima |
| 4,965,499 A | 10/1990 | Taft |
| 5,010,652 A | 4/1991 | Miletich |
| 5,095,788 A | 3/1992 | Matoni |
| 5,139,376 A | 8/1992 | Pumphrey |
| 5,150,306 A | 9/1992 | Kawamura |
| 5,172,326 A | 12/1992 | Campbell |
| 5,175,688 A | 12/1992 | Sasaki |
| 5,243,665 A | 9/1993 | Maney |
| 5,255,199 A | 10/1993 | Barkman |
| 5,333,111 A | 7/1994 | Chaiken |
| 5,406,494 A | 4/1995 | Schuett |
| 5,436,027 A | 7/1995 | Offer |
| 5,448,146 A | 9/1995 | Erlbacher |
| 5,465,215 A | 11/1995 | Strickland |
| 5,467,003 A | 11/1995 | Kosaka |
| 5,506,682 A | 4/1996 | Pryor |
| 5,575,099 A | 11/1996 | Strobel |
| 5,602,453 A | 2/1997 | Sekikawa |
| 5,686,960 A | 11/1997 | Sussman |
| 5,777,880 A | 7/1998 | Bowen |
| 5,780,805 A | 7/1998 | Duncan |
| 5,799,135 A | 8/1998 | Terawaki |
| 5,807,449 A | 9/1998 | Hooker |
| 5,815,683 A | 9/1998 | Vogler |
| 5,831,407 A | 11/1998 | Ouchi |
| 5,831,857 A | 11/1998 | Clarino |
| 5,857,812 A | 1/1999 | Stahl |
| 5,886,319 A | 3/1999 | Preston |
| 5,959,425 A | 9/1999 | Bieman |
| 5,963,451 A | 10/1999 | Seki |
| 6,019,554 A | 2/2000 | Hong |
| 6,044,308 A | 3/2000 | Huissoon |
| 6,073,058 A | 6/2000 | Cossen |
| 6,075,223 A | 6/2000 | Harrison |
| 6,107,768 A | 8/2000 | Ouchi |
| 6,161,055 A | 12/2000 | Pryor |
| 6,167,328 A | 12/2000 | Takaoka |
| 6,269,283 B1 | 7/2001 | Shinozaki |
| 6,292,715 B1 | 9/2001 | Rongo |
| 6,304,050 B1 | 10/2001 | Skaar |
| 6,311,098 B1 | 10/2001 | Higasayama |
| 6,330,492 B1 | 12/2001 | Wisniewski |
| 6,397,124 B1 | 5/2002 | Lan |
| 6,430,472 B1 | 8/2002 | Boillot |
| 6,447,223 B1 | 9/2002 | Farah |
| 6,456,896 B1 | 9/2002 | Ito |
| 6,474,378 B1 | 11/2002 | Ryan |
| 6,535,788 B1 | 3/2003 | Yoshida |
| 6,536,536 B1* | 3/2003 | Gass ................. B23B 31/123 173/171 |
| 6,594,543 B2 | 7/2003 | Murozumi |
| 6,606,528 B1 | 8/2003 | Hagmeier |
| 6,663,469 B2 | 12/2003 | Kimura |
| 6,701,816 B2 | 3/2004 | Smith |
| 6,718,854 B2 | 4/2004 | Bedi |
| 6,763,281 B2 | 7/2004 | Schauer |
| 6,803,925 B2 | 10/2004 | Vronay |
| 6,829,371 B1 | 12/2004 | Nichani |
| 6,889,113 B2 | 5/2005 | Tasker |
| 6,996,452 B2 | 2/2006 | Erichsen |
| 7,149,602 B2 | 12/2006 | Watanabe |
| 7,181,362 B2 | 2/2007 | Ratti |
| 7,403,317 B2 | 7/2008 | Mochizuki |
| 7,561,301 B2 | 7/2009 | Osumi |
| 7,831,292 B2 | 11/2010 | Quaid |
| 7,894,689 B2 | 2/2011 | Liu |
| 7,946,905 B2 | 5/2011 | Thomas |
| 7,962,192 B2 | 6/2011 | Bodduluri |
| 8,000,895 B2 | 8/2011 | Shulman |
| 8,095,233 B1 | 1/2012 | Shankar |
| 8,190,272 B2 | 5/2012 | Crothers |
| 8,287,522 B2 | 10/2012 | Moses |
| 8,311,661 B2 | 11/2012 | Krapf |
| 8,350,514 B2 | 1/2013 | Otsuki |
| 8,405,522 B2 | 3/2013 | Shaffer |
| 8,423,171 B2 | 4/2013 | Sato |
| 8,428,768 B2 | 4/2013 | Bandini |
| 8,620,473 B2 | 12/2013 | Diolaiti |
| 8,639,393 B2 | 1/2014 | Taylor |
| 8,700,369 B2 | 4/2014 | Yang |
| 8,763,721 B2 | 7/2014 | Koeder |
| 8,826,548 B2 | 9/2014 | Kaiser |
| 8,970,156 B2 | 3/2015 | Tezuka |
| 9,026,242 B2 | 5/2015 | Rivers |
| 9,056,396 B1 | 6/2015 | Linnell |
| 9,073,134 B2 | 7/2015 | Koeder |
| 9,098,077 B2 | 8/2015 | Nagaoka |
| 9,221,506 B1 | 12/2015 | Georgeson |
| 9,256,220 B1 | 2/2016 | Coffland |
| 9,684,301 B2 | 6/2017 | Taguchi |
| 10,065,318 B2 | 9/2018 | Bain |
| 10,067,495 B2 | 9/2018 | Rivers |
| 10,078,320 B2 | 9/2018 | Rivers |
| 10,179,032 B2 | 1/2019 | Andersson |
| 2001/0000805 A1 | 5/2001 | Kadono |
| 2001/0012972 A1 | 8/2001 | Matsumoto |
| 2001/0016786 A1 | 8/2001 | Takahashi |
| 2002/0111709 A1 | 8/2002 | Distasio |
| 2002/0120359 A1 | 8/2002 | Xi |
| 2002/0129485 A1 | 9/2002 | Mok |
| 2002/0133264 A1 | 9/2002 | Maiteh |
| 2002/0164221 A1 | 11/2002 | Izutsu |
| 2002/0164223 A1 | 11/2002 | Ryan |
| 2002/0169522 A1 | 11/2002 | Kanno |
| 2002/0189120 A1 | 12/2002 | Kaneda |
| 2003/0000355 A1 | 1/2003 | Butler |
| 2003/0000988 A1 | 1/2003 | Ruhland |
| 2003/0120375 A1 | 6/2003 | Arai |
| 2003/0120377 A1 | 6/2003 | Hooke |
| 2003/0167104 A2 | 9/2003 | Erichsen |
| 2003/0179226 A1 | 9/2003 | Kawai |
| 2003/0226438 A1 | 12/2003 | Adams |
| 2004/0115606 A1 | 6/2004 | Davies |
| 2004/0123297 A1 | 6/2004 | Flautner |
| 2004/0125195 A1 | 7/2004 | Satoh |
| 2004/0136706 A1 | 7/2004 | Takahashi |
| 2004/0161877 A1 | 8/2004 | Nepomuceno |

(56) References Cited

U.S. PATENT DOCUMENTS

| | | |
|---|---|---|
| 2004/0172164 A1 | 9/2004 | Habibi |
| 2004/0189631 A1 | 9/2004 | Kazi |
| 2004/0193321 A1 | 9/2004 | Anfindsen |
| 2004/0236461 A1 | 11/2004 | Erichsen |
| 2004/0245227 A1 | 12/2004 | Grafton-Reed |
| 2004/0254673 A1 | 12/2004 | Tomelleri |
| 2005/0055127 A1 | 3/2005 | Swain |
| 2005/0115421 A1 | 6/2005 | Lyons |
| 2005/0119783 A1 | 6/2005 | Brisson |
| 2005/0142525 A1 | 6/2005 | Cotin |
| 2005/0149231 A1 | 7/2005 | Pretlove |
| 2005/0168616 A1 | 8/2005 | Rastegar |
| 2005/0174287 A1 | 8/2005 | Wall |
| 2005/0230130 A1 | 10/2005 | Strasser |
| 2005/0241774 A1 | 11/2005 | Hart |
| 2005/0251290 A1 | 11/2005 | Skourup |
| 2005/0277104 A1 | 12/2005 | Morimoto |
| 2005/0283269 A1 | 12/2005 | Genma |
| 2005/0283270 A1 | 12/2005 | Nakamura |
| 2005/0283985 A1* | 12/2005 | Yang et al. .......... G01Q 60/366 33/18.1 |
| 2006/0016957 A1 | 1/2006 | Hofmann |
| 2006/0069462 A1 | 3/2006 | Cannedy |
| 2006/0074525 A1 | 4/2006 | Close |
| 2006/0131183 A1* | 6/2006 | Knaapen ................ B24B 49/16 205/649 |
| 2006/0206233 A1 | 9/2006 | Carpenter |
| 2006/0229761 A1 | 10/2006 | Kita |
| 2006/0269377 A1 | 11/2006 | Onose |
| 2007/0073437 A1 | 3/2007 | Walt |
| 2007/0085850 A1 | 4/2007 | Hong |
| 2007/0157782 A1 | 7/2007 | Hetcher |
| 2007/0169847 A1 | 7/2007 | Zhong |
| 2007/0180962 A1 | 8/2007 | Bretschneider |
| 2007/0257195 A1 | 11/2007 | Reibel |
| 2007/0261522 A1 | 11/2007 | Bono |
| 2007/0267104 A1 | 11/2007 | McGehee |
| 2007/0273854 A1 | 11/2007 | Nagasaka |
| 2008/0018287 A1 | 1/2008 | Ogawa |
| 2008/0027580 A1 | 1/2008 | Zhang |
| 2008/0060535 A1 | 3/2008 | Edwards |
| 2008/0101682 A1 | 5/2008 | Blanford |
| 2008/0115589 A1 | 5/2008 | Derose |
| 2008/0177417 A1 | 7/2008 | Kasuga |
| 2008/0208461 A1 | 8/2008 | Gharsalli |
| 2008/0228303 A1 | 9/2008 | Schmitt |
| 2008/0229589 A1 | 9/2008 | Bone |
| 2008/0243142 A1 | 10/2008 | Gildenberg |
| 2008/0244888 A1 | 10/2008 | Sarh |
| 2008/0252248 A1 | 10/2008 | Lundberg |
| 2008/0252645 A1 | 10/2008 | Mouilleseaux |
| 2008/0252726 A1 | 10/2008 | Chan |
| 2008/0302226 A1 | 12/2008 | Fischer |
| 2008/0319570 A1 | 12/2008 | Van Schoiack |
| 2009/0060574 A1 | 3/2009 | Shibata |
| 2009/0070077 A1 | 3/2009 | Tian |
| 2009/0071941 A1 | 3/2009 | Knoblauch |
| 2009/0112925 A1 | 4/2009 | Amirehteshami |
| 2009/0124170 A1 | 5/2009 | Thomas |
| 2009/0154791 A1 | 6/2009 | Yoon |
| 2009/0171184 A1 | 7/2009 | Jenkins |
| 2009/0182436 A1 | 7/2009 | Ferrara |
| 2009/0228166 A1 | 9/2009 | Durkos |
| 2009/0234511 A1 | 9/2009 | Ouchi |
| 2009/0254211 A1 | 10/2009 | Monnin |
| 2009/0259442 A1 | 10/2009 | Gandikota |
| 2010/0018609 A1* | 1/2010 | Van Der Linde ......... B25F 5/02 144/136.95 |
| 2010/0023157 A1 | 1/2010 | Burgess |
| 2010/0032178 A1 | 2/2010 | Koeder |
| 2010/0033553 A1 | 2/2010 | Levy |
| 2010/0054412 A1 | 3/2010 | Brinks |
| 2010/0057257 A1 | 3/2010 | Ichikawa |
| 2010/0063615 A1 | 3/2010 | Mori |
| 2010/0063616 A1 | 3/2010 | Mori |
| 2010/0063617 A1 | 3/2010 | Mori |
| 2010/0066559 A1 | 3/2010 | Judelson |
| 2010/0070078 A1 | 3/2010 | Kong |
| 2010/0087949 A1 | 4/2010 | Coleman |
| 2010/0111367 A1 | 5/2010 | Hiraoka |
| 2010/0125790 A1 | 5/2010 | Erskin |
| 2010/0145499 A1 | 6/2010 | Sato |
| 2010/0153058 A1 | 6/2010 | Crothers |
| 2010/0181014 A1 | 7/2010 | Raymond |
| 2010/0206429 A1 | 8/2010 | Pozgay |
| 2010/0213107 A1 | 8/2010 | Susnjara |
| 2010/0265048 A1 | 10/2010 | Lu |
| 2010/0268363 A1 | 10/2010 | Karim |
| 2010/0332438 A1 | 12/2010 | Toland |
| 2011/0015877 A1 | 1/2011 | Okita |
| 2011/0023280 A1 | 2/2011 | Renke |
| 2011/0027032 A1 | 2/2011 | Keller |
| 2011/0046773 A1 | 2/2011 | Iwashita |
| 2011/0102542 A1 | 5/2011 | Chen |
| 2011/0125320 A1 | 5/2011 | Bongardt |
| 2011/0130761 A1 | 6/2011 | Plaskos |
| 2011/0137450 A1 | 6/2011 | Glässer |
| 2011/0138873 A1 | 6/2011 | Razi |
| 2011/0173819 A1 | 7/2011 | Koeder |
| 2011/0190922 A1 | 8/2011 | Walker |
| 2011/0190936 A1 | 8/2011 | Koeder |
| 2011/0211938 A1 | 9/2011 | Eakins |
| 2011/0213490 A1 | 9/2011 | Liu |
| 2011/0218668 A1 | 9/2011 | Morfino |
| 2011/0222980 A1 | 9/2011 | Kuo |
| 2011/0228050 A1 | 9/2011 | Wang |
| 2011/0230758 A1 | 9/2011 | Eichler |
| 2011/0251727 A1 | 10/2011 | Koeder |
| 2011/0282492 A1 | 11/2011 | Krause |
| 2011/0303427 A1 | 12/2011 | Tang |
| 2011/0306985 A1 | 12/2011 | Inoue |
| 2011/0311328 A1 | 12/2011 | Barr |
| 2012/0000080 A1 | 1/2012 | Kaiser |
| 2012/0065944 A1 | 3/2012 | Nielsen |
| 2012/0072039 A1 | 3/2012 | Anderson |
| 2012/0089247 A1 | 4/2012 | Kawauchi |
| 2012/0100520 A1 | 4/2012 | Jo |
| 2012/0157834 A1 | 6/2012 | Lazebnik |
| 2012/0163673 A1 | 6/2012 | Thompson |
| 2012/0221141 A1 | 8/2012 | Otsuki |
| 2012/0221300 A1 | 8/2012 | Tukora |
| 2012/0230550 A1 | 9/2012 | Kraut |
| 2012/0271448 A1 | 10/2012 | Freeman |
| 2012/0296463 A1 | 11/2012 | Rivers |
| 2013/0019735 A1 | 1/2013 | Koeder |
| 2013/0068737 A1 | 3/2013 | Saito |
| 2013/0169208 A1 | 7/2013 | Tezuka |
| 2013/0169423 A1 | 7/2013 | Iorgulescu |
| 2013/0175092 A1 | 7/2013 | Kolpack |
| 2013/0218322 A1 | 8/2013 | Carli |
| 2013/0233447 A1 | 9/2013 | Schnell |
| 2013/0286187 A1 | 10/2013 | Slesinski |
| 2013/0337238 A1 | 12/2013 | Costin |
| 2014/0005807 A1 | 1/2014 | Busschaert |
| 2014/0025191 A1 | 1/2014 | Wadehn |
| 2014/0081441 A1 | 3/2014 | Regan |
| 2014/0123740 A1* | 5/2014 | Yoshikawa ........ B23Q 17/0961 73/104 |
| 2014/0313166 A1 | 10/2014 | Rattray |
| 2014/0343571 A1 | 11/2014 | Popovic |
| 2015/0057675 A1 | 2/2015 | Akeel |
| 2015/0094836 A1 | 4/2015 | Rivers |
| 2015/0277421 A1 | 10/2015 | Rivers |
| 2015/0360305 A1 | 12/2015 | Willgert |
| 2015/0367427 A1* | 12/2015 | Burton ................. B23C 5/10 407/54 |
| 2016/0046010 A1 | 2/2016 | Busscharet |
| 2016/0125339 A1 | 5/2016 | Itaya |
| 2016/0288236 A1 | 10/2016 | Becker |
| 2016/0291567 A1 | 10/2016 | Rivers |
| 2016/0291568 A1 | 10/2016 | Rivers |
| 2016/0291569 A1 | 10/2016 | Rivers |
| 2016/0349725 A1 | 12/2016 | Miura |

(56) References Cited

U.S. PATENT DOCUMENTS

| | | |
|---|---|---|
| 2017/0113342 A1 | 4/2017 | Abramson |
| 2017/0210011 A1 | 7/2017 | Hull |
| 2018/0126476 A1 | 5/2018 | Meess |

FOREIGN PATENT DOCUMENTS

| | | |
|---|---|---|
| DE | 202004005478 | 8/2004 |
| DE | 10027526 B4 | 4/2007 |
| DE | 102008041088 | 2/2010 |
| EP | 0314853 | 5/1989 |
| EP | 0588057 | 3/1994 |
| EP | 1174212 | 1/2002 |
| EP | 2302476 | 3/2011 |
| GB | 2462372 | 2/2010 |
| GB | 2488703 | 9/2012 |
| JP | S57033916 | 2/1982 |
| JP | 60207742 | 10/1985 |
| JP | S63312096 | 12/1988 |
| JP | H06183194 | 7/1994 |
| JP | H08227035 | 9/1996 |
| JP | H09503253 | 3/1997 |
| JP | H11248432 A | 9/1999 |
| JP | 2002277981 | 9/2002 |
| JP | 2003251464 | 9/2003 |
| JP | 2008260121 A | 10/2008 |
| JP | 2010036337 | 2/2010 |
| WO | 9403301 | 2/1994 |
| WO | 02068982 | 9/2002 |
| WO | 2008055738 | 5/2008 |
| WO | 2012159123 | 11/2012 |
| WO | 2013163588 | 10/2013 |
| WO | 2014144946 | 9/2014 |
| WO | 2016051342 | 4/2016 |
| WO | 2018035499 | 2/2018 |

OTHER PUBLICATIONS

Rosenblum, Shaper Makes Perfect Wood Cuts, Popular Science, Jun. 16, 2015, Downloaded from: https://www.popsci.com/make-perfect-cut on Feb. 4, 2018, 2 pages.

Snavely, Noah, et al., "Photo Tourism: Exploring Photo Collections in 3D," Proceeding SIGGRAPH '06 ACM SIGGRAPH 2006 Papers, Jul. 2006, pp. 835-846, vol. 25 Issue 3, Association for Computing Machinery, Inc., New York, NY, USA.

Havlena, Michal, et al., "Randomized structure from motion based on atomic 3D models from camera triplets," IEEE Conference on Computer Vision and Pattern Recognition, 2009, Jun. 20-25, 2009, pp. 2874-2881, IEEE.

Boyle, "MIT's Smart Handheld Woodworking Tool Makes Precise Cuts Automatically", Popular Science, Aug. 9, 2012, Downloaded from http://www.popsci.com/diy/article/2012-08/mits-new-smartwoodworking-tool-makes-routing-more-precise on Mar. 31, 2017, pp. 1-8.

Brandon, "Augmented Reality Router", SolidSmack, Sep. 4, 2012, Downloaded from http://solidsmack.com/fabrication/augmented-reality-router/ on Mar. 14, 2017, pp. 1-7.

Esler, "Hand-Held CNC Router Hits Precision Cuts", Woodworking Network, Aug. 14, 2012, Downloaded from http://www.woodworkingnetwork.com/news/woodworking-industry-news/Hand-Held-CNC-Router-Self-Corrects-166100876.html on Mar. 14, 2017, pp. 1-8.

Ferguson, "Robotic power tool keeps your woodcutting on track", New Scientist, Aug. 8, 2012, Downloaded from http://www.newscientist.com/blogs/onepercent/2012/08/robotic-power-tool.html on Mar. 14, 2017, pp. 1-5.

Hu, "A Copernican Revolution in Digital Fabrication: Handheld CNC for 2D Applications", Core77, Sep. 5, 2012, Downloaded from http://www.core77.com/blog/digital_fabrication/a_copernican_revolution_in_digital_fabrication_handheld_cnc_for_2d_23342.asp#more on Mar. 14, 2017, pp. 1-20.

Mack, "MIT Students Create an Incredibly Accurate Router", The World Is My Workshop, Sep. 20, 2012, Downloaded from http://theworldismyworkshop.com/home/2012/9/20/mit-students-create-anincredibly-accurate-router.html on Mar. 20, 2017, pp. 1-4.

Massachusetts Institute of Technology (Specific Author Unknown), "Rivers, Moyer & Durand create tool allowing human design with digital precision", EECS, Aug. 8, 2012, Downloaded from http://www.eecs.mit.edu//news-events/media/rivers-moyer-durand-create-tool-allowing-humandesign-digital-precision on Mar. 14, 2017, pp. 1-4.

REDDIT/THEWORLDISMYWORKSHOP,"A Super Precise Automated Router Made by MIT Students", Reddit, Sep. 20, 2012, Downloaded from http://www.reddit.com/r/woodworking/comments/107p14/a_super_precise_automated_router_made_by_mit/ on Mar. 14, 2017, pp. 1-5.

Rivers et al., "Position-Correcting Tools for 2D Digital Fabrication", ACM Transactions on Graphics, vol. 31, No. 4, Article 88, Publication Date: Jul. 2012,Downloaded from http://www.alecrivers.com/positioncorrectingtools/files/Position-Correcting%20Tools%20for%202D%20Digital%20Fabrication.pdf on Mar. 14, 2017, pp. 1-7.

Rivers, "MIT's Infinite Size CNC Router ", Hacker News, Aug. 10, 2012, Downloaded from http://news.ycombinator.com/item?id=4363119 on Mar. 14, 2017, pp. 1-5.

Specific Author Unknown, "GPS for your power tools", Ponoko, Sep. 27, 2012, Downloaded from http://blog.ponoko.com/2012/09/27/gps-for-your-power-tools/ on Mar. 14, 2017, pp. 1-2.

Warfield, "Students Create Hand-Held CNC Router: You Gotta See This!", CNC Cookbook, Aug. 9, 2012, Downloaded from http://blog.cnc.cookbook.com/2012/08/09/mit-students-create-hand-heldcnc-router-you-gotta-see-this/ on Mar. 14, 2017, pp. 1-8.

Benchoff, "Largest CNC router is controlled by hand", Hackaday, Aug. 9, 2012, Downloaded from http://hackaday.com/2012/08/09/largest-cnc-router-is-controlled-by-hand/#more-82158, pp. 1-16.

Eisenberg, "For the Home Workshop, a GPS for Power Tools", The Hew York Times, Sep. 22, 2012, Downloaded from http://www.nytimes.com/2012/09/23/technology/computer-precision-for-powertools-novelties.html on Mar. 14, 2017, pp. 1-9.

Knight, "New router enhances the precision of woodworking—Handheld device precisely follows a digital plan with minimal guidance from a user.", MIT News, Aug. 8, 2012, Downloaded from http://news.mit.edu/2012/automated-handheld-router-for-woodworking-0808 on Mar. 14, 2017, pp. 1-5.

McKenna,"MIT Students and Professor Invent Handheld CNC Router System", Fine Woodworking Magazine, Aug. 9, 2012, Downloaded from http://www.finewoodworking.com/item/57081/mitstudents-and-professor-invent-handheld-cnc-router-system on Mar. 14, 2017, pp. 1-8.

Bdring, "Position Correcting Hand Tools", Buildlog.Net Blog, Aug. 9, 2012, Downloaded from http://www.buildlog.net/blog/2012/08/position-correcting-hand-tools/ dated Mar. 14, 2017, pp. 1-3.

Roach, "Hand held cutting tool makes anyone a master carpenter", MSNBC FutureOfTech, Aug. 10, 2012, Downloaded from https://web.archive .org/web/2012081 0065905/http:/www. futureoftech.msnbc.msn.com/technology/futureoftech/handheld-cutting-tool-makes-anyone-master-carpenter-928602 on Apr. 21, 2017, pp. 1-2.

Rivers, Augmented Manual Fabrication Methods for 2D Tool Positioning and 3D Sculpting, Ph.D. Thesis MIT, Dec. 20, 2012, 75 pages.

Rivers, Augmented Manual Fabrication Methods for 2D Tool Positioning and 3D Sculpting, Ph.D. Thesis Defense MIT, Sep. 26, 2012.

Non-Final Office Action for U.S. Appl. No. 13/477,029 dated Feb. 25, 2014.

Final Office Action for U.S. Appl. No. 13/477,029 dated Sep. 23, 2014.

Notice of Allowance for U.S. Appl. No. 13/477,029 dated Jan. 7, 2015.

Non-Final Office Action for U.S. Appl. No. 14/678,752 dated Nov. 4, 2015.

Final Office Action for U.S. Appl. No. 14/678,752 dated Jul. 1, 2016.

Non-Final Office Action for U.S. Appl. No. 14/678,752 dated Mar. 1, 2017.

(56) References Cited

OTHER PUBLICATIONS

Final Office Action for U.S. Appl. No. 14/678,752 dated Jun. 29, 2017.
Notice of Allowance for U.S. Appl. No. 13/477,029 dated Jun. 26, 2018.
Non-Final Office Action for U.S. Appl. No. 15/178,376 dated Feb. 22, 2018.
Response to Non-Final Office Action for U.S. Appl. No. 15/178,376, filed May 17, 2018.
Non-Final Office Action for U.S. Appl. No. 15/178,380 dated Oct. 12, 2017.
Final Office Action for U.S. Appl. No. 15/178,380 dated May 15, 2018.
Non-Final Office Action for U.S. Appl. No. 15/178,388 dated Nov. 1, 2017.
Final Office Action for U.S. Appl. No. 15/178,388 dated May 15, 2018.
Non-Final Office Action for U.S. Appl. No. 14/396,291 dated Jan. 18, 2017.
Final Office Action for U.S. Appl. No. 14/396,291 dated Jul. 26, 2017.
Non-Final Office Action for U.S. Appl. No. 14/396,291 dated Feb. 20, 2018.
Response to Non-Final Office Action for U.S. Appl. No. 14/396,291, filed May 19, 2018.
Notice of Allowance for U.S. Appl. No. 15/178,376 dated Jul. 5, 2018.
International Preliminary Report on Patentability for PCT/US2017/047682 dated Feb. 19, 2019, 10 pages.
JP2018-034318 Reasons for Refusal dated Jan. 29, 2019, 4 pages.
EP13 781 455.4 Communication pursuant to Article 94(3) EPC dated Apr. 17, 2019, 3 pages.
U.S. Appl. No. 14/678,752 Notice of Allowance dated Apr. 4, 2018, 8 pages.
U.S. Appl. No. 14/396,291 Notice of Allowance dated Apr. 10, 2019, 10 pages.
International Search Report for PCT/US2016/032224 dated Aug. 16, 2016 (2 pages).
Written Opinion for PCT/US2016/032224 dated Aug. 16, 2013 (7 pages).
International Search Report for PCT/US2017/047682 dated Feb. 9, 2018 (5 pages).
Written Opinion for PCT/US2017/047682 dated Feb. 9, 2018 (9 pages).
International Search Report for PCT/US2012/038910 dated Nov. 20, 2012 (3 pages).
Written Opinion for PCT/US2012/038910 dated Nov. 20, 2012 (5 pages).
International Search Report for PCT/US2013/038474 dated Aug. 16, 2013 (2 pages).
Written Opinion for PCT/US2013/038474 dated Aug. 16, 2013 (6 pages).
Office Action for Japanese Appl. Ser. No. 2015-509197 dated Sep. 5, 2017 (6 pages).
Office Action for Japanese Appl. Ser. No. 2015-509197 dated Apr. 4, 2017 (9 pages).
Extended European Search Report for EPO Appl. Ser. No. 13781455.4 dated Aug. 24, 2016 (7 pages).
Reply to Non-Final Office Action for U.S. Appl. No. 14/396,291 dated Dec. 11, 2018, 19 pages.
Supplemental Amendment for U.S. Appl. No. 15/178,380 dated Jan. 23, 2019, 12 pages.
Preliminary Amendment for U.S. Appl. No. 16/326,218 dated Feb. 17, 2019, 7 pages.
Notice of Allowance for U.S. Appl. No. 15/178,380 dated Feb. 13, 2019, 9 pages.
Various, "Topic: Goliath to slay Shaper Origin ?," Postings on Festool Owners Group (retreived on Feb. 20, 2019 from: http://festoolownersgroup.com/other-tools-accessories/goliath-to-slay-shaper-origin/) dated from Oct. 6, 2017 to Apr. 26, 2018, 40 pages.
Non-Final Office Action for U.S. Appl. No. 14/396,291 dated Sep. 11, 2018.
Response to Final Office Action for U.S. Appl. No. 15/178,380, filed Sep. 17, 2018.
Response to Final Office Action for U.S. Appl. No. 15/178,388, filed Oct. 15, 2018.
EPO Extended Search Report for EP16793574.1, dated Nov. 19, 2018, 6 pages.
Preliminary Amendment filed in U.S. Appl. No. 15/178,376 dated Jan. 2, 2018 (48 pages).
Preliminary Amendment filed in U.S. Appl. No. 15/178,376 dated Jan. 18, 2018 (12 pages).
Response to Office Action filed in U.S. Appl. No. 15/178,380 dated Jan. 12, 2018 (54 pages).
Response to Office Action filed in U.S. Appl. No. 15/178,388 dated Jan. 31, 2018 (53 pages).
Response to Office Action filed in U.S. Appl. No. 14/396,291 dated Sep. 25, 2017 (41 pages).
Response to Office Action filed in U.S. Appl. No. 14/678,752 dated Jul. 19, 2017 (12 pages).
Notice of allowance for U.S. Appl. No. 14/678,752 dated Jul. 28, 2017 (8 pages).
Notice of allowance for U.S. Appl. No. 14/678,752 dated Oct. 19, 2017 (8 pages).
Notice of allowability for U.S. Appl. No. 14/678,752 dated Feb. 22, 2018 (2 pages).
Non-Final Office Action for U.S. Appl. No. 15/178,388 dated May 30, 2019 (17 pages).
Communication pursuant to Article 94(3) EPC for EP Application No. 13781455.4 dated Apr. 17, 2019 (3 pages).
International Search Report and Written Opinion of International Searching Authority for PCT/US2019/015624 dated May 3, 2019 (21 pages).

\* cited by examiner

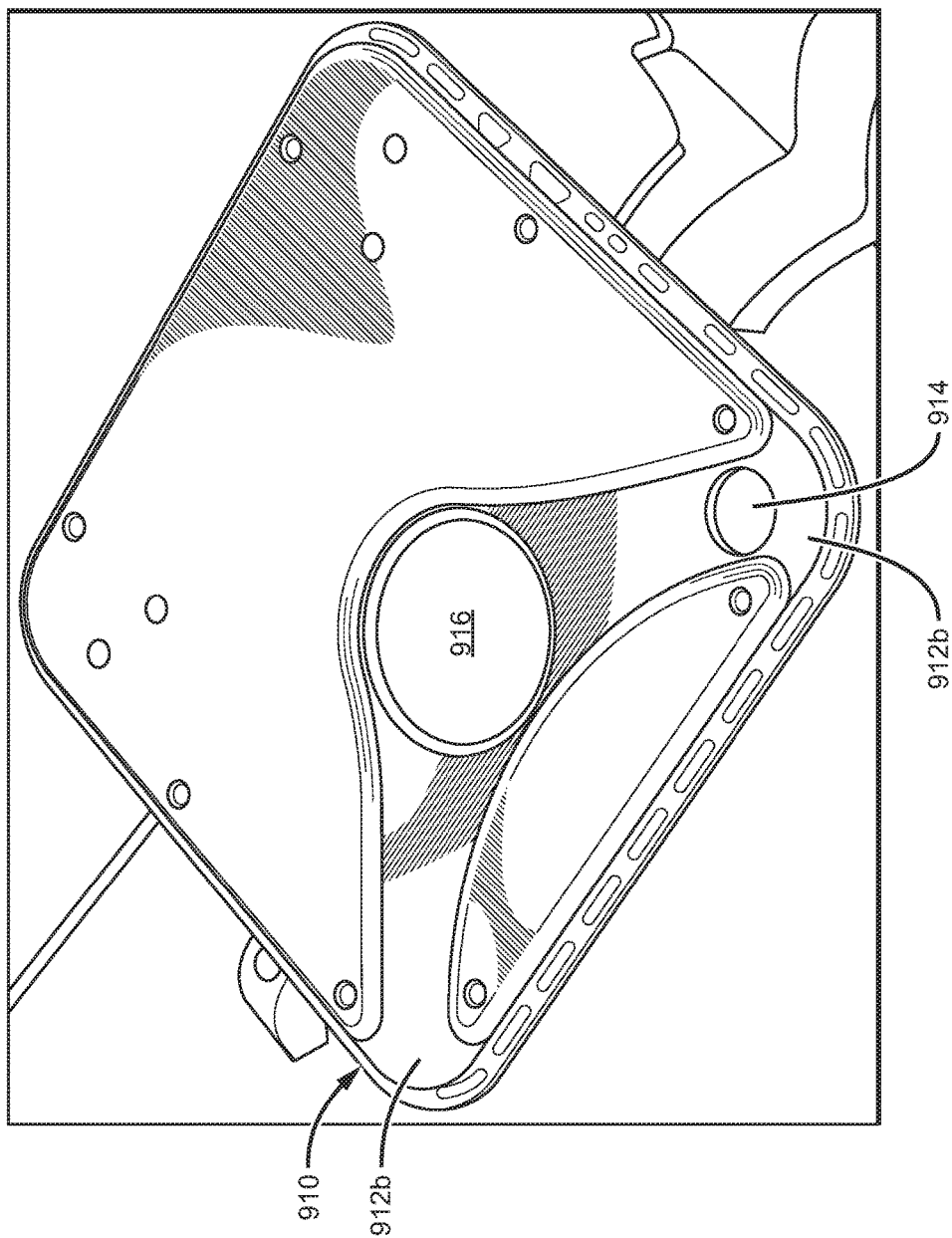

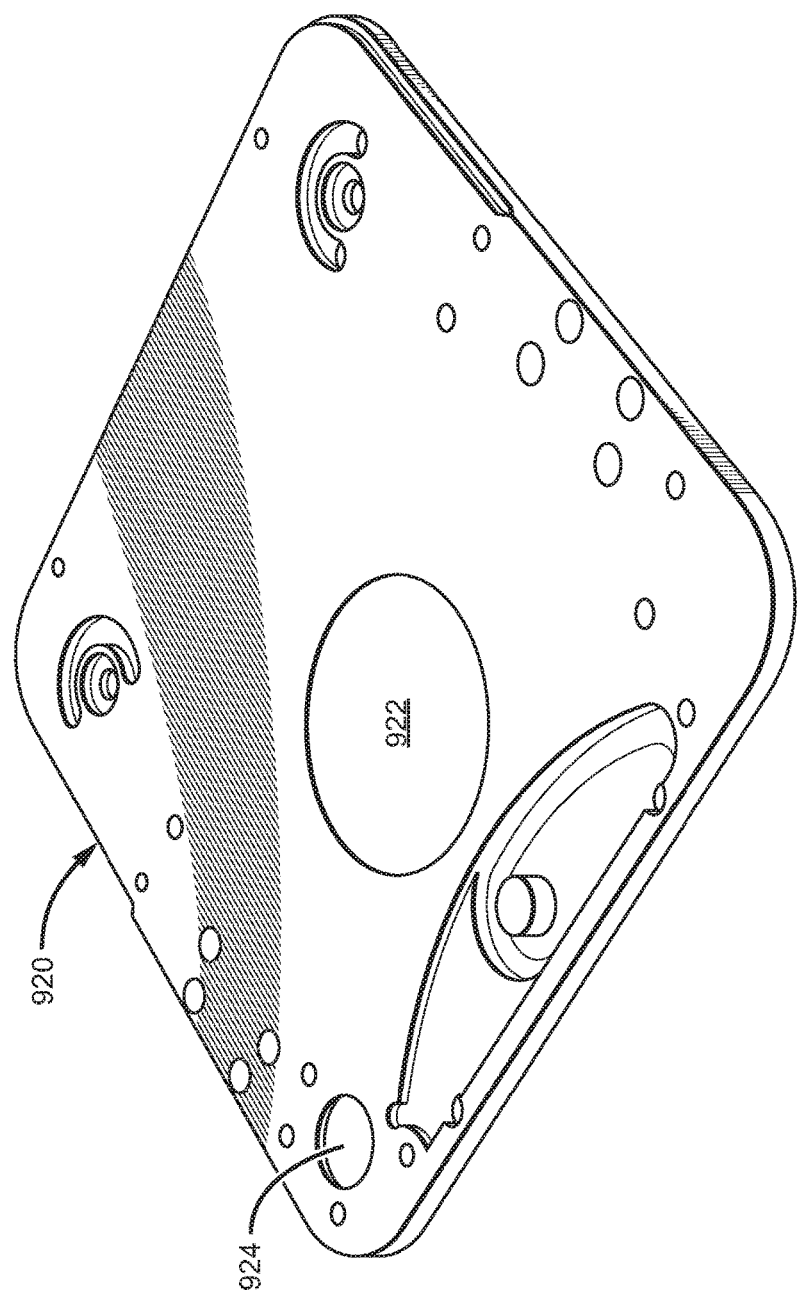

SYSTEMS, METHODS AND APPARATUS FOR GUIDED TOOLS

CROSS-REFERENCE TO RELATED APPLICATION APPLICATIONS

This application is a 35 U.S.C. § 371(c) national stage entry of International PCT Application No. PCT/US2016/032224, filed May 12, 2015, which claims the benefit of priority under 35 U.S.C. § 119 to U.S. Provisional Patent Application No. 62/161,179, filed May 13, 2015, both of which are hereby incorporated by reference herein in their entirety.

BACKGROUND

Visual guides that are drawn on material may be difficult for a user to follow manually. Further, it may be difficult to determine a position of a tool on the material.

SUMMARY

Apparatuses, systems and methods of the present disclosure facilitate guiding a tool. In some embodiments, the system includes a rig or frame with a stage that may be positioned on the surface of a piece of material such as wood. The tool can be electrically or mechanically coupled to the frame, and the frame together with the tool can be passed over the material. The system can include sensors, cameras or positioning logic to determine the tool's position on the material and accurately move (or provide instructions for a user to move) the frame, stage, or tool to a desired coordinate on the material.

In some embodiments, the surface of the material can be marked with location markers that facilitate detecting a location of the tool relative to the surface of the material. The marker can be designed or configured to facilitate easy, fast, and reliable detection by a sensor of the tool. In some embodiments, the marker may include a binary image or be constructed in a manner that can be easily converted to a binary image. For example, the marker may include a fiducial marker that can be detected with minimal computation power, such as a black-and-white image that may represent dominoes.

In some embodiments, the present disclosure is directed to a system, method or apparatus of directing or extracting dust that may be generated while performing a task on a surface of a material. For example, while a cutting tool is cutting a material such as wood, saw dust may be produced which may make it difficult for the tool to detect markers that may be placed on the surface of the material. The tool of the present disclosure includes a cavity in which the dust generated by cutting the material can be directed. For example, the cavity may include a void in tool frame, and a fan of the tool may direct the dust towards the cavity. Further, a vacuum may be coupled to the tool such that the dust can be extracted via the channel.

In some embodiments, the present disclosure is directed to a system, method or apparatus for determining the position of a tool relative to a work surface. The system, method or apparatus can determine changes in the force exerted by the tip of the tool (e.g., a cutting bit) in order to determine when the tip of the cutting tool is touching or pressing against the surface of the material. For example, the tip of the tool may be in a first position that is not touching the work surface. The tip may gradually move to a second position that touches the surface of the material. When the tip of the tool moves to the second position, the system, method or apparatus can determine a change in the force, which may indicate that the tool tip is touching the surface of the material. For example, the force exerted on a base of the tool may be less because the tip of the tool is offloading some of the force from the base.

At least one aspect of the present disclosure is directed to a system to calibrate position detection for a tool. The system can include base coupled to the tool. The base can be in contact with a working surface. The system can include a computing device having one or more processors. The system can include a sensor communicatively coupled to the computing device. The system can include a motor controlled by the computing device. The computing device can identify, via the sensor, a first value of a parameter indicative of an amount of force exerted by a portion of the base on the working surface. The computing device can instruct the motor to extend the working member towards a working surface. The computing device can identify, via the sensor upon the working member contacting the working surface, a second value of the parameter. The computing device can compare the first value of the parameter with the second value of the parameter to generate a difference between the first value and the second value. The computing device can determine a z-axis position of the working member relative to the working surface responsive to the difference between the first value and the second value greater than a threshold.

At least one aspect of the present disclosure is directed to a method of evaluating a position of a working member of a tool. The method can include a sensor communicatively coupled to a computing device comprising one or more processors detecting a first value of a parameter indicative of an amount of force exerted by a portion of a base of the tool on the working surface. The method can include a motor controlled by the one or more processors of the tool extending the working member towards the working surface. The base can be at least partially in contact with the working surface. The method can include the sensor detecting a second value of the parameter when the working member contacts the working surface. The second value of the parameter can be less than the first value of the parameter. The method can include the computing device determining a z-axis position of the working member relative to the working surface responsive to a difference between the first value and the second value greater than a threshold.

At least one aspect is directed to a system to position a working member of a tool. The system can include a base coupled to the tool. The system can include a computing device comprising one or more processors. The system can include a sensor communicatively coupled to the computing device. The system can include a motor controlled by the computing device. The system can include the computing device configured to identify, via the sensor, a first value of a parameter indicative of an amount of force exerted by a portion of the base towards a working surface. The computing device can instruct the motor to extend the working member towards the working surface. The computing device can identify, via the sensor with the working member in contact with the working surface, a second value of the parameter. The computing device can compare the first value of the parameter with the second value of the parameter to identify a difference between the first value and the second value. The computing device can determine a z-axis position of the working member relative to the working surface based on the difference between the first value and the second value greater than a threshold.

At least one aspect is directed to a method of positioning of a working member of a tool. The method can include detecting, by a sensor communicatively coupled to a computing device comprising one or more processors, a first value of a parameter for a first vertical position of a base of the tool. The method can include extending, by a motor controlled by the computing device, the working member towards the working surface. The method can include detecting, by the sensor with the working member in contact with the working surface, a second value of the parameter indicating a second vertical position of the base of the tool. The method can include comparing, by the computing device, the first value of the parameter with the second value of the parameter to determine a change in vertical position of the base of the tool. The method can include determining, by the computing device, a z-axis position of the working member relative to the working surface based on the change in the vertical position of the base of the tool.

At least one aspect is directed to a system to position a working member of a tool. The system can include a base coupled to the tool. The system can include a computing device comprising one or more processors. The system can include one or more sensors communicatively coupled to the computing device. The system can include one or more motors controlled by the computing device. The computing device can determine, via the one or more sensors, a z-axis position of the working member. The computing device can provide, based at least in part on the z-axis position of the working member, motor control information to control the one or more motors to move the working member from a first location to a second location, the tool advanced in a direction that is within a range adjacent to a predetermined path for the working member of the tool.

At least one aspect is directed to a system to position a working member of a tool. The system can include a base coupled to the tool. The system can include a computing device comprising one or more processors. The system can include one or more sensors communicatively coupled to the computing device. The system can include one or more motors controlled by the computing device. The system can include a cavity of the tool to move particles of material removed from the working surface by the working member. The computing device can determine, based on first information received via the one or more sensors, a first location of the working member. The computing device can compare the first location of the working member with a predetermined path to determine a second location for the working member of the tool corresponding to the path. The computing device can provide, based on the second location, motor control information to control the one or more motors to move the working member from the first location to the second location, the tool advanced in a direction that is within a range adjacent to a predetermined path for the working member of the tool, the cavity configured to move the particles of the material in a direction opposite to the direction in which the tool advances.

BRIEF DESCRIPTION OF THE DRAWINGS

FIG. 9C is an illustrative example of a bottom perspective view of an embodiment of a base plate for directing or extracting dust particles that may be employed to implement various elements of the systems, apparatus, and the methods disclosed herein, in accordance with an embodiment.

FIG. 9D is an illustrative example of a top perspective view of an embodiment of a base plate for directing or extracting dust particles that may be employed to implement various elements of the systems, apparatus, and the methods disclosed herein, in accordance with an embodiment.

DETAILED DESCRIPTION

Figure 1:
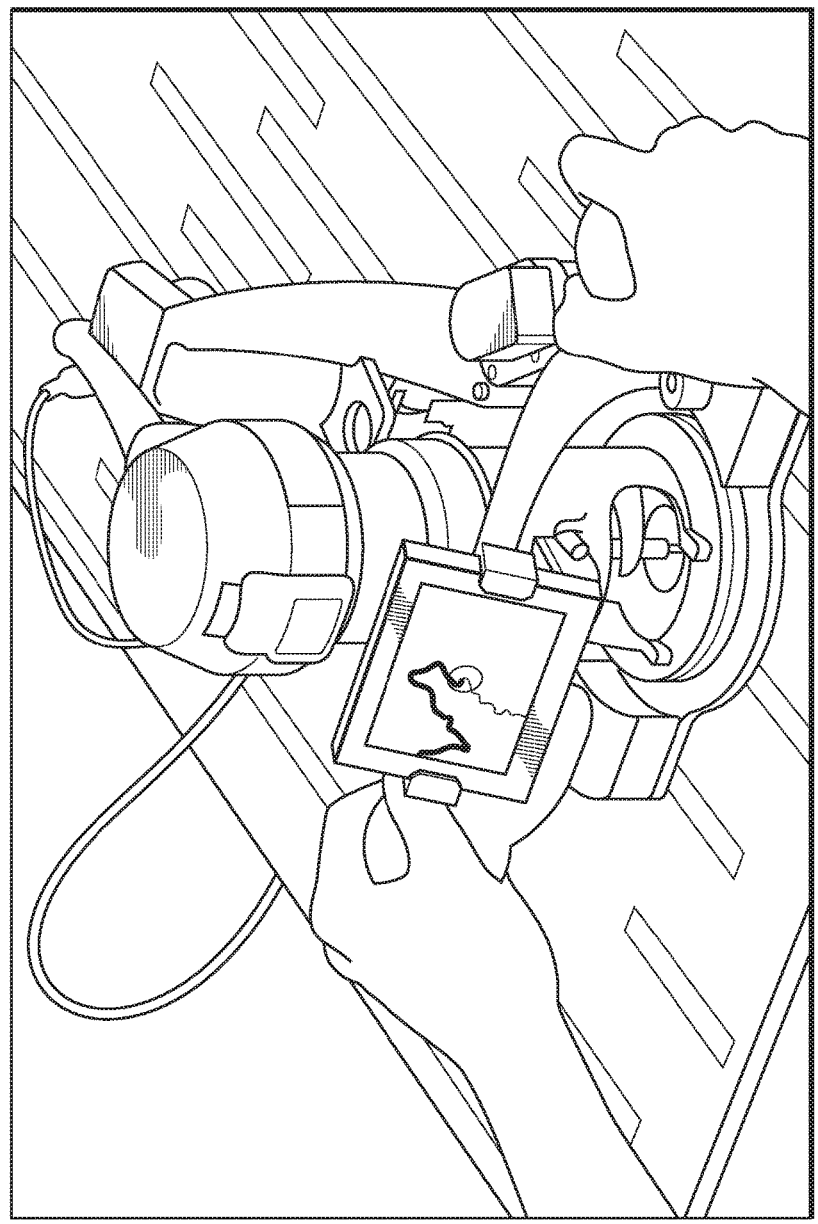
FIG. 1 is an illustrative example of an embodiment of an apparatus for automatically guiding tools.

The present disclosure relates generally to systems and methods for working on a surface such as woodworking or printing. In some embodiments, the present disclosure relates to determining the location of a tool in reference to the surface of a material and using the location to guide, adjust or auto-correct the tool along a predetermined path or design plan such as, e.g., a cutting or drawing path. In some embodiments, the reference location may correspond to a design or plan obtained via an online design store.

In some cases, the present disclosure can facilitate evaluating a position of a working member of a tool. Evaluating the position of the working member can include, for example, determining the geometry of the cutting tool or determining the geometry of a work piece (e.g., working surface).

Determining the geometry of the tool can include or refer to determining the position of the tool tip (e.g., working member) relative to a reference frame of the tool. Determining the geometry of the tool can include or refer to determining the diameter of the cutting tool. The tool geometry information can be used to automatically determine a length of a cutting flute of the working member and an angle of the cutter (e.g. a V carving bit or helix angle).

Determining the geometry of a work piece can include or refer to determining or measuring the thickness of the material to be cut, or creating a topological map of a surface by repeatedly probing it with a tool tip. The tool can determine the location of features of interest such as holes on a work piece.

The present disclosure can use one or more techniques to determine the position of the working member or tool tip relative to the reference frame of the tool (e.g., tool height). For example, the tool can include a tool tip or working member and a base. The base of the tool can rest on and be in contact with a working surface. A technique to determine the position of the tool tip can include extending or dropping the tool tip onto the work surface (or a convenient flat surface such as a table) while measuring the weight on the base of the tool. When the tool tip makes contact with the work surface, weight can be transferred onto the tool tip and off of the base of the device as additional downward motion of the cutting tool occurs. The tool can detect this reduction in weight on the base by weight sensors in the base. This technique can provide improved accuracy in determining the position of the tool tip because the tool tip position can be determined within a fraction of the tool travel necessary to lift the base of the device off of the work surface. In some cases, where the tool tip can be quite sharp, the tool tip can sink or enter into the work surface (e.g., wood) a distance before generating sufficient force to cause the device to lift. However, since the weight sensors can be configured to detect even a small force reduction (e.g., 1%, 2%, 3%, 5%, 0.5%, 0.1%, or 10% of the force exerted by the tool or base on the material prior to the tool tip contacting the working surface), the tool can detect the change in force as the tool tip contacts the working surface even if the tool tip is to at least partially enter the working surface.

Furthermore, the tool can determine the position of the tool tip with this technique without performing an absolute calibration of the weight sensors because the tool can determine the position based on detecting a change in the force. Therefore, it can be possible to determine the position of the tool tip using inexpensive and uncalibrated force sensors. Examples of force sensors can include force-sensitive resistors, capacitive force sensors, high-pass sensors or piezo-resistive sensors.

The tool can detect when the tool tip or working member contacts or comes into contact with the work surface by detecting, noticing, determining, or otherwise identifying a lift of the base. The lift of the base may be a relatively small lift (e.g., a reduction in force on the force sensor of 0.1%, 0.5%, 1%, 2%, 5%, 10%, 15%, 20% or some other percentage based on the resolution or granularity of the force sensor). In some cases, the tool can detect the lift based on a tilt of the base (e.g., 1 degree angle, 2 degree, 5 degrees, 10 degrees, 15 degrees, 25 degrees or some other tilt that is detectable). The tool can detect the tilt using a camera, visual information, gyroscope, or 3-axis accelerometer. For example, the camera can determine shift in the captured image corresponding to a tilt resulting from the base lifting. The camera can take a first picture or image before the tool brings the tool tip into contact with the working surface, and then take a second image when the tool tip contacts the working surface. The camera can compare the first image with the second image to identify a tilt or variation between the two images. The accelerometer can indicate the tilt responsive to a motion or sudden motion caused by the base lifting. In some embodiments, the tool can include a force sensor in the tool mount to directly measure the force on the cutting tool tip.

The tool can determine or detect additional information about the tool including tip or working member position, diameter, or tool geometry. For example, the tool can include a break-beam sensor (e.g. laser break beam sensor, infrared break beam sensor, photoelectric sensor, or optical sensor). The working member can be dropped into the line of action of the sensor and the tool can detect the position of the working member when the working member breaks the beam. In some cases, the axis of the beam can be pre-calibrated relative to the coordinate frame of the tool. However, it may be challenging to accurately detect the tip position with this technique based on the tip geometry (e.g., if the tip shape is not flat across).

The tool can determine the proximity of the tool tip to the working surface using a capacitive sensor or an electromagnetic sensor. For example, the electromagnetic sensor can sense or detect a change in inductance of a sensing coil in the proximity to the tool tip or working member that includes metal by sensing eddy currents induced in the metal.

Another approach is to use a vision camera aimed at the tool to determine the position of the working member or tool tip. The vision camera can be pre-calibrated to the tool coordinate frame to detect the tool tip. In some cases, the vision camera can include a linear charge coupled device (CCD) sensor or other image sensor. A linear CCD sensor may use less processing than a vision camera to detect the tool tip.

The tool can measure the tool diameter using one or of these techniques. The tool can shift the tool tip around while measuring or determining the position of the tool tip. By shifting the tool tip, the tool can use a single break-beam sensor to detect tool diameter by passing the tool left-to-right through the sensor. The lateral motion of the tool can cause a first break and then unobstruct the beam to provide a measure of the tool diameter. Since router bits can have helical flutes, the tool can perform multiple measurements along the length of the tool to determine the diameter. The tool can determine the diameter using eddy currents or capacitive sensing with a one-dimensional sensor to gather multi-dimensional information about the tool geometry by correlating the sensor data to the tool position. The tool can determine additional information about the tool tip such as tip angle in the case of a v-cutting bit. Furthermore, the tool can include a vision camera to detect geometric properties of the tool.

The tool can measure the geometry of the work surface by correlating the tool tip position with device position on the plane of the work surface. To do so, the tool (e.g., a cylindrical tool with a conical or spherical tip) can first be related to the reference frame of the tool by detecting the position of the tool tip. Once the position of the tool tip is known relative to the tool's reference frame, the tool can be positioned laterally over a surface of interest (e.g., working surface) to determine the vertical position of the working surface. The vertical position of the working surface can refer to a recess, cavity, indent, or concave portion in a piece of wood whose depth is of interest. The tool tip can then be inserted, extended, lowered, plunged otherwise moved until the tool tip contacts the bottom of the recess. The additional displacement of the tool tip beyond the top portion of the surface where the tool tip first contacted the work surface indicates the depth of the recess. If the surface profile of the recess was of interest, the tool might be moved around the recess to multiple points. The tool can determine, at each of the multiple points, the depth. The tool can record both the depth and lateral position of the tool (e.g., x, y, and z coordinates, where x and y coordinates can refer to the lateral position and the z coordinate can refer to the depth). The lateral motion could be accomplished automatically using a built-in positioning stage, or performed manually by the user, or a combination of both.

Another potential application could be to find the center position of holes on a work surface. A tool with a conical tip can be fitted into the device. The tool can then be positioned approximately (e.g., within 5%, 10%, 15%, 20%, 25%, 30%, 50%, 75%, or 90% of the diameter of the hole) over the center of the hole, and plunged until the tip contacts the circle of the hole. Because the tool tip can be conical, the tool tip can cause the tool to center over the hole. The tool can then determine the lateral position (e.g., x and y coordinates) using, for example, a vision system to ascertain the position of the hole.

The tool can determine a thickness of a working surface or other piece of material. Using the determined thickness of the working surface, the tool can automatically set cutting depths or update cutting paths that may be dependent on the material thickness (e.g., a box joint where the length of the fingers are to correspond to the thickness of the mating material). The tool can determine or measure the thickness of the material hang or place the tool or portion thereof over an edge of the working surface or material, and then extend the tool tip until it contacts the surface supporting the material. The depth the tool tip extends beyond the top of the work surface in order to contact the surface supporting the working surface can indicate the thickness of the working surface.

The tool can determine a location of the tool or tool tip relative to a surface of a working material using location markers that may include contour trees, binary images, fiducial markers, or dominoes. The present disclosure facilitates directing and extracting dust away from a portion of the tool by generating airflow that directs the dust via one or more channels in a portion of the tool. The present disclosure facilitates determining a height of the tip of the tool using force sensors that detect a reduction in force when the tip of the tool touches the material.

With the determined information, the tool can be configured to guide a working member of the tool to perform a task on a target material (e.g., working surface). In some embodiments, a system may automatically guide a tool to perform the task. For example, in some embodiments, the present disclosure provides a handheld system that can identify the location of a tool, or a rig that contains a tool, relative to the material being worked. In some embodiments, the device may be non-handheld; e.g., the device may be on a movable platform such as a remote control platform, robotic platform, or another type of movable platform that may or may not be controllable. The system may adjust the location of the tool (or provide instructions for the adjustment of the location of the tool) based on or responsive to the current location of the tool and a desired location corresponding to a design plan. In some embodiments, the system includes a handheld device with a working instrument capable of being operated by hand which can make precision adjustments of the working instrument location based on spatial location to provide an accurate path which the working instrument travels.

In some embodiments, systems and methods disclosed herein can include a location detection system or perform one or more location detection techniques that can detect the current location or position of a tool on a target material accurately, robustly, or with low latency. For example, a video or sill image camera coupled to the tool and accompanying control circuitry may be used to scan the surface of the material and process the scanned data or scanned image data to generate a digital map of the surface of the material in advance of performing a task on the material. When the tool is brought near the surface of the material during performance of a task on the material, the camera may take a second image and compare the second image with the digital map to detect a location of the tool relative to the material.

In some embodiments, various location detection techniques may be used including, e.g., integrating wireless position sensing technologies, such as RF, near field communication, Bluetooth, laser tracking and sensing, or other suitable methods for determining the position of the tool and facilitating guiding or adjusting the position of the tool to perform a task. In some embodiments, the system may include a hybrid location detection system that employs two or more location detection techniques to determine the location of the tool. For example, each location detection technique may include orthogonal strengths and weaknesses, but when combined, can detect a location with high accuracy and low latency. For example, a first location detection technique may be high accuracy but low frequency (e.g., a sensor configured to obtain data once per second that accurately determines the position but has high latency). The first location detection technique may be combined with a second location technique that includes a sensor that provides location information with high frequency and high accuracy but provides limited information (e.g., an optical mouse sensor that is high frequency and high accuracy but only provides dead reckoning including direction and speed of movement rather than the location of the tool in a global context). In an illustrative example, the hybrid location system may use a camera to obtain an image to determine a position of the tool on the surface of the material accurately, and then use an optical mouse sensor to track the change of the position until the next frame of the image comes in. In this example, the second location technique using the optical mouse sensor may not provide all location tracking because integrating velocity to determine a position may accumulate error over time, or the device would not be able to determine a location if the device was picked up and put it down at a different position.

In some embodiments, to generate the map in advance of the cutting or drawing operation, a user may sweep the surface of a material with a camera until the camera has obtained images of all, substantially all, or a portion of the surface of the material or desired portion thereof. The system may obtain these images and stitch the images together to produce a cohesive map. Generating the digital map image and detecting the location may include one or more image processing techniques, pattern recognition techniques, localization techniques, computer vision techniques, for example. For example, the system may identify that points A and B in a first image correspond to point C and D in a second image and accordingly stitch the two images. For example, on a wood surface, the system may identify variations, bright spots, color variations, marks, fiduciary markers, binarized images, or wood grains in the image and compare them with the digital map to determine a location. In another example, the system may further use corners, sides, lighting patterns, or other signal capable of identifying a location.

The material can be marked to facilitate mapping of the surface of the material or detection of a position of the tool on or proximate to the material. For example, the surface of a material, such as metal or plastic, may not contain sufficient identifying marks to accurately detect location. Distinguishing marks or markers can be added to the material to facilitate location detection techniques such as pattern recognition or image processing. The markers can include any type of material, ink, tape, light, laser, carving, engraving, temperature gradient, invisible ink (e.g., ink only visible under ultraviolet or other wavelengths of light) capable of facilitating a location detection technique. In some embodiments, the marker includes a tape that can be applied to at least a portion of the surface of the target material. The tape may include symbols such as a unique barcode, design, pattern, colors, engravings, raised bumps or depressions, for example. In some embodiments, the marker may include a user randomly marking on the target material with a pen, pencil, ink, invisible ink, paint, crayons, or any other marking or writing instrument.

In addition to generating a digital image of the surface of the material, in some embodiments, the system may identify a cutting or drawing design plan on the surface of the material. A design plan may include any cutting or drawing a user of the system desires. For example, the design plan may include a freehand design, tracing, picture, image, design generated using computer-aided design ("CAD") software, purchased design, or a purchased electronic design. The design plan can be a design of an object that the tool can create by performing an operation on the material, such as a design for a table that can be cut from at least one piece of wood.

The system can incorporate the design plan with the map image or otherwise relate the design plan with a map of the surface of the material or overlay the design plan on the map image. In some embodiments, the design plan may be drawn on the surface of the material before or after generating the initial map of the material (e.g., using a special pen whose ink can be detected by the system using ultraviolet or other wavelengths). If, for example, the surface of the material includes a design (e.g., a cutting design or drawing design) during the initial mapping phase, the system may process the image to identify the design plan and include it in the digital map of the surface of the material. If the design is drawn or otherwise marked on the surface of the material after generating the initial map, the system may obtain images of the material with the design by using the camera to rescan or take new images of the material. If the design is drawn or otherwise marked on the surface of the material before generating the initial map, the system may identify the design as a cutting or drawing design plan or a user may indicate to the system that the identified design is a cutting or drawing design plan.

In some embodiments, a digital design may be added to digital map of the surface of the material without physically adding the design to the surface of the material or otherwise marking the actual material with a design. For example, the digital design may be generated on a computer and may include a CAD drawing or any other type of drawing (e.g., JPEG, BMP, or GIF). Using CAD software, for example, a user may modify the map image by adding the design plan. Any other suitable software may be used to incorporate a design plan onto the map image or otherwise relate a design plan with a map of the surface of the material (e.g., data that indicates a location of the design plan used to facilitate the performance of a task on a material). After registering the design on the digital map or digital map image, the system may provide the corresponding digital map data or digital image data with the design plan to the tool. In some embodiments, the system may display the map image with the design on a display device of the tool to facilitate a user performing a task on the material. In some embodiments, the tool may perform the task in accordance with the design plan without displaying the design plan (e.g., the tool may automatically perform an aspect of the task or the tool may not include a display device).

During the cutting or drawing operation, a user may place the tool on or near the surface of the material. Upon placing the tool on the surface, the camera may re-scan or take an image of a portion of the surface of the material. The image may correspond to a portion of the material that is at a location different from the cutting or drawing tool. The system may determine the location of the tool relative to the surface of the material or the design plan by comparing identifying marks in the new image with identifying marks in the map image generated in advance of the performance of the task on the material. The camera may be mounted or otherwise coupled to the tool such that image capturing aspect of the camera (e.g., lens) is directed on the surface of the material at a fixed and known vector from the cutting tool (e.g., drill bit). By focusing the camera away from the cutting tool, the system may obtain images that are relatively clear of debris caused by cutting that may obfuscate the markers used for detecting a location.

The system may compare the new images with the digital map of the surface of the material to determine a precise location of the tool. For example, the portion of the digital map corresponding to the top right corner may include a set of identifying marks. Upon obtaining the new image, the system may identify those same identifying marks and determine that those marks correspond to the top right corner of the map image. The system may then determine, based on the camera vector offset, the precise position of the cutting or drawing tool.

In some embodiments, the system may display, in real time, the precise position of the cutting or drawing tool on a display device (e.g., a display device of a tool or a remote display device communicatively coupled to the system or tool). The system may indicate the position on the display via an "X", circle, dot, icon, or using any other indication to signal a current position of the tool. In some embodiments, the tool may overlay the indication of the current position on the design plan or cutting path (e.g., a predetermined path). In some embodiments, the tool may overlay the indication of the current position on the map image. In some embodiments, the tool may overlay the indication of the current position on the map image that includes an overlay of the design plan.

In some embodiments, the system may include a positioning system that adjusts or moves the tool based on a detected location of the tool and a design plan. In some embodiments, the system can use various location detection techniques to detect the location of the tool, and use various positioning techniques to move or adjust the location of the tool. For example, the system can include a hybrid positioning system that includes two or more positioning systems to position a tool. Upon determining the location of the tool and a desired location for the tool, the first positioning system may be configured to move, adjust, or position the tool over a relatively large range (e.g., move the tool to anywhere on the work area or surface of the material), but with relatively low accuracy. The second positioning system may be configured to move, adjust, or position the tool over a relatively short range (e.g., within a radius of 5 inches of the current location of the tool), but with high accuracy. In some embodiments, the first (e.g., coarse or rough) positioning system may include a human positioning a tool on the surface of a material, and the second (e.g., fine or precise) positioning system may include positioning the tool using servo motors, stepper motors, actuation mechanisms, or eccentrics, for example. The first positioning system can include non-human positioning systems such as, e.g., robotic systems, remote control systems, or Global Positioning System ("GPS") enabled devices.

For example, the first positioning system may include a long-range, low-accuracy positioning mechanism that is configured to move, adjust or correct the position of the tool based on the design plan. The second positioning system may include a short-range, high-accuracy positioning mechanism that can move, adjust or correct the position of the tool, within a maximum range, more precisely than the first positioning mechanism based on the design. In an illustrative and non-limiting example, the first positioning system may include, e.g., a maximum range that includes the range of the entire work area (e.g., the area comprising the surface of the material on which the task is to be performed), and include an accuracy of +/−0.25". The second positioning system may include, e.g., a maximum range of 0.5", with an accuracy of +/−0.01". The maximum ranges and accuracy of the first and second positioning systems may include other range and accuracy values that facilitate systems and methods of hybrid positioning. In various embodiments, range and accuracy may refer to one-dimensional accuracy (e.g., along an X-axis), two-dimensional accuracy (e.g., X-Y axes) or three-dimensional accuracy (e.g., X-Y-Z axes).

The first positioning system may be less accurate and include a positioning system where the maximum range is substantially greater than the maximum range of the second. For example, the first positioning system can move the tool from anywhere on the surface of the material to within +/−0.25 inches of a desired location, while the second positioning system can be configured to move the tool up to 5 inches from a current position, but with an accuracy of 0.01 inches. In some embodiments, the hybrid positioning system may include a plurality of positioning systems that are each configured to accurately determine a location and then position the tool to within a certain distance range such that, when the positioning systems are used together, the system can precisely determine a location and position or adjust the tool accordingly. In some embodiments, the maximum range of each subsequent positioning system may be equal to or greater than the accuracy of the previous positioning system. In an illustrative example, a first positioning system may be able to position the tool on the surface of the material with, e.g., a maximum range corresponding to the size of the surface of the material, and with an accuracy of +/−1 inch. A second positioning system may be able to position the tool on the surface of the material within a maximum of range of 2 inches with an accuracy of +/−0.1 inch. A third positioning system may be able to position the tool anywhere within a maximum range of 0.2 inches with an accuracy of +/−0.01 inch. Therefore, in this example, by using all three positioning systems together, the hybrid positioning system can precisely position the tool within a maximum range that includes the entire surface of the material or work area with an accuracy of +/−0.01 inch.

In some embodiments, the system may include automatic adjustment, guiding or error correction to facilitate performing a task in accordance with a design plan. The system may use various types of adjustment, guiding or correction mechanisms, including, e.g., eccentrics, servomechanisms, stepper motors, control loops, feedback loops, actuators, nut and bolt-type mechanisms. For example, the system may include eccentrics or servomotors coupled to a frame and the cutting tool configured to adjust the position of the cutting tool relative to the frame. Upon determining the current position of the cutting tool, the system may compare the current position with the desired position. The system may then guide the tool in accordance with the design plan. In some embodiments, when the system determines there is a discrepancy between the current position and the desired position, or the current position or trajectory deviates from the design plan, the system may adjust the cutting tool in accordance with the design plan. For example, the system may identify a cutting path or vector of the tool and the design plan and adjust the cutting tool such that the next cut is in accordance with the design plan.

The system may utilize various automatic correction mechanisms. In some embodiments, the system may include eccentrics configured to adjust the position of the cutting tool. For example, using two eccentrics, the system may adjust the position of the cutting tool in two dimensions. Eccentrics may include any circular widget rotating asymmetrically about an axis. For example, an eccentric may include a circle rotating about non-central axis. The eccentrics may be coupled to the cutting tool and the frame and be configured to adjust the position of the cutting tool relative to the frame, which may adjust the position of the cutting tool relative to the surface of the material. In some embodiments, the system may utilize a screw with a nut to change rotational motion to linear displacement to correct or adjust tool positioning.

In some embodiments, the system may include orientation control based on the type of cutting tool. For example, if the cutting tool is a saber saw that cannot be adjusted perpendicularly, the system may adjust the orientation or angle of the saber saw in accordance with a design plan. They system may include actuators configured to adjust the tilt or angle of the saw.

The system can control the z-axis of the cutting or drawing tool. The system can determine the position of the tip of the cutting tool relative to the work surface. By controlling the z-axis (e.g., an axis that is substantially orthogonal to a surface of the material; an axis that is vertical; an axis that is parallel to an axis along which the working member is lowered or raised to or from the surface of the working member or cutting tool) of the cutting or drawing tool, the system may start and stop cutting or drawing in accordance with a design plan. For example, if the cutting tool is beyond a correctable distance away from the design plan (e.g., outside the radius of automatic compensation), the system may stop the cutting by adjusting the z-axis position of the cutting tool (e.g., lifting the drill bit off the wood). When the user brings the cutting tool back to within the radius of automatic adjustment, the system may automatically adjust the z-axis position of the cutting tool such that cutting commences again (e.g., lowers the drill bit into the wood). The radius or range of compensation may correspond to a positioning system of the localization system. For example, if the localization system includes a hybrid positioning system that includes a large range and short range positioning system, the radius of compensation may correspond to the short range positioning system. In some embodiments, controlling the z-axis position of the tool may facilitate making 2.5 dimension designs. For example, a design plan may indicate z-axis information corresponding to the surface of the material. Thus, the system can use a determined z-axis position of the working member or cutting tool or tip thereof to control a motor to move the working member to a second location or position (e.g., x, y, or z axis position).

In some embodiments, the system may indicate to the user that the cutting tool is on the design path (e.g., a predetermined path) or within the range of compensation such that the system may correct the position of the cutting tool. In some embodiments, the system may indicate to the user that the cutting is not on the design path or not within the range of compensation. The system may further indicate to the user to correct the position of the cutting tool or a direction in which to move the cutting tool to bring it on the design path or within the range of compensation. The system may provide one or more indication visually via the display device, using light emitting diodes or other light sources, audio signal, beeps, chirps, or vibrations. In some embodiments, an indication that the tool is deviating from the design path beyond an acceptable range may include automatically shutting off the cutting machine or adjusting the z-axis of the cutting or drawing tool such that it stops performing a task on the material. In some embodiments, the system may indicate the design path on the material of the surface itself by, e.g., shining a beam of light indicating to the user where the design path is and where to proceed. For example, upon determining the error, the system may shine a beam indicating to the user how much to adjust to the tool in order to bring the position of the tool to within the range of automatic compensation or on the design path.

In some embodiments, a plurality of cutting or drawing tools may be used with the system including, e.g., saber saw, jig saw, router, or drill. The system may be configured such that users may use various aspects of the present disclosure with various cutting or drawing tools without making any adjustments to the tool or minor/temporary adjustments. For example, the system may include a frame, camera, display device, and computing device. The frame may be configured such that a cutting tool may be placed in the frame. The camera may be coupled to the frame or may be attached to the cutting tool. Upon placing the camera, the system may automatically or manually be calibrated such that the system obtains the vector offset between the camera and the cutting or drawing tool (e.g., the drill bit).

In some embodiments, the system may include a freestanding device configured to perform mapping and localization functions and indicate to a user the current position of the device. In some embodiments, the freestanding device may be attached to a cutting tool or drawing tool. In some embodiments, the freestanding device may not provide automatic correction functionality. In some embodiments, the freestanding device may include a display or a camera. In some embodiments, the freestanding device may determine a design path and detect when the tool is off the design path. The freestanding device may indicate the error by, for example, the display, shining a light on the surface of the material, audio signals, or voice narration.

Referring to FIG. 1, an illustrative example of an embodiment of an apparatus for guiding tools to perform a task is shown. In some embodiments, the device includes a frame and a tool (e.g., a router in the example of FIG. 1) mounted within the frame. The frame may be positioned manually by the user. The device can adjust the position of the tool within the frame to guide or adjust the tool in accordance with a design plan or to correct for error in the user's coarse positioning. The device may also include a display and be configured to map the target material and display it on the display. In some embodiments, markers on the target material (e.g., stickers) may facilitate generating a map of the target material by providing differentiating features. The device may obtain a design or plan by downloading it from an online store. The device may display a map of the target material with the design that indicates the desired cutting pattern.

Figure 2:
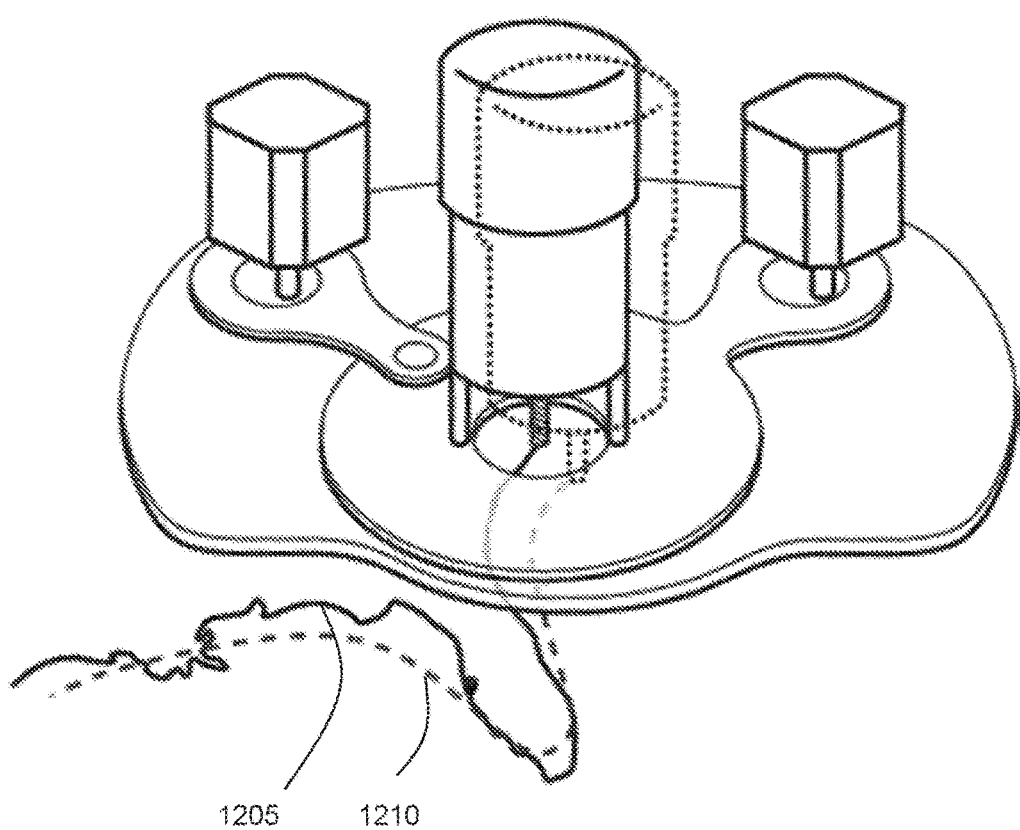
FIG. 2 is an illustrative example of an embodiment of an apparatus for automatically guiding tools following a target path area and performing a task according to a planned design.

Referring to FIG. 2, an illustrative example of an apparatus for automatically guiding tools following a target path area and performing a task according to a planned design is shown. In some embodiments, to follow a complex path, the user of the device may need to only move the frame in a rough approximation of the path. In this example, the dotted line shows the path that the tool would take if its position were not adjusted; the solid line is its actual path, e.g., an outline of the southeastern United States. In this example, the user can grip the frame and guide the tool generally along the dashed line, and the tool can self-adjust to cut along the solid line. In some embodiments, the device automatically adjusts the drill bit or other cutting tool based on the position of the cutting tool (e.g., one or more of an x-axis position, y-axis position, or z-axis position) and the desired position of the cutting tool. The x-axis and y-axis can intersect to form an x-y plane that is substantially parallel (e.g., within 45 degrees) to the surface of the material, while the z-axis is substantially perpendicular (e.g., 45 degrees of being perpendicular) or orthogonal to the horizontal plane formed by the x-y axis. In some embodiments, the user of the device may move the device along the dotted line 1210 in FIG. 2 (or the path 406 of FIG. 23), while the device automatically adjusts the cutting tool (e.g., an x, y or z position) in accordance with the desired design plan, such as the design plan 1205 of FIG. 2 For example, the device may identify or detect the current position of the cutting tool relative to the target surface with the design. The device may then compare the current position with the desired position of a design or map and adjust the cutting tool. For example, if the working member or cutting tool tip is determined to be 1 inch above the surface of the material, the system can determine to lower the cutting member tip to contact the surface of the material. In another example, if the design indicates to drill a whole 0.5 inches deep into the material, then the system can determine the z-axis position of the tip and insert the tip 0.5 inches into the material based on the determined z-axis position. For example, the system can instruct a motor to extend the working member or cutting tool 0.5 inches beyond the surface of the material.

Figure 3:
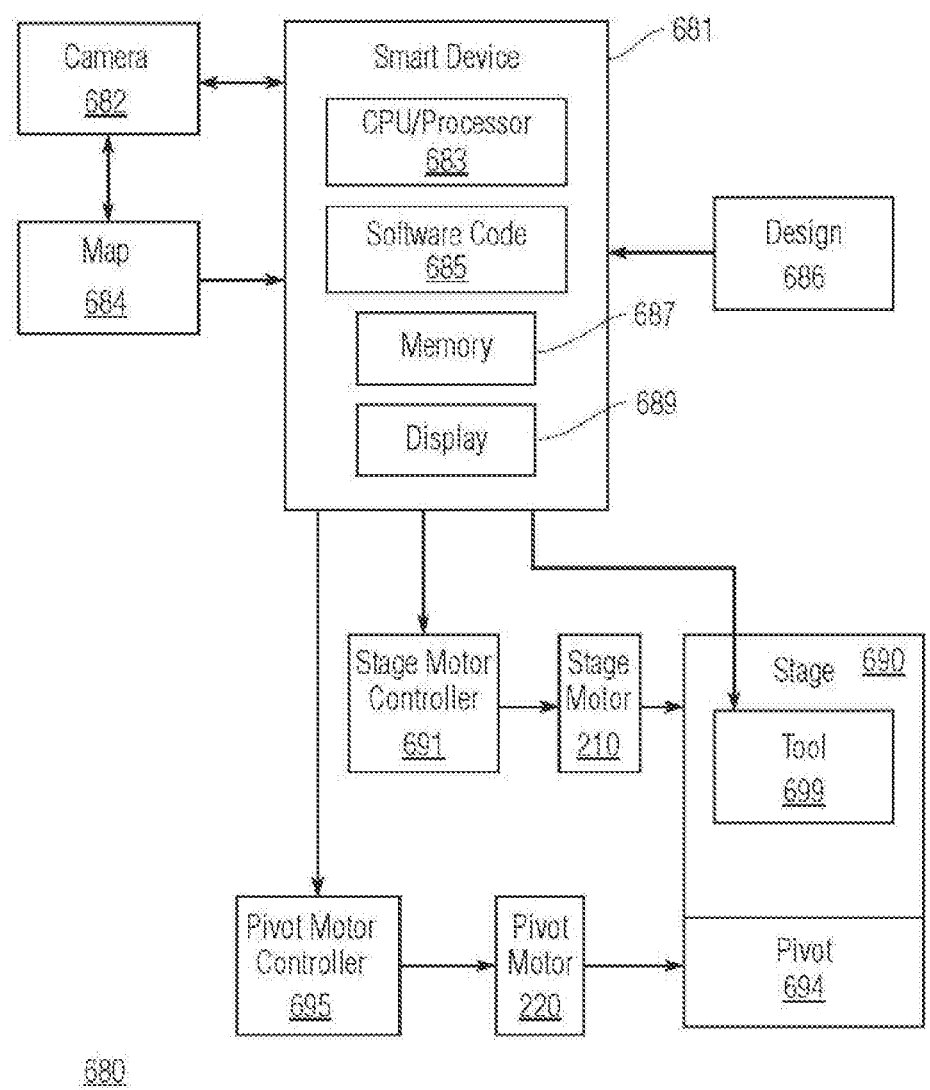
FIG. 3 is an illustrative block diagram of an embodiment of a system for automatically guiding tools.

Referring to FIG. 3, an illustrative block diagram of an embodiment of a system for automatically guiding tools is shown. In some embodiments, the system 680 includes a smart device 681. The smart device 681 may include at least one central processing unit ("CPU") or processor 683, and may include software code 685 that performs one or more processes, at least on memory 687, or at least one display 689. The smart device 681 may include a self-contained unit or the smart device 681 may include components that are not self-contained or separated. For example, the display 689 may be tethered to the smart device 681 or integrated into the housing of the smart device 681. In some embodiments, the smart device 681 may be integrated as part of the system 680 so that the system is a self-contained portable unit.

In various embodiments, the system 680 can include one or more sensors to facilitate determining a location of the tool (e.g., IR, lasers, ultrasonic range finding, etc.). For example, and in some embodiments, the system 680 can include a camera 682 that can be used in combination with the smart device 681 to build a map 684 of the material to be worked on. The camera 682 may be coupled or attached to any tool 699 to provide positioning for that tool 699. In some embodiments, the camera 682 is coupled with a display 689 and CPU 683. For example, the camera 682 may be part of a computer or smart device 681 that can be attached or coupled to any tool 699. A software application or code 685 can be installed on a mobile smartphone and can utilize the camera, CPU, memory, and display of the smartphone. In some embodiments, one or more aspect of the software or processing may be performed by a field programmable array device ("FPGA") or a digital signal processor ("DSP").

In some embodiments, the camera 682 can take images with a high-frame rate. For example, the camera can scan the surface of the material to obtain scanned data or scanned image data. In some embodiments, the camera may scan the surface of the material and a processor can process the scan to generate scanned data that indicates a map of the surface of the material. This may facilitate location functions or mapping functions disclosed herein. The camera 682 can also take images with a relatively low-frame rate and the camera 682 can be coupled with one or more optical sensors (e.g., sensors in optical computer mice). The optical sensors may provide low-latency dead reckoning information. These optical sensors may be used in conjunction with the camera 682. For example, the camera 682 may provide accurate global position information a few times a second and appreciable lag, and the optical sensors may be used to provide dead-reckoning information with low lag that fills in the time since the last image was taken. In some embodiments, accelerometers may be used for dead-reckoning. The system 100 may use multiple cameras to increase the accuracy or range of coverage when scanning, or to provide depth information.

In some embodiments, the system 100 is configured to build, generate or otherwise receive a map 684. In some embodiments, the map 684 may be built using computer vision ("CV") or sensors techniques. For example, a CV technique may be used to build a photo mosaic. A photo mosaic process may include taking multiple photographs of different parts of the same object and stitching at least two of the photographs together to make at least one overall image covering the entire object.

In some embodiments, the system 680 or processor may be configured to evaluate the scanned data using a technique that includes simultaneous localization and mapping ("SLAM"). SLAM may include using a sensor that is communicatively coupled with a processor 683 and related software 685 to build a map 684 of the material being worked on (or "target material") while determining (e.g., simultaneously) the location of the tool 699 relative to the map 684. For example, after building at least a portion of the map, a camera 682 may capture images of the material being worked. The images may be fed to and processed by the smart device 681 to determine the location of the tool 699 or rig. The system 680 may analyze the captured images based on the map 684 to determine the location (e.g., geo location) of the camera 681 relative to the material. Upon determining the location of the camera 682, in some embodiments, the system 680 may identify that the location of the rig is a known or determinable offset from the position of the camera 682, which may be rigidly attached to the rig.

Various embodiments may use various other location processing and determining technologies including, e.g., integrating wireless position sensing technologies, such as RF, near field communication, Bluetooth, laser tracking and sensing, or other suitable methods for determining the position of the tool 699 on top of the work piece. For example, ultrasonic, IR range finding, or lasers can be used to detect the location of the tool relative to a work area or surface of a material. The detected location of the tool can be provided to any other component of the system 680 to facilitate guiding or adjusting the position of the tool in accordance with an embodiment.

In some embodiments, the system 680 may be configured to compute the location of the tool 699 relative to the rig using the current orientations of the motor shafts. For example, the system 680 may identify the orientations of the motor shafts by homing them and then tracking one or more acts taken since the homing process. In some embodiments, the system 680 may use encoders could be used instead of homing as the encoders would be able to tell the orientations of the shafts directly. Through the offsets and calculations, the system 680 can identify the location of the tool 699 or rig relative to the material being worked on. The captured images that can be analyzed against the map 684 may include, e.g., characteristics of the material such as wood grains and deformations or may include markers placed on the material. Various aspects of the mapping and location technology will be described in more detail below.

In some embodiments, the system 680 may receive a design 686 or template. For example, the smart device 681 may be configured to receive the design 686 or template from a user of the system 680. The smart device 681 may include or have access to various input/output devices configured to receive the design 686. In some embodiments, the system 680 may receive the design 686 via a network. In some embodiments, the user or system 680 may modify or adjust the design 686 based on the map 684. For example, a user may adjust the size of the design 686 relative to the map 684 of the material in order to generate a desired working path on the material being worked on. In some embodiments, the system 680 may automatically adjust or optimize the size of the design based on the dimensions of the material.

The network may include computer networks such as the Internet, local, metro, or wide area networks, intranets, and other communication networks such as mobile telephone networks. The network can be used to access web pages, online stores, computers or data of a retail store that can be displayed on or used by at least one user device, system 680, or system 100, such as, e.g., a laptop, desktop, tablet, personal digital assistants, smart phones, or portable computers.

The system 680 may be configured to create, capture, or load designs 686 in a plurality of ways. In some embodiments, designs may be downloaded or otherwise obtained. For example, a user may generate a design on a computing device and transfer or otherwise convey the design to the system 680. In another example, the system 680 may receive the design from a third party entity. For example, a user may purchase a design online via a network and upload the design to the smart device or computer 681. In some embodiments, the system 680 may facilitate capturing a map of the surface and also of the design 686 on that surface. This may facilitate setting up the system 680 to follow a specific line or to show the user an image of the surface of the material underneath a large tool that obstructs sight, or to show the surface with a drawn plan in a pristine state before it is covered with debris or the surface on which the plan is drawn is cut away. In some embodiments, the design 686 could be designed, altered, or manipulated from its original form on the device 681 through a menu driven interface allowing the user to input distances, angles, and shapes or to free hand a drawing on a touch sensitive pad or display.

In some embodiments, while a user moves the system or rig 680 along the target material, the smart device 681 processes the captured images from the camera 682, determines the location of the rig 680, or provides a desired path to the user on display 689. Once the user has placed the rig 680 close to the desired path, the rig or system 680 may automatically adjust the position of the tool 699 to achieve the desired working path in accordance with the loaded design 686. The term "rig" and "system" may be used interchangeably as described herein. In some implementations, the rig includes the physical device and its attachments, and the system includes the physical device, its attachments, and related technology and software code embedded or included in some of the physical elements.

In some embodiments, the system 100 builds the map 684 based on images captured by the camera along an arbitrary path of the target material until the entire area of interest has been covered. For example, a user may sweep the camera 300 in an arbitrary path over the surface of the material until the entire area of interest has been covered. In some embodiments, the system 100 can be configured such that the camera 682 can be removed from the rig 100 to sweep or pass over an area of the material. The system 100 may stitch together the images obtained by the camera 682. For example, the system 100 may use an image mosaic software code 685 to form a cohesive map 684 of the area of interest of the surface of the material. The system 100 may store the map 684 in memory 687. Upon receiving an image taken by the camera 682 of mapped material, the system 100 can compare the image with the map 684 held in memory 687 and may further determine a position and orientation. For example, the system 100 may determine, based on the comparison, the position of the tool, drill, system, cutting member, stage, or rig.

In some embodiments, the system 680 may allow a user to create and load a design 686 after the map 684 has been assembled. For example, after the map 684 has been assembled on the smart device 681 (such as a computer), the user may create a design 686 on the computer by plotting it directly on the generated map 684. For example, the user may mark positions on a piece of wood where a drill hole is desired. The techniques and features of the software code 685 (include computer aided design and manufacturing) can be employed to create a design with accurate measurements. Then, when the user returns to the material, the position of the camera 682 on the map 684 may be displayed on a screen or display 689 to the user, with the design plan 686 overlaid on the map 684. For example, the system 680 can display on the display device a map image overlaid with an indication of a position (e.g., position of the sensor, device, cutting tool or drawing tool) relative to the surface of the material. In some embodiments, the system 680 may identify the geo location of the tool relative to the map. For example, the camera 682 may be attached to a drill and used to determine the position of the drill exactly relative to target drill locations specified in the design 686, facilitating the user to line up the drill more precisely.

In some embodiments, the system 680 is configured to build the map and track the camera's position using visual features of the target material. In some embodiments, the software 685 includes instructions to build the map and track the camera's position using visible features of the material such as grains, imperfections, or marks. The target material may be altered to facilitate mapping and tracking functions. For example, solid colored plastic may be too undifferentiated for the system 680 to effectively map or track. Therefore, a user may, e.g., alter the material surface in some way to add features that can be tracked. In another example, the system 680 may instruct a marker to arbitrarily add features that can be tracked. For example, features that may be added may include ink to the material that is typically invisible, but which can be seen either in a nonvisible spectrum or in the visible spectrum when UV or other light is applied, allowing the camera to track the pattern of the invisible ink while not showing any visible markings once the work is done. In some embodiments, the user may apply stickers with markers which can later be removed. Features could also be projected onto the material such as with a projector. Or, if the user will later paint over the material or for other reasons does not care about the appearance of the material, the user could simply mark up the material with a pencil or marker.

In some embodiments, the marker tape or stickers may include a unique sequence of barcodes over the entire length of the tape. In some embodiments, the marker tape may be thin such that the device may pass over the marker tape without getting stuck or disturbed. In some embodiments, the tape may be designed and constructed such that it will stay down as the device moves over the tape, but can also be easily taken off upon completion of the project. Marker tape materials may include, for example, vinyl or any other suitable material.

In cases where the camera cannot track the material, or cannot do so accurately enough, or the material is unsuitable for tracking (e.g. due to an uneven surface), or any other reason that prevents the camera tracking the surface directly, the camera may track other markers off of the material. For example, the user may put walls above, below, or around the sides of the material being worked on that have specific features or marks. The features or marks on the surrounding surfaces may enable the camera to determine its position on or relative to the material. In various embodiments, different types of positioning technology or devices may be used to locate the tool 699 or stage 690, possibly in conjunction with a camera 682 that is used mainly for recording the visual appearance of the material without needing to perform the tracking function. Positioning technology may include, e.g., ultrasonic, IR range finding, or lasers, for example.

The system 680 can adjust the precise location of the tool 699 by adjusting the geo location of the stage 690 or a moveable platform to which the tool 699 is attached. The stage 690 may be connected to an eccentric coupled to a motor shaft. As the motor shaft moves in a circular path the eccentric moves the stage 690 in complex arcs and paths. A pivot 694 may be connected to the stage and is also connected to an eccentric coupled to a second or pivot motor shaft. The pivot 694 may be configured to pull or push the stage 690 to achieve controlled movement of the stage within a 360 degree range. By controlling the rotation of the eccentrics, the system 680 may position the stage in almost any XY position in the range.

In some embodiments, the system 680 uses a reference lookup table to facilitate guiding the tool. For example, a reference look table may include motor coordinates related to desired stage positions. In some embodiments, the system 680 may compute calculations that can be used to adjust the motors that move the stage 690 and the cutting bit of the tool 699 connected to the stage 690 to the desired location. In some embodiments, the system 680 may move the tool 699 360 degrees in a two dimensional plane by positioning the stage 690 and pivot 694. For example, the cutting instrument of the tool can be moved anywhere within the 360 degree window of the target range 408.

In some embodiments, electric motors may move, position or adjust the stage 690 and pivot 694. A stage motor controller 691 may control the stage motor 210. A pivot motor controller 695 may control the pivot motor 220. The stage motor controller 691 and pivot motor controller 695 may receive information that includes the desired location or coordinates from the smart device 681. Based on the received information, the stage motor controller 691 and pivot motor controller may 695 activate and control their respective motors 210, 220 to place the stage 690 and the pivot 694 in the proper or desired position, thereby positioning the tool in the desired geo location.

In some embodiments, the smart device 681 may communicate with, receive information from, and control the tool 699. For example, the smart device 681 may send instructions to power on or off or increase or reduce speed. In some embodiments, the instructions may signal when to engage the target material by, e.g., adjusting the depth of the tool 699 when the user is close enough to or near the desired path on the material.

Figure 4:
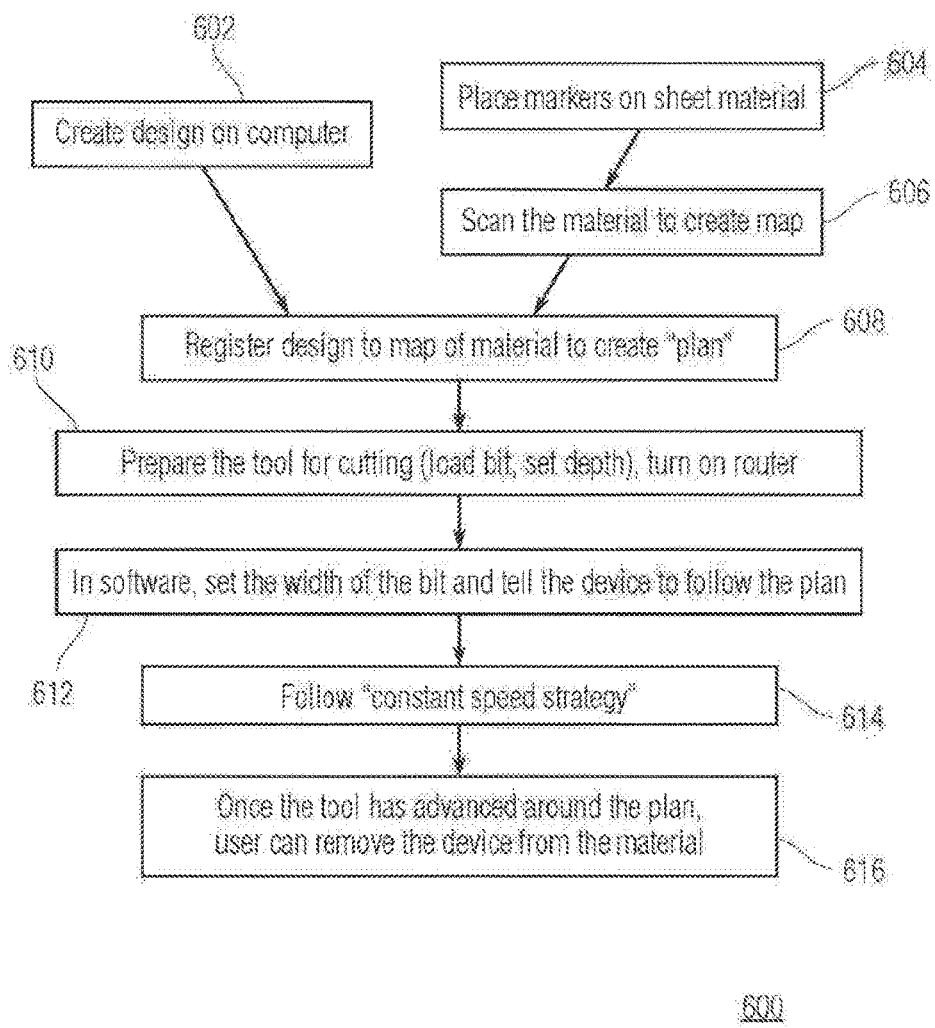
FIG. 4 is an illustrative flow chart of an embodiment of a method for automatically guiding tools.

FIG. 4 provides an illustrative flow chart of an embodiment of a method 600 for performing a task on a target material. For example, the method 600 may facilitate cutting a working surface using a router based embodiment. In some embodiments, at act 602 the user may find or create a design they want to cut out of a material. In some embodiments, the task may include a plurality of tasks (e.g., a first task and a second task that may be a subset of the entire task). For example, the task of cutting the design out of the material may comprise a first task of cutting a first portion of the design and a second task of cutting a second portion of the design. In some embodiments, the first and second task may be substantially similar (e.g., same type of cutting or drawing tool), while in other embodiments the first and second task may differ (e.g., different drill bit or drawing tool, different type of cutting tool, different user device, different area of the material, etc.).

Prior to or subsequent to identifying the design plan, the user may map the surface of the material or sheet of material. If the material has enough markings the user may use the material itself. However, in act 604, if the material has a flat surface or limited markings the user can place markers on the material. Markers may include, e.g., printer marker stickers or other type of suitable indicia capable of being readily identified.

In some embodiments, at act 606, a sensor may scan the material to obtain scanned data. For example, a camera scans the material and the various markers to create the map. The CPU may process the images captured by the sensor or the camera and generate the map or scanned data. The size and shape of the map can be appropriately manipulated to a preferred configuration. In some embodiments, at act 608, the design is registered or otherwise related to the map to create a cutting plan.

In some embodiments, at act 610, the cutting tool is prepared to perform the task. For example, a user may load, adjust, or secure the bit, mount it to the rig and turn the router on. In some embodiments, the system may turn on the router via a software initiated process in response to one or more parameters, including, e.g., motion sensing of a movement of the rig 100 in a particular direction by the user.

In some embodiments, at act 612, the system may receive various settings. For example, the user may set the width of the bit of the cutting tool, the range (e.g., area) of the tool's desired range correction, the size of the cross-hair, or the speed of the cutting tool. Thereafter, instructions may be provided to the software to begin the task.

In some embodiments, at act 614, the rig is placed adjacent to the desired path so that the system can automatically adjust the position of the tool into a starting adjustment range position along the desired path. The user may then follow the constant speed strategy as described herein, for example with regards to FIG. 3. In some embodiments, once the tool has advanced fully around the plan (act 616) the user can remove the device and work product from the material.

Figure 5:
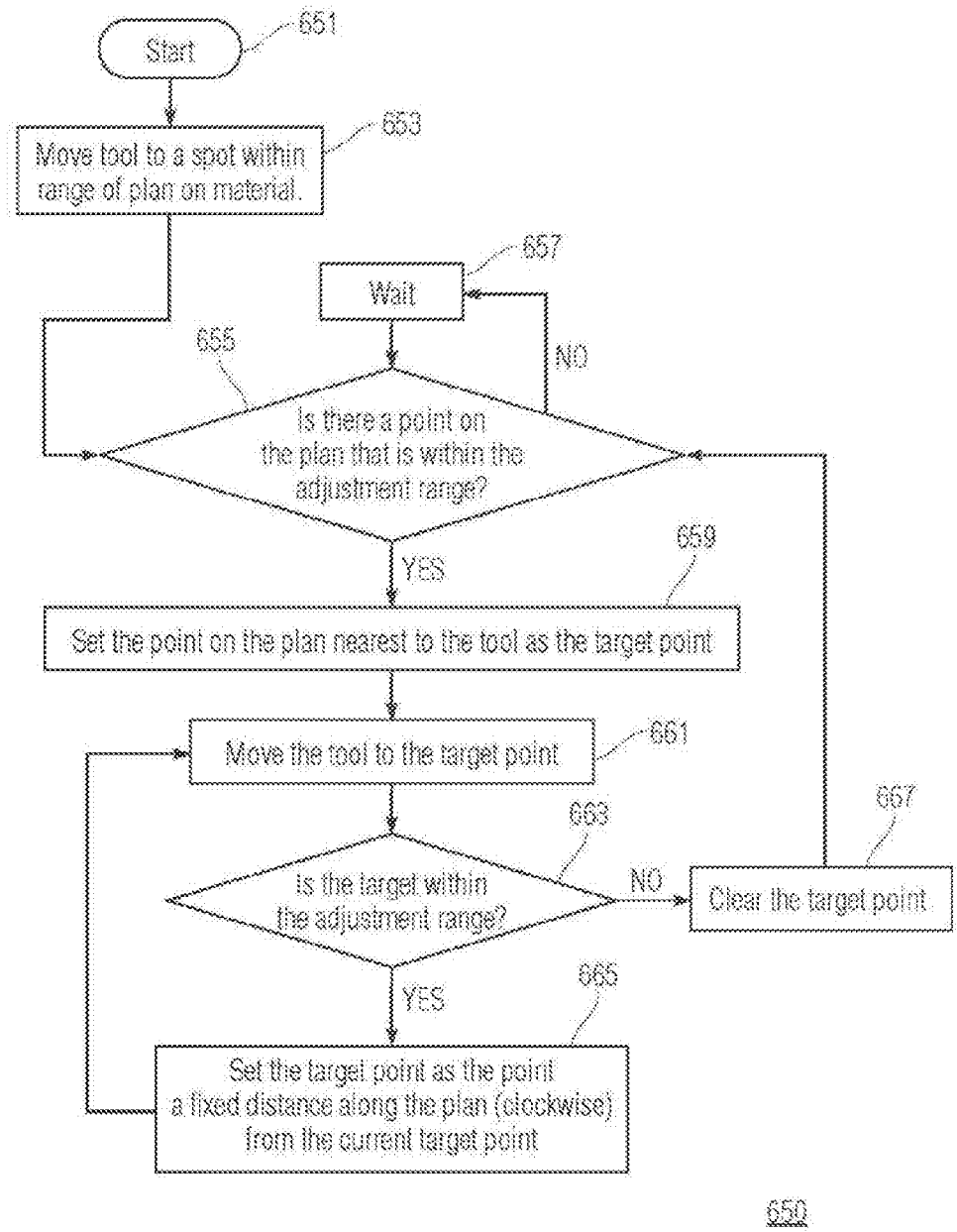
FIG. 5 is an illustrative flow chart of an embodiment of a method for automatically guiding tools.

FIG. 5 shows an illustrative flow chart of an embodiment of a method 650 for the constant speed strategy. The process in FIG. 3 assumes the user already has the router attached to the rig and has mapped their material and loaded up their design. In some embodiments, at act 651, the user starts the process to cut the material. The process can include moving the tool to a spot within the range of plan or path on the material (act 653). For example, a user may move the tool or the tool may be remotely controlled.

In some embodiments, the process includes determining, based on the location of the tool, whether there is a point on the plan within the adjustment range of the rig (act 655). In the event that there is no point within range, the process may include sending a notification (e.g., via the display, audio, vibration, light, or LED) and waiting until the user moves the device within the adjustment range (act 657).

In some embodiments, if there is a point within the adjustment range, the process includes, at act 659, setting the point on the plan nearest to the tool as the target point. In some embodiments, the process may include moving the tool to the target point and cuts the material (act 661).

In some embodiments, the process includes creating a second target by determining if a new target is within the adjust range (act 663). If there is a second target, the process may include setting the second target point as the new target (act 665). The device may continue to move in a clockwise direction, cutting from the old target point to the new target point. In some embodiments, the process may include identifying the next target point within the adjustment range (act 663) while the tool or router is cutting from the old target point to the new target point. For example, the determination of an optimum or desired second target may be continuous, and based on the image, or various images, detected from the camera and processed by the system.

If there is no target point within range, in some embodiments, the process includes clearing the target point (act 667) and starting at act 655 to determine whether there is a point on the plan within the adjustment range. In some embodiments, this process continues until the tool has gone through the all or part of the plan in a particular direction, such as a clockwise direction.

In some embodiments, the mapping phase may be bypassed if the material size is greater than the design. For example, the user may determine a starting point that corresponds with a region on the design (i.e. the top right corner) and the system 800 may start painting the image.

The embodiments discussed herein so far have focused on rigs that accommodate a tool being attached to a stage and the stage is moved or controlled by one or more motors. The linear design depicts a router moved by a motor where the router is connected to a linear stage. In such instances, the router is attached or mounted as a separate unit. However, the system can be designed as one unit where the stage, motors moving the stage, controllers, and all within the same housing and within the same power system as the housing and power of the tool. By way of example, the router housing would be enlarged to fit the stage and motors and might include a display integrated into the housing. Through such an embodiment, the form factor might be improved to look like a one piece tool.

The embodiments presented here are not meant to be exhaustive. Other embodiments using the concepts described herein are possible. In addition, the components in these embodiments may be implemented in a variety of different ways. For example, a linear stage, or a hinge joint, or an electromagnetic slide, or another positioning mechanism may be used to adjust a tool or the stage the tool is on in reaction to its detected position and its intended position.

By way of example, the systems and methods described herein can be used with drills, nail guns, and other tools that operate at a fixed position. In such embodiments, the tool and software could be modified such that the plan includes one or more target points instead of a full design. The device could be moved by the user such that a target position is within the adjustment range. The software could then move the tool to the correct target position. The user could then use the tool to drill a hole, drive in a nail, or perform other operations.

In some embodiments, the tools can facilitate performing a task without providing automatic adjustment. For example, the stage, pivot, motors, and eccentrics could be removed. The tool could be attached to the lower stage housing. The software could be modified such that the plan includes one or more target points. The user could move the device such that the tool is directly over the target position. The user could use the location feedback provided on the display to perform accurate positioning.

In some embodiments, the present disclosure facilitates guiding or positioning a jigsaw. A jigsaw blade may be rotated and moved in the direction of the blade, but not moved perpendicular to the blade or it will snap. The present disclosure may include a rotating stage that can be placed on top of the positioning stage. The jigsaw may be attached to this rotating stage. The software may be modified to make the jigsaw follow the plan and rotate to the correct orientation, and made to ensure that the jigsaw was not moved perpendicular to the blade. In some embodiments, a saber saw may take the place of the jigsaw to achieve the same effect. The cutting implement may be steered by rotating the rotating stage, and the cutting implement could be moved along the direction of cutting by moving the positioning stage.

In some embodiments, the system may support rotation and not support translation. For example, the system may automatically orient the blade in a scrolling jigsaw (e.g., a jigsaw with a blade that can be rotated independently of the body). In this embodiment, the software may steer the blade to aim it at the correct course and the user may be responsible for controlling its position.

In some embodiments, the system may position a scroll saw. For example, the camera may be coupled to the scroll saw, and the user may move the material. The upper and lower arms of the scroll saw may be mechanized such that they can move independently by computer control. The user may then move the material such that the plan lay within the adjustment range of the scroll saw, and the software would adjust the scroll saw to follow the plan. In some embodiments, the upper and lower arms could be moved to the same position, or moved independently to make cuts that are not perpendicular to the material.

In some embodiments, the position correcting device can be mounted to a mobile platform. For example, the device may be placed on material and left to drive itself around. The device can also be used in an alternative embodiment in which two mobile platforms stretch a cutting blade or wire between them. For example, each platform may be controlled independently, allowing the cutting line to be moved arbitrarily in 3D, for example to cut foam.

In some embodiments, the system may be coupled or otherwise attached to vehicles or working equipment such as a dozer in which the position-correcting mechanism is mounted on the vehicle. For example, some embodiments of the hybrid positioning system may include a vehicle comprising a first position-correcting system that is accurate to within a first range and a second position-correcting system that is accurate to a second range that is more precise than the first range. The vehicle may be driven over a sheet of material such as a steel plate lying on the ground, and a cutting tool such as a plasma cutter could be used to cut the material. In some embodiments, the present disclosure may facilitate a plotting device or painting device, for example to lay out lines on a football field or mark a construction site. The vehicle, for example, may include an industrial vehicle such as a forklift type vehicle configured to include a cutter or other tool, a camera, and control circuitry described herein to determine location of the vehicle (or the tool) on the material, identify where to cut or mark the material, and adjust the tool to cur or mark the material in the appropriate location.

Figure 6:
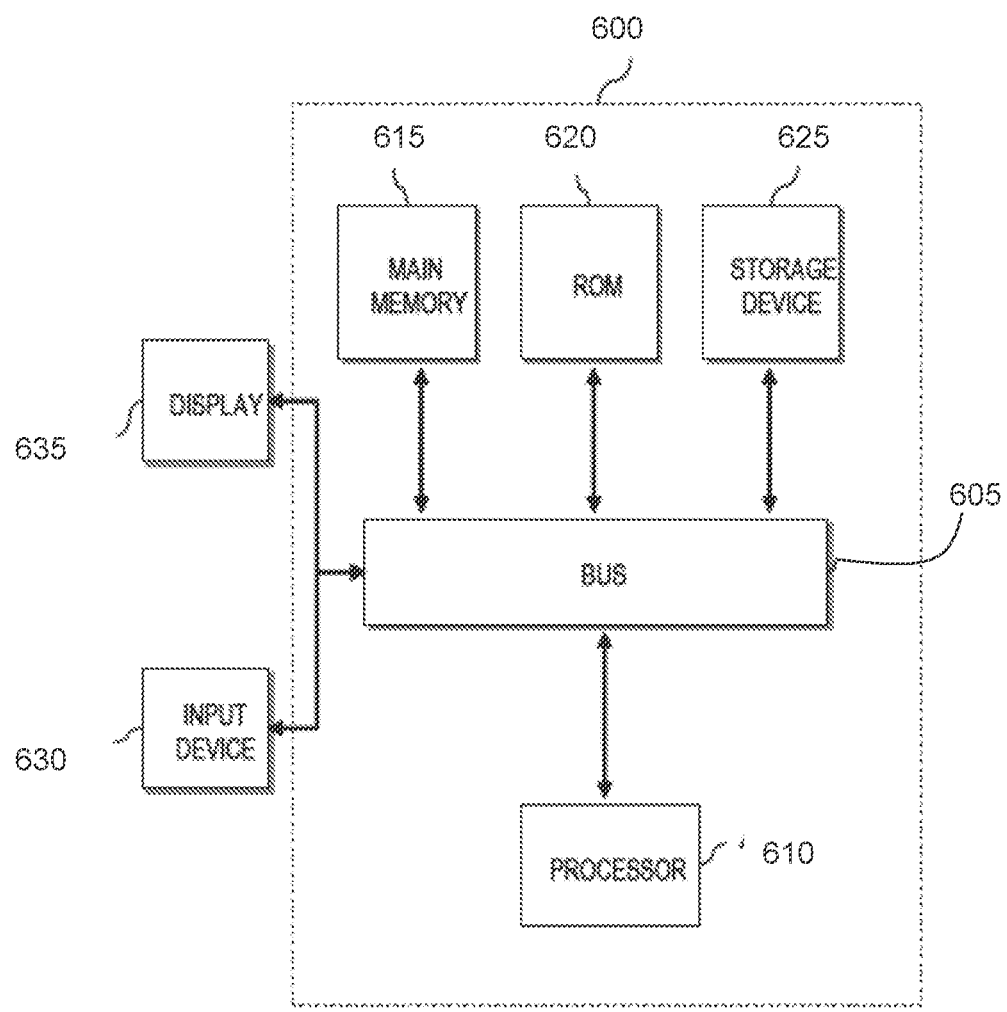
FIG. 6 is a block diagram illustrating a general architecture for a computer system that may be employed to implement various elements of the systems, apparatus and the methods disclosed herein, in accordance with an embodiment.

FIG. 6 is a block diagram of a computer system 600 in accordance with an illustrative implementation. The computer system 600 can be used to implement system 680. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 1220 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

According to various implementations, the processes described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to effect illustrative implementations. Thus, implementations are not limited to any specific combination of hardware circuitry and software.

Although an example computing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 7A:
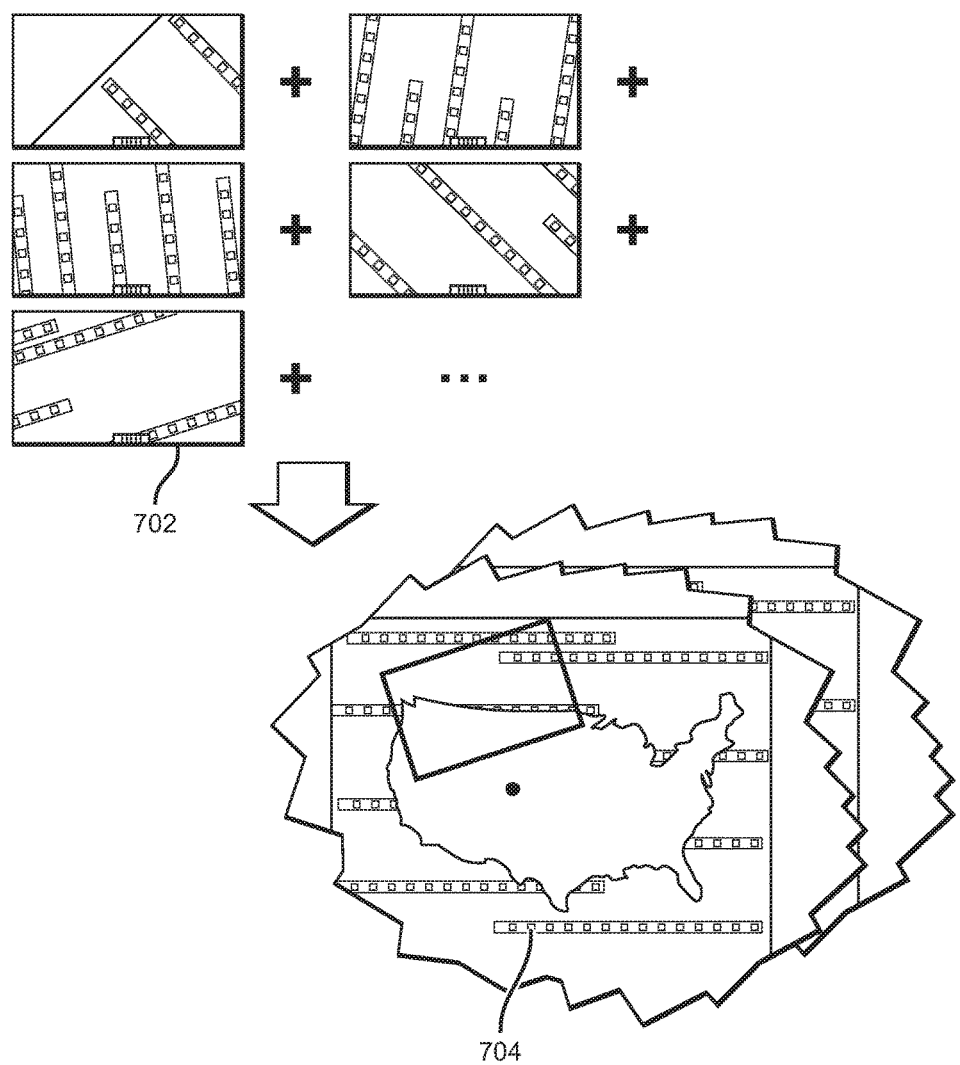
FIGS. 7A-7B are illustrative diagrams of locating markers that may be employed to implement various elements of the systems, apparatus, and the methods disclosed herein, in accordance with an embodiment.

Referring to FIG. 7A, an illustrative example of an embodiment of a design plan and marking material 702 is shown. Placing marking material 704 may facilitate mapping the target material. For example, the target material may not contain sufficient differentiating marks. Adding differentiating marks (e.g., stickers, ink, pencil) to the target material may facilitate the system 680 in mapping the target material and tracking the positioning of the cutting tool during the cutting process. In this example, the design plan is in the shape of a country. The marking material may be placed on the surface of the target material to facilitate mapping the target material and tracking the position and adjusting the position in accordance with the design.

Figure 7B:
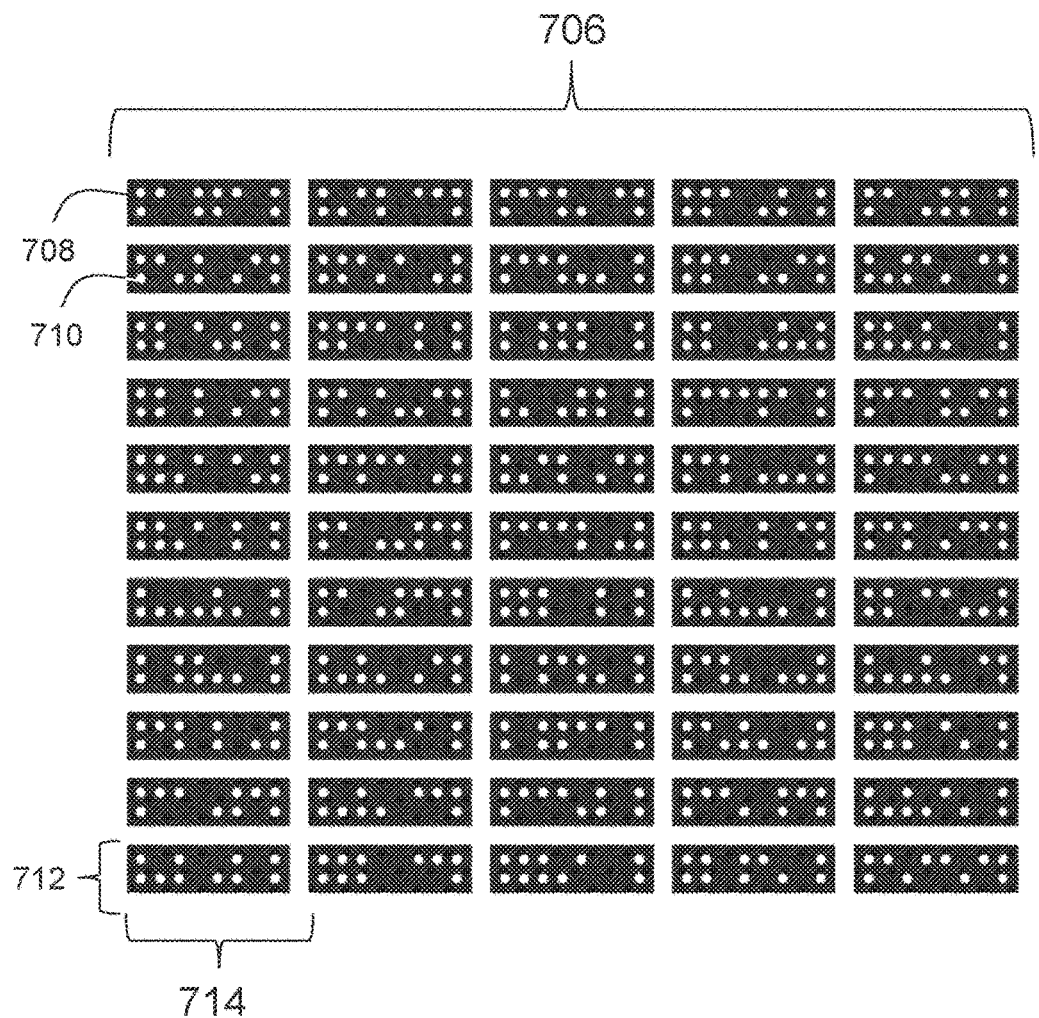

Referring to FIG. 7B, an illustrative example of an embodiment of locating markers 706 is shown. The locating markers 706 may be included as part of the design plan or may refer to a type of marking material 702 used to form the design plan. The locating markers 706 may be placed on the target material and used by the system 680 to map the target material and track a position of the cutting tool relative to the surface of the material.

Locating markers 706 can be designed, constructed or configured such that they are easy for the system 680 to detect and read (e.g., via camera or sensor 682). For example, the locating markers 706 may include dominoes that represent a binarized image. A binarized image may include an image with two values, such as an image with two colors. In some embodiments, the two colors may be selected such a first color of the two colors contrast with a second color of the two colors. For example, the two colors may include white and black, red and white, orange and blue, green and purple, etc. Dominoes-based locating markers 706 may be easy and fast to read by system 680. By using locating markers 706 with a predetermined number of features (e.g., blobs 710), the locating markers 706 can be read from a binarized image contour tree fast. Further, each domino can include a number, which facilitates tracking multiple dominoes. Further, the system 680 can easily determine a subpixel accuracy for each circle 710. In some embodiments, corner circles (e.g., 710) may be present in each of the plurality of dominoes 706. Having a corner circle 710 present in each of the dominoes facilitates reading the locating markers 706, and may allow the system 680 to read the locating markers at increased distances because there is a uniform size of features. Having uniformed sized features prevents a subset of the features from disappearing from the binzrized image before all the features disappear. For example, if all the features 710 are the same size, then the system 680 may either detect all the features, or detect none of the features if the locating marker 708 is outside a detection range.

In some embodiments, the locating markers 706 can include a fiduciary marker 708. A fiduciary marker may refer to a marker that can be detected by system 680 with minimal computation power. In some embodiments, the system 680 can detect the locating markers 700 directly from input that is a black-and-white image (possibly as a binarization of an image with more data, e.g. grayscale or full color).

In some embodiments, the system 680 can detect locating markers 706 using a contour tree of a binarized image. The contour tree may refer to a tree of blobs. A blob may refer to a region of the same color. The contour may refer to or include a border of the blob or the region of the same color. The blob may have a shape, such as a circle, square, triangle, polygon, oval, ellipse, rectangle, pentagon, outline, or another shape that allows the system 680 to detect a location marker.

In some embodiments, the blobs can be organized in a tree such that each node in the tree corresponds to a blob. Further, a node may be a child of another node if the child blob is encompassed by the parent blob. For example, in an image of the capital letter "B", there are four blobs: the white background, the black of the letter, and two white blobs of the inner parts of the B. They are organized in a tree such that the letter is the child of the background and the two inner blobs are both children of the letter.

In some embodiments, location markers may include dominoes as illustrated in FIG. 7B. While rectangle dominoes are illustrated in FIG. 7B, other markers with patterns or other shaped blobs can be used. For example, rather than a rectangle marker 708, the marker may be a polygon, circle, ellipse, square, triangle, pentagon, etc. The blobs 710 may be circles, or other shapes. The collection or plurality of markers may be referred to as a scene 706 or plurality of markers 706 or plurality of candidate location markers 706. A marker 708 may be a candidate marker because the system 680 may perform initial processing to identify the image and determine whether the image is a location marker based on a threshold test or satisfying a criteria (e.g., whether blobs are present in predetermined locations, is there a pattern present, or other signature that indicates that the image corresponds to a location marker 708).

The location markers may include one or more rows 712 including one or more markers 708; and one or more columns 714 including one or more markers 708. In some embodiments, the plurality of location markers 706 or scene 706 may be symmetrical (e.g., a same number of rows and columns). In some embodiments, the plurality of location markers 706 or scene 706 may not be symmetrical (e.g., a different number of rows and columns).

Each of the dominoes 706 may include a recognizable signature in the contour tree. For example, a domino may include 10 white blobs inside a black blob. The white blobs may not have children blobs. The domino configuration may include a contour tree with ten white children that are leaves of the black background tree. Therefore, if the system 680 detects this configuration (e.g., a black blob with 10 white blobs), the system 680 can take the black blob and process it as a fiducial marker. This additional processing may end up rejecting the domino as a marker, or accepting the domino as a location marker. This possibility extends to any recognizable signature in the contour tree, which may involve a variable number of children blobs, as long as it is distinctive enough that just from the contours one can have a good probability that it is a marker and spend additional computational resources to study it closer.

Thus, the system 680 can be configured to perform an initial assessment of a detected image using an initial image processing technique. During the initial processing technique, the system 680 identifies a contour tree to determine if the contour tree matches or satisfies an initial screening. For example, if the system 680 detects a black blob and 10 white blobs (e.g., as shown in domino 708), the system 680 may determine that the image may include a location marker, and forward the image for further processing. By performing an initial assessment, the system 680 can pre-screen images and select a subset of the images for further, more computationally intensive processing. Thus, the system 680 can increase efficiencies and reduce the amount computational resources used to determine the location of a tool relative to a working surface.

In some embodiments, the marker that can be detected extremely quickly by binarizing an input image, computing the contour/blob tree, or looking for a known signature. In some embodiments, the location marker may encode data into each fiducial (e.g., 708) and be easy to detect. For example, the fiducial marker 708 may encode a number, which allows the system 680 to keep track of (manage, maintain, identify, or determine) multiple fiducials present in a scene (e.g., a scene may refer to location markers 706). The number of the fiducial 708 may be unique in the scene 706, or may not be unique in the scene 706. In some embodiments, marker such as each of the dominoes 708 includes a pattern of white blobs that encodes a number in binary.

In some embodiments, a marker 708 may include blobs (e.g., 710) that are positioned in a predetermined location. A marker 708 may include blobs in each of the four corners, allowing the system 680 to determine not just the presence of the fiducial marker 708 but a layout for it (such as the position and orientation of a marker relative to the camera 682. Including blobs in predetermined positions may improve the ability of system 680 to decode a message encoded in the marker itself. For example, if the blobs are arranged in a grid, recognizing the corners provides a layout of the grid and allows the system 680 to map each grid square to a 1 or 0 for a blob being present or absent. In some embodiments, the system 680 may use the blobs in the predetermined location of the marker to detect the layout of the domino or marker 708, but then parse some encoded data in another way, which may or may not be encoded in the binarized image/contour tree.

In some embodiments, the marker 708 may include blobs that are shapes that can then be resolved with subpixel accuracy by referring back to the full-color (or grayscale) image. For example, the system 680 may identify the blobs as circles (or preconfigured to identify the blobs as circles). The system 680 can determine the bounding box of each blob in the binarized image. The system 680 can then use the corresponding grayscale pixels in the grayscale image to fit an ellipse (circle viewed in perspective) to the pixels, giving a subpixel accuracy. The system 680 may more accurately detect the position and orientation of the fiducial 708 relative to the camera by using this subpixel-accurate detections of the blobs. This position and orientation can then be fed forward in the system 680 for further processing, such as localization of the camera in 3D space.

Figure 8A:
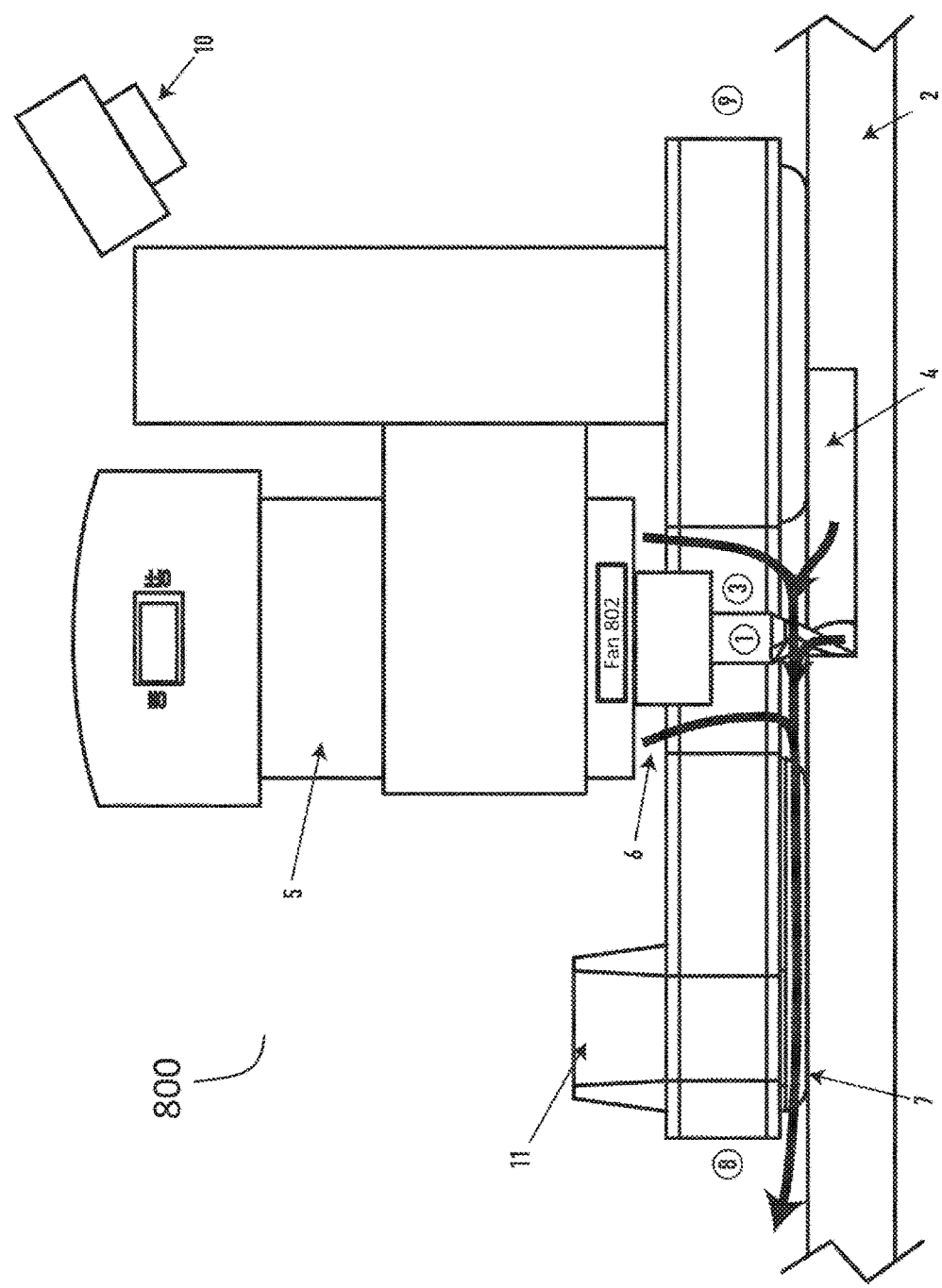
FIGS. 8A-8B are an illustrative example of an embodiment of an apparatus for directing or extracting dust particles that may be employed to implement various elements of the systems, apparatus, and the methods disclosed herein, in accordance with an embodiment.
Figure 8B:
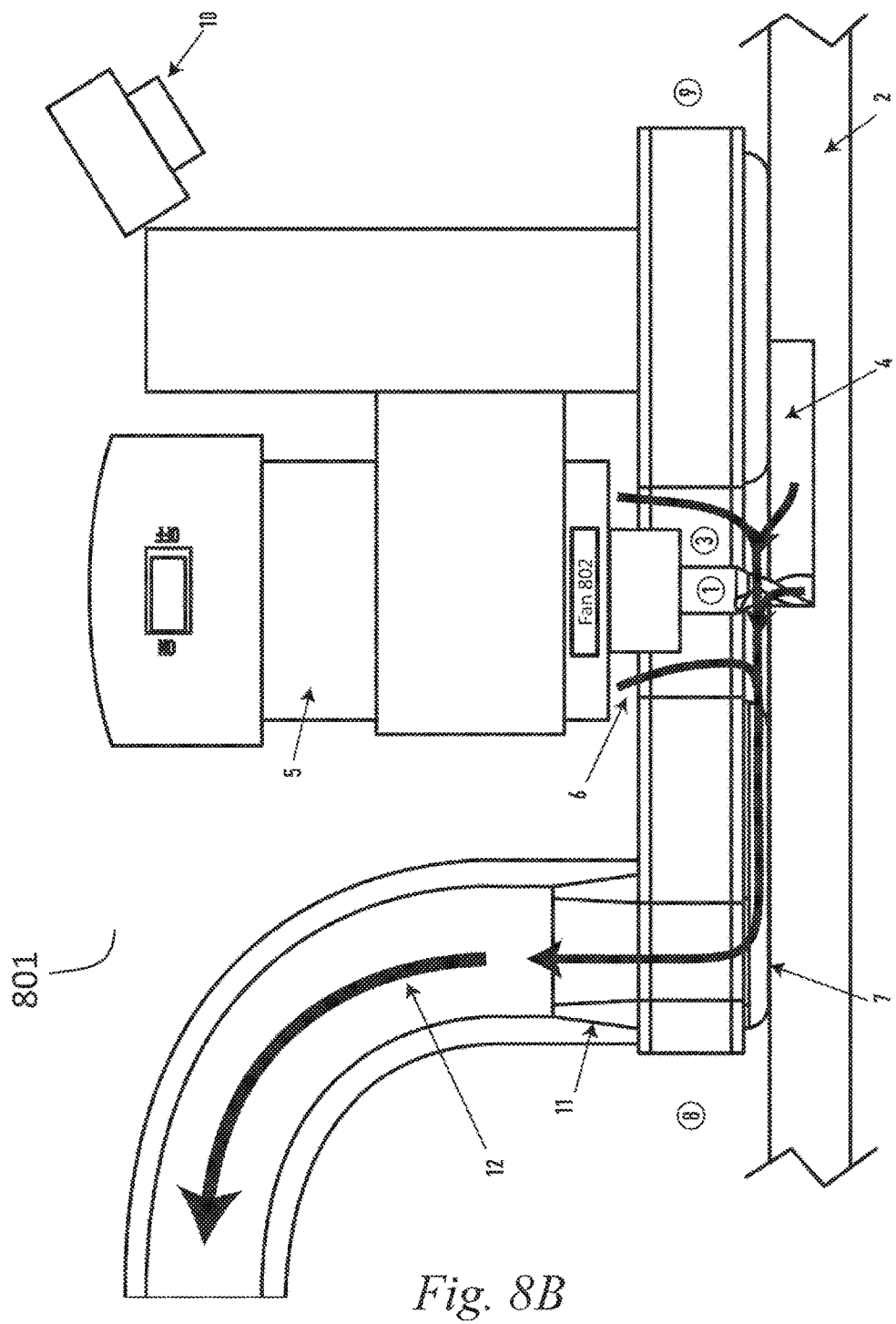

Referring now to FIGS. 8A-8B, systems, methods, and apparatus for directing and extracting dust is shown. Dust extraction may refer to the evacuation of particles of material that have been removed from a bulk workpiece (surface of a material, work surface) during a machining process such as milling, routing, sanding, etc. In the domain of woodworking, the dust may be saw dust. Effectively extracting dust facilitates maintaining a clean working environment, safe air for breathing that is free of dust, and prevents a buildup of dust in the vicinity of the tool that can otherwise impede its cutting action and also result in the generation of excessive heat. Additionally the accumulation of wood dust can create an explosion risk. Further, for automatically guided tools (such as system 680) that utilize an optical method for localization (e.g., camera 682), dust can interfere with the tool's ability to determine a location of the tool relative to the surface of the material. Systems, methods and apparatus of the present disclosure efficiently evacuating dust from the working area of a tool. In some embodiments, dust can be routed away from the working area in a controlled direction in the absence of a vacuum source.

FIG. 8A illustrates a tool 800 configured to direct and evacuate dust in accordance with an embodiment. The tool 800 includes a rotating cutter 1 (or tool tip, or cutting member, or working member) that shears material 2 as the rotating cutter 1 moves axially, laterally, or a combination thereof through the material 2. The tool 800 includes a tool frame 3. The tool frame 3 may include a cavity formed of a void in the tool frame 3. The cavity 3 may be further formed by a space 4 where portions of working material 2 have been removed or cut away. A cutting member or router bit or tip of the tool can extend through cavity 3. The cavity 3 can form one or more channels or a portion of a channel. The channel directs air flow 6. Channels are further illustrated in FIGS. 9A-9B. The tool can include a camera 10, which can include one or more functionality of camera 682. The camera 10 can include or be referred to as a sensor, such as an image sensor, infrared sensor, or laser sensor.

In some embodiments, the rotational motive power for the rotating cutter 1 may be generated by a router 5 or spindle 5 (e.g., a woodworking trim router, or metal cutting tool, or plastic cutting tool, etc.) that includes an integral fan 802. The fan 802 may be a separate fan that is integrated into the spindle 5, or the fan 802 may refer to an airflow that is generated as a by-product of the spindle 5 rotating the cutting tool 1. In some embodiments, the fan 802 may be external to the tool, such as external to the spindle 5. The fan 802 can include one or more vanes or blades in an arrangement that, when rotated, generates airflow. This fan 802 can generate a downward airflow 6 that drives dust out of the collection cavity formed by the tool frame 3 and space 4 and along channels in the tool's base plate 7. These channels direct dust towards the front of the tool 8, which keeps dust from accumulating to the rear of the tool 9 where an optical locating system 10 (e.g., camera 682) may be aimed. In some embodiments, the front 8 of the tool 800 may refer to a portion of the tool that faces away from the direction the tool is cutting or a portion of the tool closer to the user of the tool. In some embodiments, the rear 9 of the tool 800 may refer to a portion of the tool that faces the direction the tool is cutting or a portion of the tool further away from the user of the tool. In some embodiments, the rear 9 of the tool refers to the portion of the tool 800 where a camera 10 is aimed. The tool 800 can include a vacuum port 11 that opens into one of the channels formed by voids 3 and 4 that receives air flow 6.

FIG. 8B illustrates an embodiment of a tool 801 similar to tool 800 that includes a vacuum source 12 attached to the vacuum port 11. The vacuum source 12 biases airflow towards the vacuum source 13. This can extract through the connected channel formed by voids 3 and 4 in base plate 7 and into the vacuum source 12. In this configuration, dust may be efficiently removed from the tool without entering the surrounding environment (e.g., rear of tool 9).

The channel formed by cavities 3 and 4 allow the airflow 6 generated by the fan 802 of the tool spindle 5 and the airflow generated by the vacuum source 12 to act along a common path to remove dust. This provides for efficient dust extraction system as the vacuum source 12 is not fighting against the airflow generated by the integrated spindle fan 802.

Figure 9A:
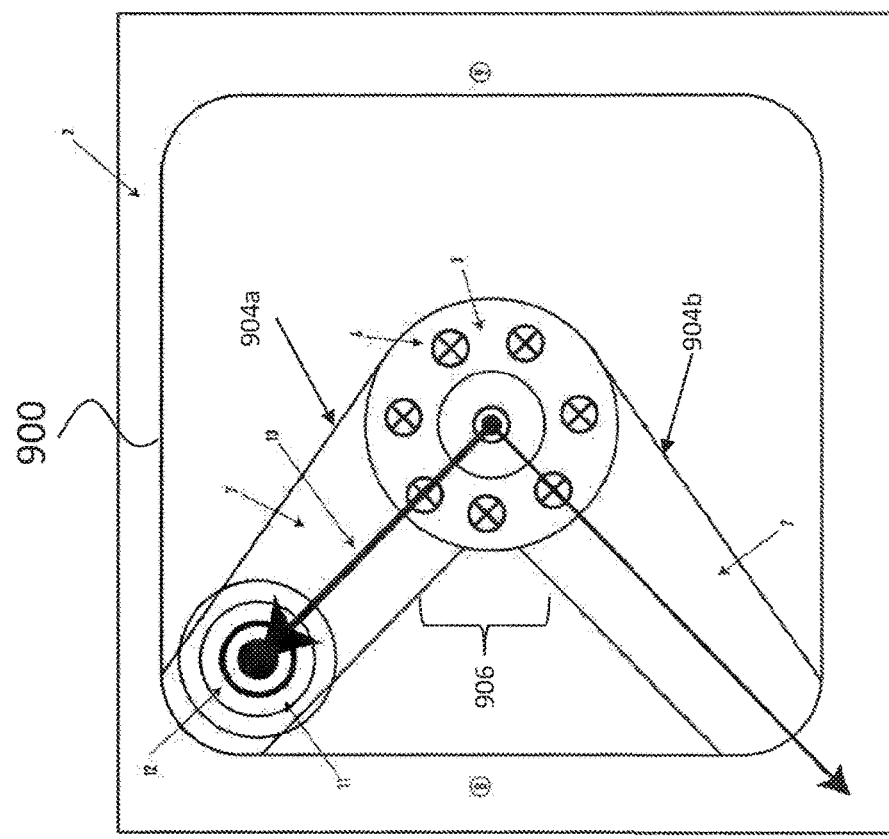
FIGS. 9A-9B are an illustrative example of a top perspective view of an embodiment of a base plate for directing or extracting dust particles that may be employed to implement various elements of the systems, apparatus, and the methods disclosed herein, in accordance with an embodiment.

FIG. 9A illustrates a top-down perspective view of an apparatus 900 for directing and extracting dust. The apparatus 900 may be coupled to, be part of, or be formed of one or more component of systems or apparatus 800 or 801. In some embodiments, apparatus 900 includes the base plate 7 of the tool 800. The baseplate 7 includes channels 904a-b formed by the void or cavity 3 in the base plate 7. A portion of the base plate 7 faces or rests on or is opposite the material 2. The fan 802 generates air flow 6 that flows downward towards the material 2. The vacuum source 12 generates airflow 13 towards the vacuum source 12 and vacuum port 11. The direction of airflow 6 as going towards the material 2 is illustrated by an X, while the airflow 13 shown going towards the vacuum port 11 is illustrated by a dot in a circle.

In some embodiments, the channels 904a-b formed in base plate 7 are V-shaped. In some embodiments, there may be two channels 904a and 904b that extend from the cavity 3. In some embodiments, there may be one channel (e.g., just channel 904a). In some embodiments, there may be a plurality of channels (e.g., two or more channels). One of the plurality of channels may include a vacuum port 11 coupled to a vacuum source 12. The channels 904a and 904b may form a U shape. The channels 804 may include a third channel that extends perpendicular to channels 904a and 904b via the cavity 3.

The channels 904a and 904b may form an angle 906. The angle 806 may range from 1 degree to 180 degrees. In some embodiments, the angle 906 may be 90 degrees, 45 degrees, 60 degrees, 120 degrees, etc. The angle 906 may be selected such that dust from material 2 is effectively directed away from the rear 9 of the tool and towards the front 8 of the tool via channel 904a-b and air flow 6 and 13.

The channels 904a-b may include a channel depth. The channel depth may be the same for channel 904a and channel 904b, or may be different among the different channels. The channel depth may be greater than zero. The channel depth may be a value that ranges from 0.02 inches to 2 inches. The depth may be less or greater based on the type of tool or type of material being cut. For example, a size of particles being directed or extracted may determine a channel depth (e.g., shallower channel depth for smaller particles, and deeper channels for bigger particles).

In some embodiments, a first component of the air flow 6 and 13 generated from fan 802 may be greater than a second component of the air flow 6 and 13 generated from vacuum source 12. In some embodiments, a first component of the air flow 6 and 13 generated from fan 802 may be less than or equal to a second component of the air flow 6 and 13 generated from vacuum source 12.

In some embodiments, the air flow generated from vacuum source 12 may be determined such that the air flow holds the tool 800 (or apparatus 900) to the material 2. This may increase the friction between the portion of the tool touching the material, which may increase stability while cutting or performing the task on the material 2.

Figure 9B:
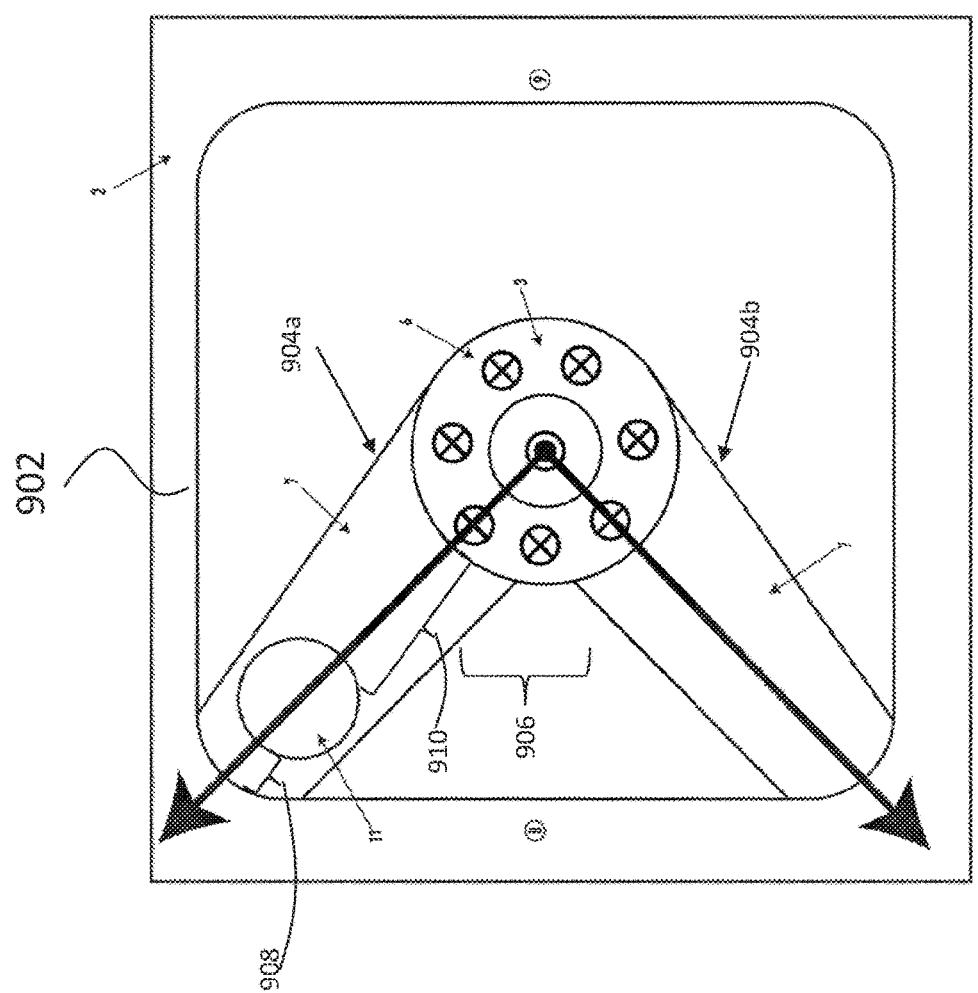

FIG. 9B illustrates an apparatus 902 for directing or extracting dust away from a rear 9 of a tool. FIG. 9B illustrates a top-down perspective view of the apparatus 902 or base plate 7 including channels 904a-b. The apparatus 902 may be similar to or include one or more component of apparatus 900. In some embodiments, the apparatus 902 includes a vacuum port 11, but is not coupled to a vacuum source (e.g., as shown in apparatus 900). While the apparatus 902 may not be coupled to a vacuum source at vacuum port 11, the apparatus 902 may still direct and extract dust via channels 804 and air flow 6 generated by a fan (e.g., fan 802).

The vacuum port 11 may be positioned anywhere along channel 904a or channel 904b. In some embodiments, the vacuum port 11 may be positioned closer to an edge or corner of the base plate 900 relative to the cavity 3. The distance 908 between the vacuum port 11 and edge of the base plate 902 may be greater than zero. The distance 910 between the vacuum port 11 and the cavity 3 may be greater than zero. The distance 910 may be different from distance 908. The distance 910 may be greater than distance 908. The distance 910 may be a multiple of the distance of 908. The distances 908 and 910 may be determined such that dust can be effectively and efficiently directed and extracted away from rear 9 of tool.

FIG. 9C illustrates a bottom perspective view of base plate 910. Base plate 910 may correspond to base plate 7. Base plate 910 includes channels 912a-b, which may correspond to channels 904a-b. The base plate 910 includes a cavity 916 that may correspond to cavity 3. The base plate 910 includes a vacuum port 914 in channel 912, which may correspond to vacuum port 11. The vacuum port 914 may or may not be connected to a vacuum source.

The base plate 910 can be made of any material that facilitates operation of the system 680 or tool 800. The material may be metal, plastic, an alloy, or other material that provides adequate structural support for the tool 800 and friction to allow the tool to glide on the surface while providing some stability.

FIG. 9D is a top down perspective view of base plate 920, which may correspond to an embodiment of the base plate 902 of FIG. 9B. The base plate 920 includes a cavity 922 through which the cutting member or tip of the tool may extend. The base plate 920 may include a vacuum port 924.

The base plate 920 may include channels on the bottom of the base plate 920 (e.g., the portion or side of the base plate opposite the material on which a task is to be performed). The base plate 920 may include additional openings or cavities or grooves for one or more screws, or coupling mechanisms used to couple the base plate 920 to a tool, such as tool 800.

Figure 10A:
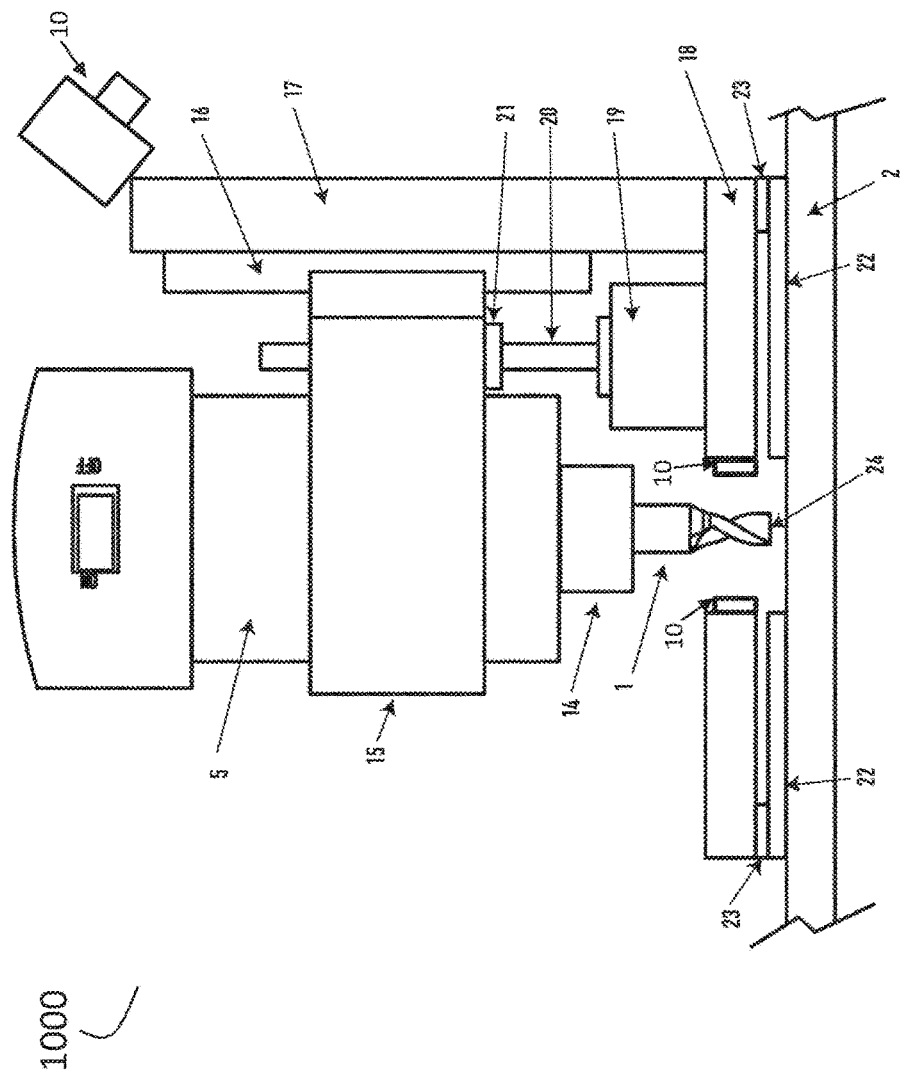
FIGS. 10A-10B are an illustrative example of an embodiment of a system for determining a location of a tool tip that may be employed to implement various elements of the systems, apparatus, and the methods disclosed herein, in accordance with an embodiment.
Figure 10B:
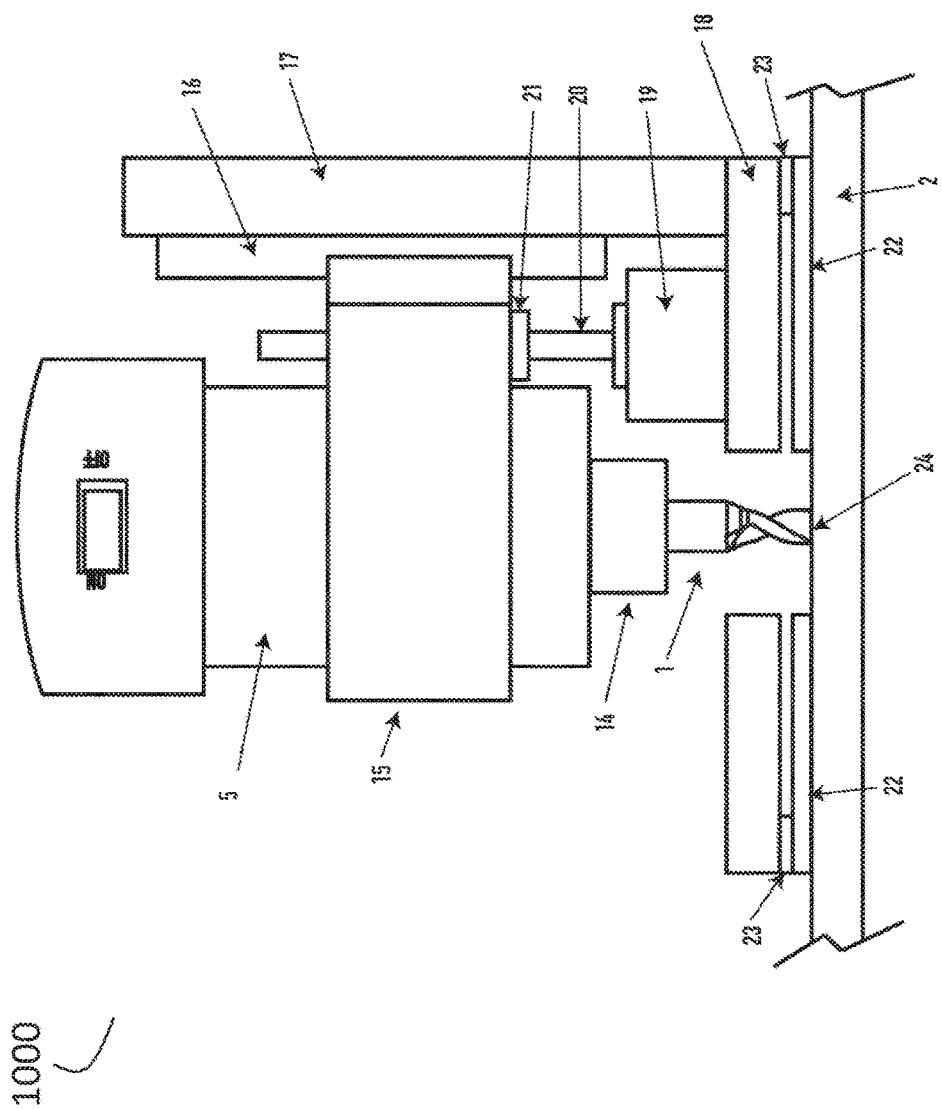

Referring to FIG. 10A, a system, method and apparatus for determining a position of a tool tip relative to a work surface or material is shown. The system, method and apparatus can calibrate position detection for the tool. In some embodiments, system 680 can be configured, designed or constructed to determine the position of the tool tip relative to the work surface. The system 1000 (or tool 1000) can move, position, or control motion of a tool tip 24 in one or more directions (e.g., FIG. 10B shows the tool tip 24 touching the surface of the material 2). The control may be manually or automatically motivated. In some embodiments, the tool 1000 may include or be configured with automatic control of the height of a rotating cutter 24 relative to the surface of a workpiece or material 2. The system 1000 can include one or more function or component of the system or apparatus of FIGS. 1-9 and 11A-11B.

The system 1000 (or tool 1000) can calibrate position detection for the tool. The system 1000 can include a base 18 coupled to the tool 1000. The base 18 can be in contact with a working surface 2. In some cases, the base 18 can include a pad 22. For example, the base 18 can include a pad 22 such that the base 18 is in contact with the working surface 2 via the pad 22. Thus, and in some embodiments, the base 18 can refer to the base 18 and the pad 22. In some embodiments, the base 18 may not be in contact with the working surface. The base 18 can be in contact with the sensors 23 that are in contact with the pad 22, and the pad 22 can be in contact with the working surface or workpiece or material 2.

The system 1000 can include one or more computing device having one or more processors. In some cases, the system 1000 can include the one or more computing devices remote from the tool. For example, the tool can include a wireless or wired communication interface that can transmit and receive data or control information from one or more computing devices that are remote from the tool.

The system 1000 can include one or more sensors 23 communicatively coupled to the computing device. The system 1000 can include a motor 19 controlled by the computing device to extend and retract the tool tip 24 towards and away from working surface 2. The motor 19 can control or include or refer to one or more components of the system 1000 configured to extend or retract the tool tip 24, including, for example, a moveable carriage 15.

The system 1000 can identify, via the one or more sensors 23, a first value of a parameter indicative of an amount of force exerted by a portion of the base on the working surface. For example, the sensor 23 can include a force sensor 23. The system 1000 can determine the first value as a first force value that indicates a default or initial force exerted by the base 23 on the material 2. This may indicate a weight of the tool. The force can be measured or determined in Newtons or pounds. The sensor 23 can repeatedly detect or measure the value of the parameter based on a time interval (e.g., every 0.1 second, 0.5 second, 1 second, 2 seconds, 3 seconds, 5 seconds, or some other time interval). The sensor 23 can compare a first value or first measurement with a second or subsequent measurement. The sensor 23 can repeatedly compare a measurement with a subsequent measurement until the sensor detects a change or difference (e.g., by 0.5%, 1%, 2%, 3%, or an absolute change such as 1 N, 0.5 N, 0.25 N, 0.1N, 0.05N, or 2N) between measurements. The difference can refer to a difference by a predetermined threshold. The threshold can be fixed or dynamic. The threshold can be based on a resolution of the sensor 23.

The system 1000 can instruct the motor 19 to instruct the motor to extend the working member or tip 24 towards the working surface 2. The system 1000 can then identify, via the sensor 23 upon the working member 24 contacting the working surface 2, a second value of the parameter. This second value can be a second force value. The second force value can be less than the first force value determined by the sensor 23 when the tool tip 24 was not in contact with the working surface. In some cases, there may be multiple sensors 23 and each sensor can determine a first force value and a second force value. In some cases, a first sensor can determine a first force value that is different from a first force value detected by a second sensor. The first values can refer to when the tool tip is not in contact with the material 2. The first and second sensors may identify different first values because due to the center of gravity of the tool not located evenly in between the first and second sensors. Thus, when the tool tip 24 contacts the material 2, a second force value detected by the first sensor may be different from a second force value detected by the second sensor. For example, when the tool tip 24 contacts the material 2, the base 18 of the tool may tilt in an angle (e.g., 1 degree, 2 degree, 5 degree, or 10 degrees). The tilting of the base 18 may cause the first sensor 22 to measure a second force value that is less than the first force value measured by the first sensor 22, while the second sensor 22 can measure a second force value that is greater than the first force value measured by the second sensor.

The system 1000 (or computing device) can identify the first value of the parameter based on a portion of the base 18 of the tool in contact with the working surface 2. The system 1000 can identify, via the sensor 23, the second value of the parameter based on the portion of the base of the tool not in contact (e.g., partially in contact or exerting less force on the surface than previously being exerted) with the working surface responsive to the motor 19 causing the working member 24 to contact the working surface 2. For example, not in contact may refer to or include less force being exerted by the portion of the base 18. In some cases, the system 1000 can instruct the motor 19 to contact the working surface 2 to tilt at least a portion the base 18. Tilting the base 18 can refer to distributing the force exerted by the base 18 such that a first portion of the base 18 exerts greater force on the material 2 than a second portion of the base 18. Tilting the base 18 can refer to changing the distribution of force exerted by the portions of the base 18. The system 100 can determine the z-axis position of the working member 24 relative to the working surface 2 responsive to the working member 24 tilting the base 18 of the tool responsive to the working member 24 contacting the working surface 2.

The system 1000 can compare the first value of the parameter with the second value of the parameter to generate a difference between the first value and the second value. The system 1000 can determine an absolute difference (e.g., a difference of an amount of force), or simply determine that there is a difference in that the two values are not equal to each other. The system 1000 can determine that if the first and second values for a particular sensor 22 are not equal, then it is due to the tool tip 24 contacting the material 24 and offset or distributing the force exerted by the base 18 onto the material 2. The system 1000 can determine the z-axis position responsive to the first force value being greater than the second force value because less force may be exerted by the base 18 onto the material 2.

Responsive to detecting this difference, the system 1000 can determine that the tool tip 24 has contacted the material, and use this information to determine a z-axis position of the working member relative to the working surface. For example, the system 1000 can determine that this is the baseline or default position for the tool tip 24. The system 1000 can calibrate the position of the tool tip 24 such that this is a zero position. As the system 1000 retracts the tool tip 24 away from the material, the system 1000 can monitor or track the distance of the tool tip 24 from the calibrated zero position corresponding to the surface of the material 2. For example, the system 1000 can control or instruct the motor 19 to retract or move the tool tip 24 a distance (e.g., 1 millimeter, 5 millimeters, 1 centimeters, 5 centimeters, or 10 centimeters) away from the calibrated zero position which may correspond to the surface of the material. The system 1000 can, in some cases, instruct or control the motor 19 to insert the tool tip 24 a distance into the material 2. For example, the system 1000 can instruct or control the motor 19 to insert the tool tip 24 one centimeter beyond the calibrated zero position, which may insert the tool tip 24 one centimeter into the material 2. For example, the system 1000 can make a one centimeter hole in the material using the calibrated zero position.

The system 1000 can instruct the motor 19 to retract the working member 24 in contact with the working surface 2 away from the working surface 2. The system 1000 (or sensor 23 thereof) can identify when the working member 24 is not in contact with the working surface by measuring a third value of the parameter. The third value of the parameter may be greater than the second value of the parameter because the tool tip 24 is no longer offsetting the force exerted by the base 18 onto the material 2 (e.g., via sensor 23 or pad 22). The third value of the parameter may be equal to (e.g., substantially equal within 1%, 2%, 5%, or 10%) the first value of the parameter when the tool tip 24 was also not in contact with the material 2. The system 1000 can determine a second z-axis position of the working member relative to the working surface responsive to a second difference between the first value and the third value less than a threshold (e.g., the difference is less than a percentage of the first value or the third value such as 1%, 2%, 3%, 5%, or 10%; or a force value such as 1 Newton, 0.5 Newton's, 0.01 Newton's, 2 Newton's, 5 Newton's, or 10 Newton's).

Thus, to facilitate controlling the height of the rotating cutter 24, the tool may determine a reference or "zero" point so that the tool 1000 (e.g., via cutting member 24) can be positioned to remove an amount of material 2. For example, the tool 1000 may plunge a rotating cutter 24 a specified depth into a workpiece 2 before being moved laterally to create a groove. The tool may use a method to precisely determine the position of the tool tip relative to the work surface. In some embodiments, the tool 1000 uses low cost sensors 23, such as force sensors, that detect a delta or change in the force exerted by a portion of the tool 1000 on the material 2. In some cases, the sensors 23 can include capacitive sensors, photoelectric sensors, electromagnetic sensors, load sensors, strain gauge load cells, piezoelectric crystals, hydraulic load cells, or pneumatic load cells.

As the tip 24 moves towards the material 2 and touches the material 2, the force exerted by the base 18 may be reduced because the force is being offloaded to the tip of the tool 24. Detecting this change in force may indicate that the tip of the tool is touching the surface of material 2 and allow the tool to configure or set or initialize this position as a zero position. This may be useful for handheld power tools including automatically guided tools, and may also be applied to fully automatic machine tools.

In some embodiments, the tool 1000 includes a router bit 1 mounted in the spindle 14 of a router 5 (e.g., woodworking trim router). The router 5 may be secured in a movable carriage 15 that slides on a guide rail 16. The guide rail 16 may be mounted to a structural column 17. The structural column 17 may be fixed to a base 18 of the tool 1000. A motor 19 may be fixed to the base 18 of the tool 1000 to rotate a leadscrew 20. The leadscrew 20 may pass through a nut 21 on the movable carriage 15. The leadscrew 20 may include square threads, acme threads, or buttress threads. When the motor 19 rotates, the movable carriage 15 translates in proportion to the pitch of the leadscrew 20.

In some embodiments, the movable carriage 15 may be mounted to a moving stage which is constrained in the Z direction by the frame. In some embodiments, the Z column or guide rail 16 may be mounted to a moving XY stage which is constrained in the Z direction by a frame of the device 1000. For example, the tool or device 1000 can include a rig or frame with a stage that may be positioned on the surface of a piece of material such as wood. The tool can be electrically or mechanically coupled to the frame, and the frame together with the tool can be passed over the material. The tool can move (or provide instructions for a user to move) the frame, stage, or tool to a desired XY or Z coordinate on the material. For example, the tool may include one or more components (e.g., rig, tool, stage, etc.) of the system described in U.S. Patent Application Publication No. 2015/0094836. The U.S. Patent Application Publication No. 2015/0094836 is hereby incorporated by reference herein in its entirety.

In some embodiments, the tool 1000 may use one or more other configurations or techniques to move the tip 24 of a tool 1000 relative to the work surface. Other configurations may include a power screw, translation screw, ball screws, roller screws, fluid power, tear trains, worm drives, rack-and-pinion drives, electromagnetic actuation, piezoelectric actuation, hydraulic lifts, electrical lifts, rotary lift, pneumatic lift, mechanic lifts, levers, gears, etc.

The base 18 of the tool (or device) 1000 may be separated from the work surface 2 by a pad 22 on which the device 1000 rests. In some embodiments, one or more force sensors 23 may be positioned between the pad 22 and the base 18 of the device 1000. The gravitational force generated by the weight of the device 1000 partially or fully passes through the one or more force sensors 23 when the device 1000 is resting on the work surface 2.

To locate the tip 24 of the cutting tool 1000, the system or device 1000 may move the carriage 15 closer to the work surface 2, which moves the tip 24 towards the work surface. As this motion is performed, the force passing through the force sensors 23 may be measured (e.g., measured responsive to a motion, measured periodically, measured based on a time interval such as every millisecond, 10 milliseconds, 1 second, etc.). Once the tip 24 of the cutting tool makes contact with the work surface 2, additional motion results in a fraction of the weight of the device 1000 to be transferred to the work surface 2 through the tool tip 24, and the force passing through the sensors 23 is correspondingly reduced. The system detects the change in force on the one or more sensors 23 and the motion of the carriage may be stopped. The position of the carriage 15 is recorded and may correspond to the point at which the tool tip is positioned at the surface of the work. Because the tool tip and the work surface may be stiff, a detectable transfer of weight occurs over very small distances and the error of this method may correspond to less than 0.0005" using a ¼" carbide routing bit on a birch plywood surface.

The system 1000 can repeatedly extend and retract the tool tip 24 towards and aware from the material 2 or a surface (e.g., desk, bench, floor, or other support structure) supporting the material 2. The system 1000 can repeatedly extend and retract the tool tip 24 to generate or create a 3-dimensional map of the material 2.

In some cases, the system 1000 can extend the tool tip 24 adjacent to an edge of the material 2. The system 1000 can extend the tool tip 24 adjacent to the edge of the material 2 until the tool tip 24 contacts a surface supporting the material 2. The system 1000 can determine a thickness of the material by determining the distance beyond the surface of material 2 the tool tip 24 extends in order to contact the surface supporting the material 2. The system can determining these positions using the force sensors 23 to detect when the tool tip 24 contacts the material 2 or the surface supporting the material. For example, the system 1000 (or motor 19) can extend the working member 24 towards a surface supporting the working surface. A part of the base 18 of the tool can be in contact with the working surface 2, while a part of the base 18 of the tool may be off the material 2. Or, in some cases, the base 18 may be in contact with the material 2, and the material can be shaped or configured such that the tool tip 24 when extended may contact the surface supporting the material 2 as opposed to the surface; or the tool tip 24 may extend through a hole in the material 2 to contact the surface supporting the material 2. The system 1000 (e.g., via sensor 23) can detect the working member 24 contacting the surface supporting the working surface. For example, the system 1000 can detect a third value of the parameter (e.g., force), and determine a thickness of the working surface 2 responsive to a second difference between the first value and the third value greater than a threshold (e.g., the difference can be greater than 1%, 2%, 5%, 10%, of one of the first value or third value; or the difference can be greater than a force value such as 1 Newton, 0.5 Newton's, 0.01 Newton's, 2 Newton's, 5 Newton's, or 10 Newton's).

The system 1000 can determine multiple location points based on the working member 24 of the tool contacting the working surface. For example, the system 1000 can repeatedly extend and retract the working member of the 24 to contact the material 2 and move the working member 24 away from the surface. The system 1000 can record information each time the tool tip 24 contacts the material 2 (or does not contact the material 2). For example, the system 100 can record or identify location points. Each location point can have an x-axis coordinate, a y-axis coordinate, and a z-axis coordinate. The x-y coordinates can be determined using markers on the surface of the material and may be relative to a surface of the material or position on the surface of the material. The x-y coordinates can be determined using fiducial markers on the surface of the material, imaging techniques, or visual techniques. For example, a second sensor of the tool (e.g., a visual sensor or camera) can determine the x-axis coordinate and the y-axis coordinate of each of the location points using a fiducial marker placed on the working surface. The system can determine the z-coordinate (or depth) by extending the tool tip 24 until the tip 24 contacts the surface, and measuring the depth relative to a calibrated zero position. The calibrated zero position can be a position on the surface of the material. The system 1000 can generate a three dimensional map of the working surface 2 using the location points.

The system 1000 can measure the geometry of the work surface 2 by correlating the tool tip 24 position with device (e.g., tool 1000) position on the plane of the work surface 2. To do so, the tool tip 24 (e.g., a cylindrical tool with a conical or spherical tip) can first be related to the reference frame of the tool 100 by detecting the position of the tool tip 24. Once the position of the tool tip 24 is known relative to the tool's reference frame, the tool can be positioned laterally over a surface of interest (e.g., working surface 2) to determine the vertical position of the working surface. The vertical position of the working surface can refer to a surface of the material of the working surface. In some cases, the vertical position can indicate a recess, cavity, indent, or concave portion in a piece of wood whose depth is of interest. In some cases, the vertical position can indicate a raised portion, bump, protrusion, or convex portion in a piece of wood whose depth is of interest. The tool tip can then be inserted, extended, lowered, plunged otherwise moved until the tool tip contacts the surface of the portion of the material (e.g., recess or protrusion). The additional displacement of the tool tip beyond the top portion of the surface where the tool tip first contacted the work surface can indicate the depth of the recess. Similarly, the reduction in displacement of the tool tip above the portion of the surface where the tool tip first contacted the work surface can indicate a height of the protrusion. If the surface profile of the recess was of interest, the tool might be moved around the recess to multiple points. The tool can determine, at each of the multiple points, the depth. The tool can record both the depth and lateral position of the tool (e.g., x, y, and z coordinates, where x and y coordinates can refer to the lateral position and the z coordinate can refer to the depth). The lateral motion could be accomplished automatically using a built-in positioning stage, or performed manually by the user, or a combination of both.

The system 1000 can identify or determine a center position of a hole on a work surface 2. For example, a tool 1 with a conical tip 24 can be fitted into the system. The tool 1 can then be positioned approximately (e.g., within 5%, 10%, 15%, 20%, 25%, 30%, 50%, 75%, or 90% of the diameter of the hole) over the center of the hole, and plunged until the tip 24 contacts the circle of the hole. Because the tool tip 24 can be conical, the tool tip 24 can cause the tool to center over the hole. The tool can then determine the lateral position (e.g., x and y coordinates) using, for example, a vision system with a camera 10 to ascertain the position of the hole.

The system 1000 can include or communicate with a computing device, processor or microprocessor (such as a processor of system 680). The computing device can include the one or more process of system 680. The system 1000 can use the computing device to control the motion of the positioning motor and also to measure the force passing through the one or more force sensors 23. Sensors 23 may include, e.g., force-sensitive resistors, piezoelectric sensors, strain gages, load pins, shear beams, tension links, magnetic level gauge, torque sensor, load cells, hydraulic load cells, pneumatic load cells, elastic devices, magneto-elastic devices, plastic deformation, foil strain gauges, etc.

In some embodiments, the tool can detect the tilt using a camera, visual information, gyroscope, or 3-axis accelerometer. The tool can include a camera 10 (also illustrated in FIG. 8A), or other sensor. Camera 10 can include one or more component or functionality of camera 682. The camera 10 can determine a shift in a captured image corresponding to a tilt resulting from the base lifting. The camera 10 can take a first picture or image before the tool brings the tool tip 24 into contact with the working surface 2, and then take a second image when the tool tip contacts the working surface. The camera 10 can repeatedly take images based on a time interval (e.g., every 1 second, 2 seconds, 3 seconds, 0.5 seconds, or 5 seconds) and compare a first image with a subsequent image to identify a tilt. The camera 10 can take a burst of images and then compare the images with one another to detect when the tool tip contacted the surface to cause the tilt. In some cases, each image in the burst of images can be associated with a time stamp. Each of the images can further be associated with, tagged with, or otherwise correspond to a position of the tool tip. The system can determine which image of the burst of images first indicates a tilt (e.g., an object in the image taken by camera 10 may appear closer when the tool 1000 is tilted towards the rear of the tool when the tool tip comes into contact with the material 2). In some cases, the system 1000 can determine a difference or misalignment in pixels between a first image and a subsequent image. Responsive to detecting the misalignment in the pixels, the system 1000 can determine that the tool tip contacted the material 2 at the timestamp corresponding to the subsequent or second image having the misaligned pixels relative to a first image or previous image. The camera can compare the first image with the second image to identify a tilt or variation between the two images.

The sensor 10 can include an image sensor or camera. The parameter can include a pixel. The pixel can have a location in the image. The system 1000 can capture (e.g., via the image sensor) a first image comprising a pixel with a first value (e.g., binary value, 256-bit value, red, green blue value, grayscale value, brightness value, or numerical value). The system 1000 can capture a second image comprising a second value of the pixel. The second value can be for the same pixel as the first value. The pixel can be a location in the image. The system 1000 can comparing the first image comprising the first value with the second image comprising the second value to identify the difference between the first value and the second value. The system can compare one or more pixels in the first image with one or more pixels in the second image to detect a difference. The system can compare the two captured images to determine that they are misaligned. The images may be misaligned due to the base being tilted in an angle, which may cause the camera to capture the second image at a different angle or from a different perspective as compared to the first image. Thus, the system can attribute the misalignment to the tool tip 24 contacting the surface of the working material and tilting the base.

The tool can determine the proximity of the tool tip 24 to the working surface 2 using a capacitive sensor 10 or an electromagnetic sensor 10. For example, the electromagnetic sensor 10 can sense or detect a change in inductance of a sensing coil in proximity to the tool tip 24 or working member 24 that includes metal by sensing eddy currents induced in the metal.

In some cases, the tool 1000 can include an accelerometer. For example, sensor 23 or sensor 10 can include an accelerometer, such as a 3-axis accelerometer or gyroscope. The accelerometer can indicate the tilt responsive to a motion or sudden motion caused by the base lifting. For example, the accelerometer can determine a first value indicating the acceleration of the base of the tool when the tool tip is not in contact with the surface. The first value can be zero, for example, because the base may be resting on the working surface. The accelerometer can determine the second value when the tool tip touches or contacts the surface. The second value or second acceleration value can indicate an acceleration of the base, an impact, a movement, a force or other displacement of the base caused by the tool tip contacting the working surface and moving the base that is mechanically connected to the tool tip. The computing device can compare the first value with the second value to identify the acceleration of the base of the tool based on the working member contacting the working surface. In some cases, the computing device can determine that the first value and the second value are not equal or substantially equal (e.g., within 1%, 2%, or 5%), and determine the tool tip contacted the working surface based on there being a difference in acceleration.

The tool can determine or detect additional information about the tool including tip or working member position, diameter, or tool geometry. Determining the geometry of the tool can include or refer to determining the diameter of the cutting tool. The tool geometry information can be used to automatically determine a length of a cutting flute of the working member and an angle of the cutter (e.g. a V carving bit or helix angle). For example, the tool can include cameras 10 or a break-beam sensor 10 (e.g. laser break beam sensor, infrared break beam sensor, photoelectric sensor, or optical sensor) proximate to the tool tip 24. The working member 24 can be dropped into the line of action of the sensors 10 and the tool can detect the position of the working member 24 when the working member 24 breaks the beam formed by sensors 10. In some cases, the axis of the beam can be pre-calibrated relative to the coordinate frame of the tool.

In some cases, the system can include one or more vision cameras 10 aimed at the tool tip 24 or tool member 1 to determine the position of the working member 1 or tool tip 24. The vision camera 10 can be pre-calibrated to the tool coordinate frame to detect the tool tip 24. In some cases, the vision camera can include a linear charge coupled device (CCD) sensor or other image sensor. A linear CCD sensor may use less processing than a vision camera to detect the tool tip.

The system 1000 can measure the diameter of the working member 1 or tool tip 24. The tool can shift the tool tip 24 around while measuring or determining the position of the tool tip. By shifting the tool tip, the tool can use a single break-beam sensor 10 to detect tool diameter by passing the tool left-to-right through the sensor 10. The lateral motion of the tool can cause a first break and then un-obstruct the beam to provide a measure of the tool diameter. Since router bits can have helical flutes, the tool can perform multiple measurements along the length of the tool to determine the diameter. The tool can determine the diameter using eddy currents or capacitive sensing with a one-dimensional sensor to gather multi-dimensional information about the tool geometry by correlating the sensor data to the tool position. The tool can determine additional information about the tool tip 24 such as tip angle in the case of a v-cutting bit. Furthermore, the tool can include a vision camera 10 to detect geometric properties of the tool.

The system 1000 can include or be configured with a hybrid positioning system to position the working member of the tool. For example, the system can include a stage. The system can include a skid pad proximate to the stage to facilitate moving the stage. The system can include at least one motor adapted to move the stage. The system can included at least one motor controller that controls the at least one motor. The system can include a computing device or a processor in combination with one or more software applications for processing data and providing information to the at least one motor controller. The system can include a first sensor configured to capture first information of a surface of a material to build a map of the surface. The first information can include an image of the surface. The system can include a second sensor communicatively coupled with the processor. The second sensor can capture second information of the surface used to determine at least one of a location of the working member and an orientation of the working member relative to the surface. The computing device or processor can build the map of the surface using the first information captured by the first sensor. The computing device or processor can receive a design corresponding to the map of the surface built using the first information. The processor can display the design overlaid on the map via a display screen. The system can receive, via the second sensor, the second information of the surface. The system can determine, based on the second information of the surface and based on the map, at least one of the location of the working member and the orientation of the working member relative to the surface. The system can display the location of the working member overlaid on the map via the display screen. The system can determine, based on the design registered on the map and at least one of the location and the orientation, a desired location for the working member. The system can provide motor control information to control the at least one motor to move the stage and the working member to the desired location while the tool is advanced in a first direction that is within a selected range substantially adjacent to an outline of the design. The system can automatically realign the tool to a boundary edge of the design in a second direction as the tool is advanced in the first direction.

For example, the system 1000 can use the determined z-axis position of the working member to provide, based at least in part on the z-axis position of the working member, motor control information to control the one or more motors to move the working member from a first location to a second location. The motor control information can include one or more of x-axis information, y-axis information, or z-axis information. The tool can be advanced in a direction that is within a range adjacent to a predetermined path for the working member of the tool.

In some cases, the system 1000 can receive first information from the first sensor and determine, based on first information of the surface of the material, at least one of a first location (e.g., x-y coordinates, or x-y-z coordinates) of the working member of the tool and an orientation of the working member relative to the surface using a map of the surface. The system can indicate, via a display screen of the tool, the first location of the working member of the tool relative to the map of the surface. The system can retrieve a design corresponding to the map of the surface to identify a path for the working member of the tool. The system can compare the first location of the working member of the tool with the design to determine a second location for the working member of the tool corresponding to the path for the working member of the tool. The system can provide, based on at least one of the second location and the orientation, motor control information to control the at least one motor to move the stage and the working member to the second location. The tool can be advanced in a direction that is within a range adjacent to the path for the working member of the tool.

The system can perform a constant speed technique to provide the motor control information to control the at least one motor to move the stage and the working member to a plurality of subsequent locations while the tool is advanced in a corresponding plurality of subsequent directions. The system can automatically realign the tool to a boundary edge of the design in a third direction as the tool is advanced in a fourth direction. The system can display a target range window rendering an illustration of a point of reference of the tool, an intended cut path, and a desired tool movement path. The intended cut path can indicate a position in an x-y coordinates frame as well as z-axis depth.

The sensor can receive or capture a live feed of image data. The system can receive the live feed of image data captured by the sensor, and use the live feed image data to compare a previous position (e.g., x-y coordinates, or x-y-z coordinates) on the design and a preferred next position (e.g., x-y coordinates, or x-y-z coordinates) on the design to automatically realign a position of the tool.

While FIGS. 10A-10B illustrate determining the position of a rotating cutting tool 24 relative to the work surface 2, the method can apply to plotting pens, vinyl cutting knives, pipette tips, vacuum nozzles for pick and place machines, or any other system to determine a zero position of a working member 24 relative to a working material 2.

Figure 10C:
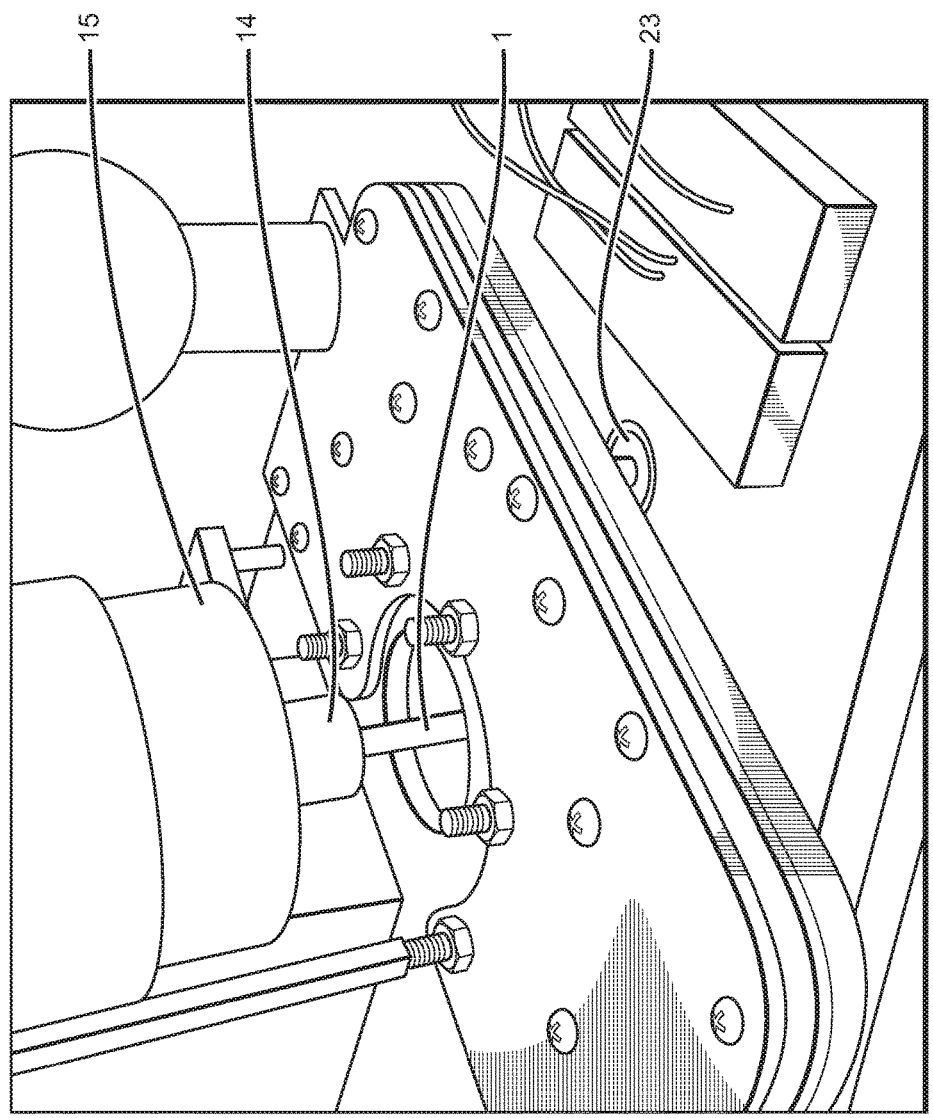
FIGS. 10C-10D are an illustrative example of an embodiment of a force sensor positioned on an apparatus for determining a location of a tool tip that may be employed to implement various elements of the systems, apparatus, and the methods disclosed herein, in accordance with an embodiment.

FIG. 10C illustrates a force sensor 23 adjacent to a pad in accordance with an embodiment. The force sensor 23 may be temporarily placed there to perform a calibration procedure to determine the zero position. The force sensor 23 may be removed after completion of the calibration procedure.

Figure 10D:
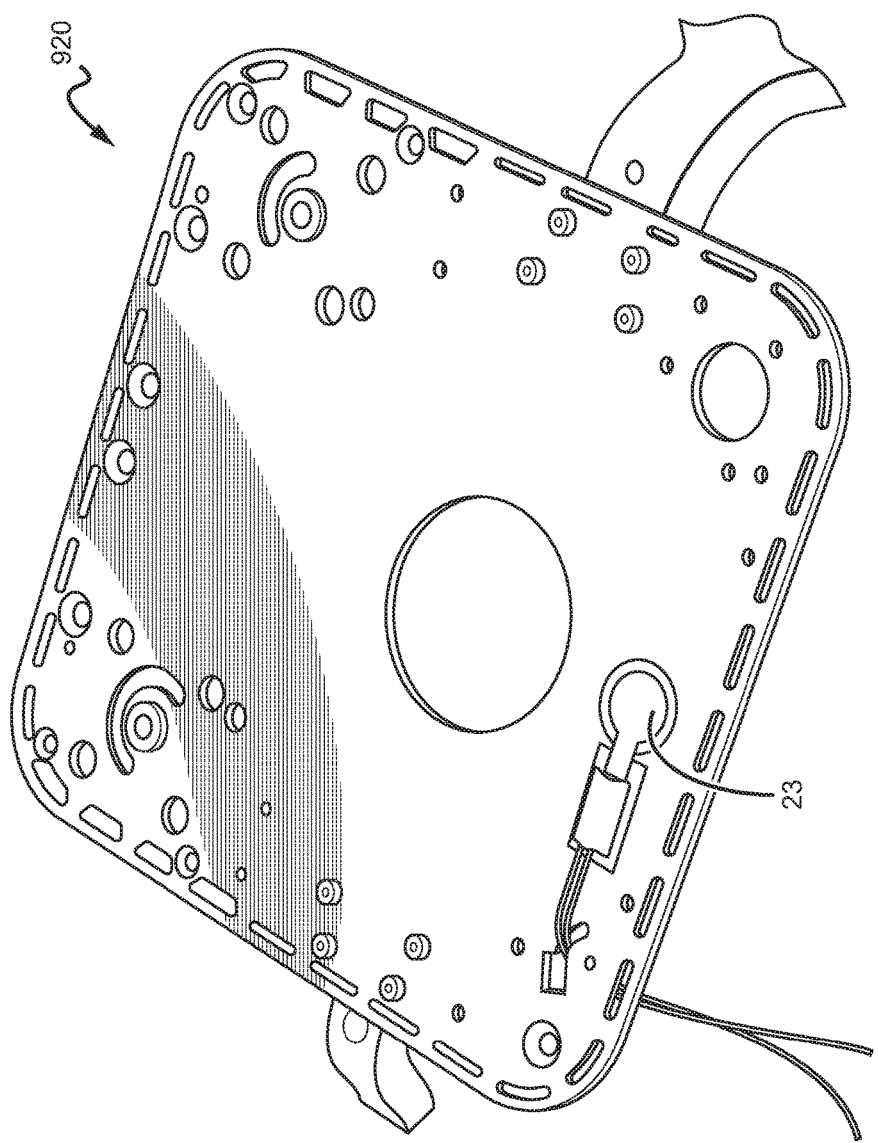

FIG. 10D illustrates a force sensor 23 positioned or placed on the top of the base plate 920. The one or more force sensors 23 can be positioned anywhere on the tool 1000 such that the force sensor 23 can detect a change in force corresponding to the tool tip 24 touching the surface of the material 2. The change in force may be a reduction in detected force because some of the force is being transferred via the tool tip 24 to the material rather than through the force sensor 23 onto the material.

Figure 11A:
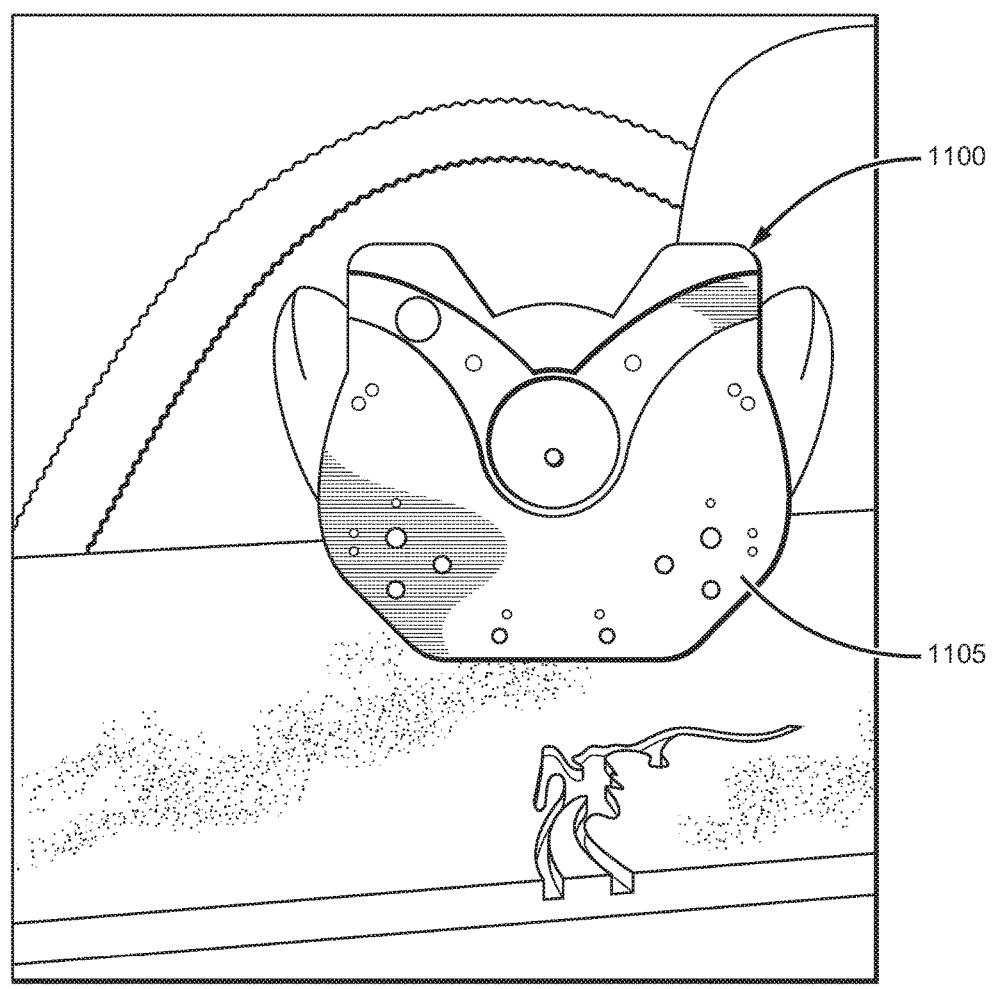
FIGS. 11A-11B are an illustrative example of directing or extracting dust particles using various elements of the systems, apparatus, and the methods disclosed herein, in accordance with an embodiment.
Figure 11B:
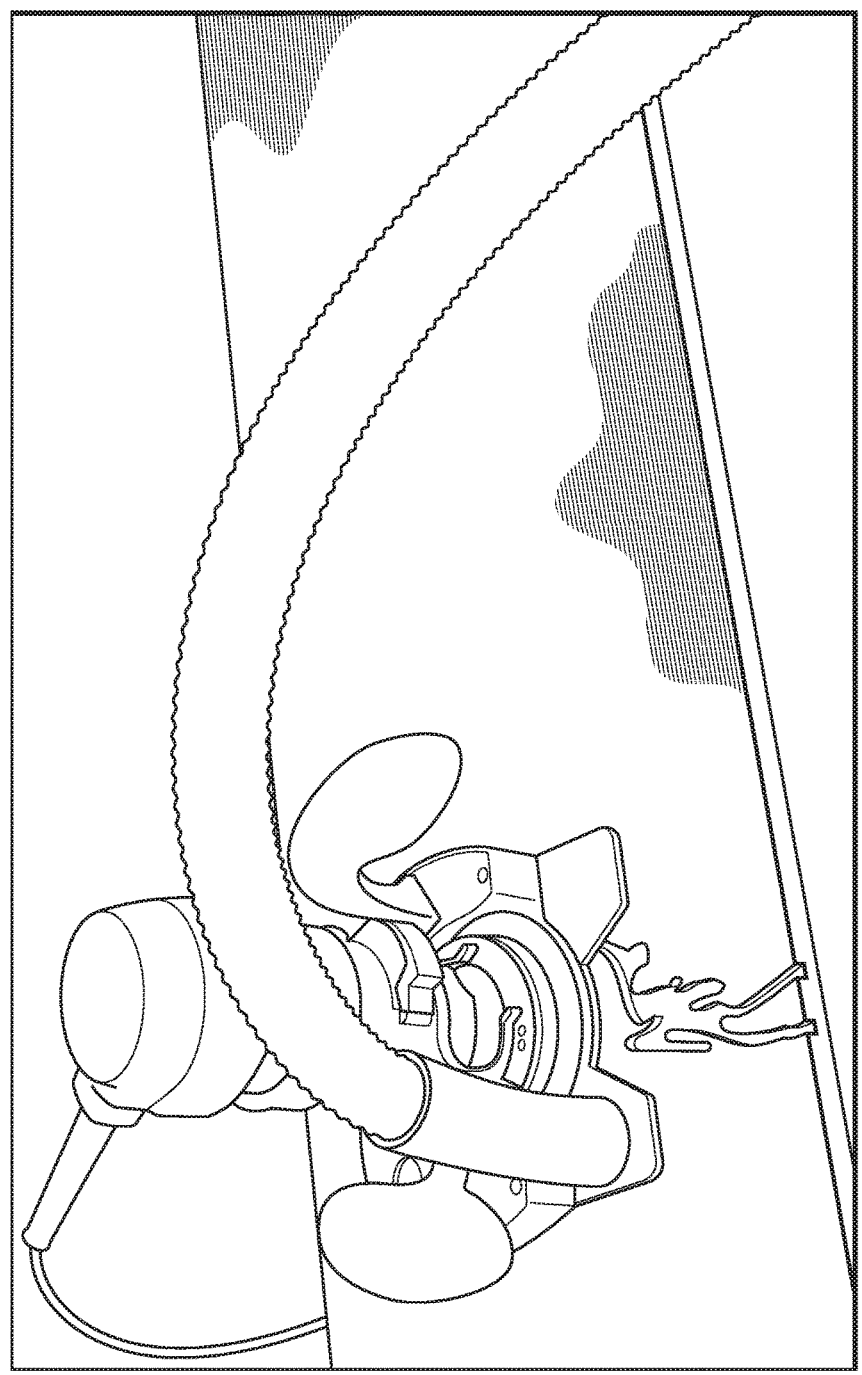

FIGS. 11A and 11B illustrate a tool 1100 with a base plate 1105. The tool 1100 may include one or more component of the tool 1000, and base plate 1105 may correspond to base plate 910. FIG. 11A illustrates the dust or particles that stay on the material when the dust extraction and direction techniques are not being used, while FIG. 11B illustrates how the dust direction and extraction techniques described herein can remove the dust from the material (e.g., via airflow generated by a fan and/or vacuum source traveling through a channel away from the rear of the tool or extracted via a vacuum port). The tool 1100 can moving, via a cavity or channel of a base plate of the tool, particles of material removed from the working surface by the working member. The tool 1100 can evacuate, by a vacuum, the particles via the cavity away from the working member.

Figure 12:
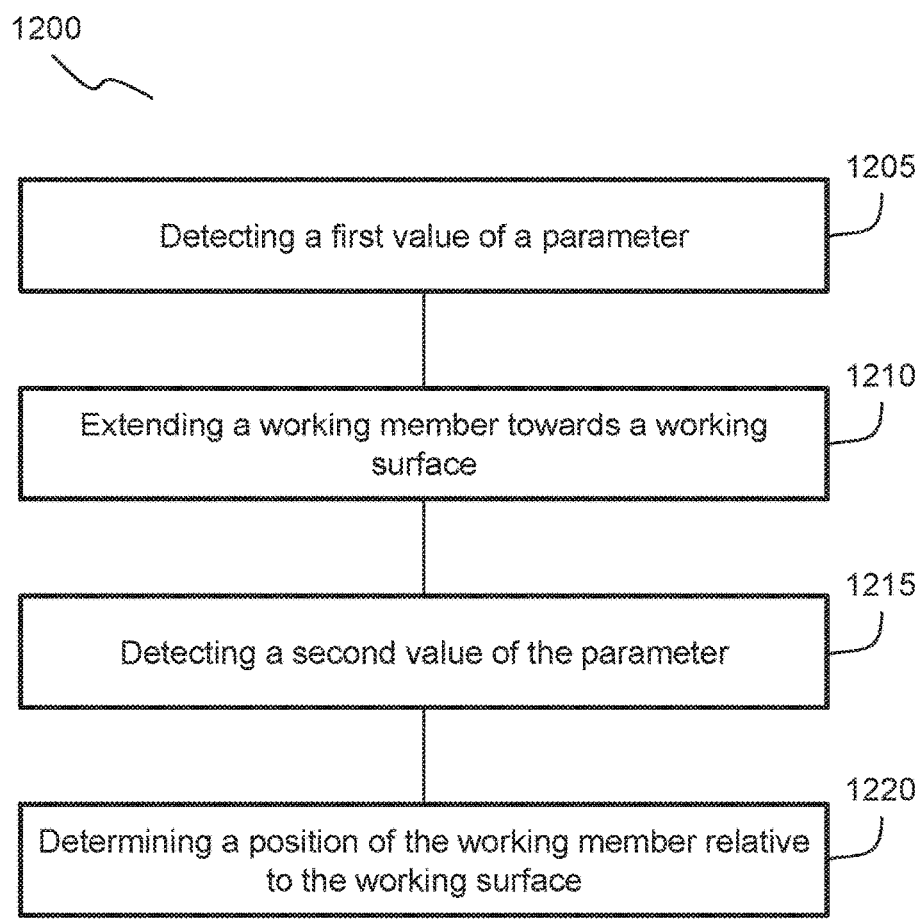
FIG. 12 is an illustrative example of a block diagram depicting a method of positioning a working member of a tool, in accordance with an embodiment.
Figure 13:
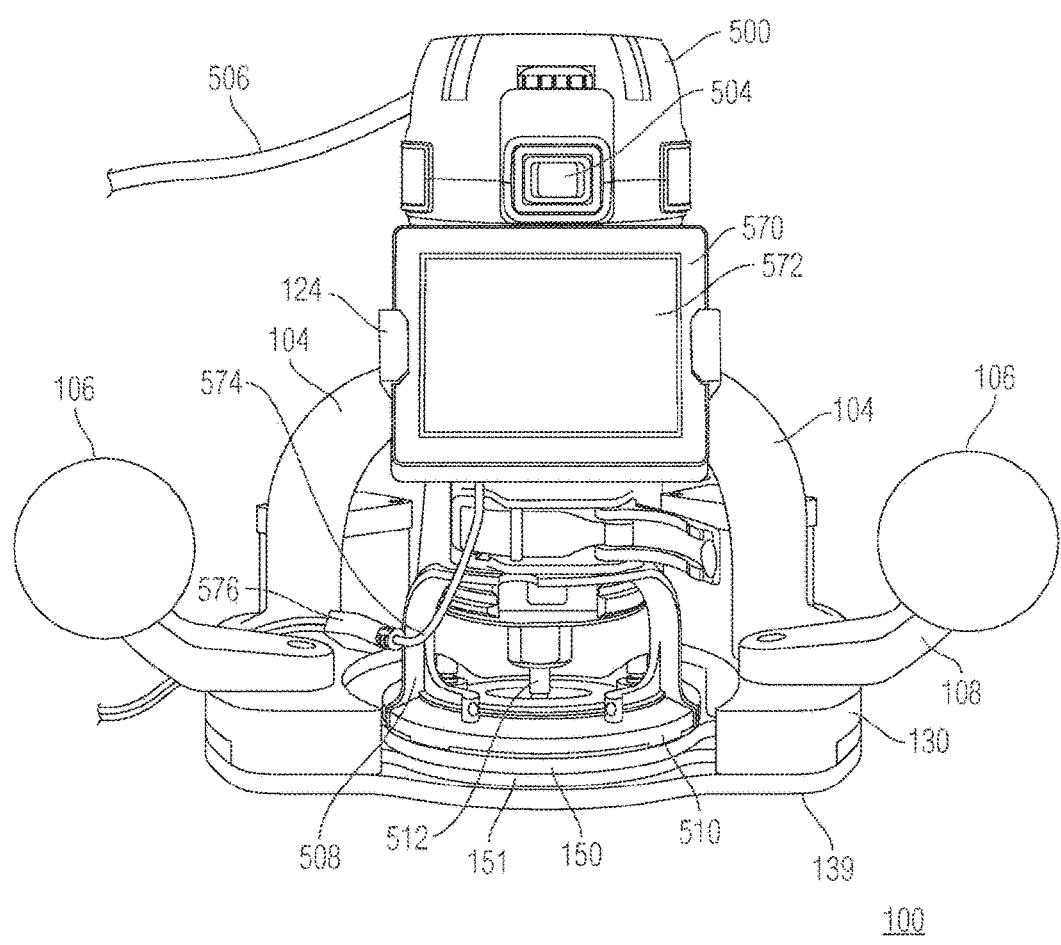
FIG. 13 depicts a front view of a tool in accordance with an embodiment.
Figure 14:
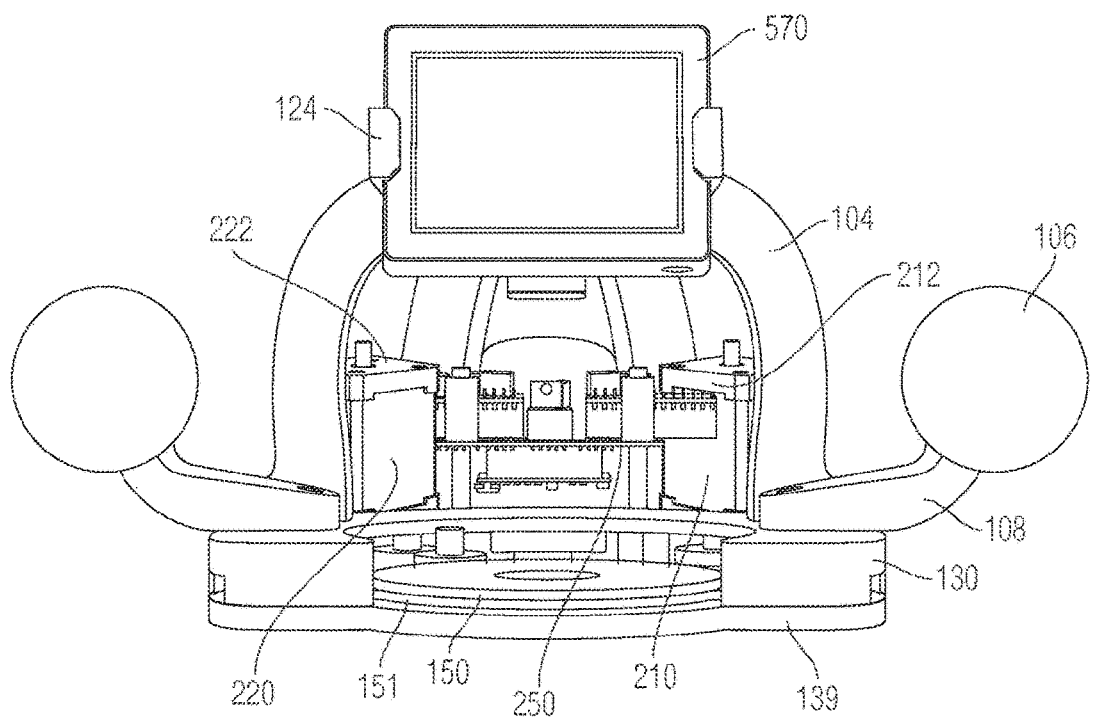
FIG. 14 depicts a front view of a tool without a working member attached in accordance with an embodiment.

FIG. 12 illustrates a block diagram of a method of calibrating position detection of a tool, in accordance with an embodiment. In brief overview, the method 1200 includes a tool detecting a first value of a parameter at 1205. At step 1210, the tool extends a working member towards a working surface. At 1210, the tool detects a second value of the parameter. At 1220, the tool determines a position of the working member relative to the working surface. The method 1200 can be performed by one or more component or module of one or more system depicted in FIGS. 1-11B.

Still referring to FIG. 12, and in further detail, the tool detects a first value of a parameter at 1205. The tool (e.g., via a sensor) can detect the first value of the parameter. The sensor can be communicatively coupled to a computing device comprising one or more processors. The parameter, or first value thereof, can indicate an amount of force exerted by a portion of a base of the tool on the working surface or towards the working surface. The tool can detect the first value of the parameter with the portion of the base of the tool in contact with the working surface. For example, the portion of the base can be resting or placed on the working surface or material. In some cases, the base can include a pad that is in contact with the working surface.

At step 1210, the tool extends a working member towards a working surface. The tool (e.g., via a motor controlled by the computing device) can extend the working member towards the working surface. When the working member contacts the working surface, the base can be at least partially in contact with the working surface. For example, the working member can contact the working surface and at least partially lift or tilt a portion of the base. The portion of the base may or may not be in contact with the surface depending on how much the tool tip in contact with the surface of the material lifts or tilts the base. In some cases, the base may still be in contact with the surface, but the amount of force exerted by the base on the working surface may be less. This lesser amount of force may correspond to the second value of the parameter.

At 1210, the tool detects a second value of the parameter. The tool (e.g., via the sensor) can detect when the working member contacts the working surface by identifying a second value of the parameter that is less than the first value of the parameter. The second value can be less than first value because the force exerted by the portion of the base can be less due to the tool tip distributing the force exerted by the base. The force can be distributed such that the tool tip exerts some of the force onto the material, or such that another portion of the base exerts greater force than a first portion of the base. For example, the tool tip can tilt the base such that a first portion of the base exerts less force than a second portion of the base. For example, the tool can detect the second value of the parameter with the portion of the base of the tool not in contact with the working surface responsive to the motor causing the working member to contact the working surface. The tool can determine the z-axis position of the working member relative to the working surface responsive to the working member tilting the base responsive to the working member contacting the working surface.

At 1220, the tool determines a position of the working member relative to the working surface. The tool (e.g., via the computing device) can determine a z-axis position or depth of the working member relative to the working surface responsive to a difference between the first value and the second value greater than a threshold. The tool can calibrate the position detection system of the tool based on these detected z-axis position. For example, the tool can set this position as a zero, initial or default position. The system can then determine the z-axis coordinate or position of the tool tip relative to the calibrated zero position. In some cases, the tool may not calibrate the detected surface as a zero position, but may record the absolute distance of the spindle. As the tool tip length can vary based on the type of working member or tool, the position of the tip of the spindle can be predetermined by the tool as it may not be interchangeable.

The form and structure of embodiments of the present disclosure for use with a cutting tool are provided and depicted in FIGS. 13-21. The embodiments depicted in FIGS. 13-21 provide a system or rig 100 which is configured for use with a router 500. The system 100 includes two support legs 104 which are attached to a base housing 130 on the lower end and terminate into a device mount 122 at the upper end. The device mount 122 includes left and right display clips 124 to clamp or lock the monitor or smart device 570 into the device mount 122. The device 570 includes a display screen 572 for the user to view the cutting path for that particular use. The base 130 also has left and right handles or grips 106 attached through handle support arms 108.

Figure 20:
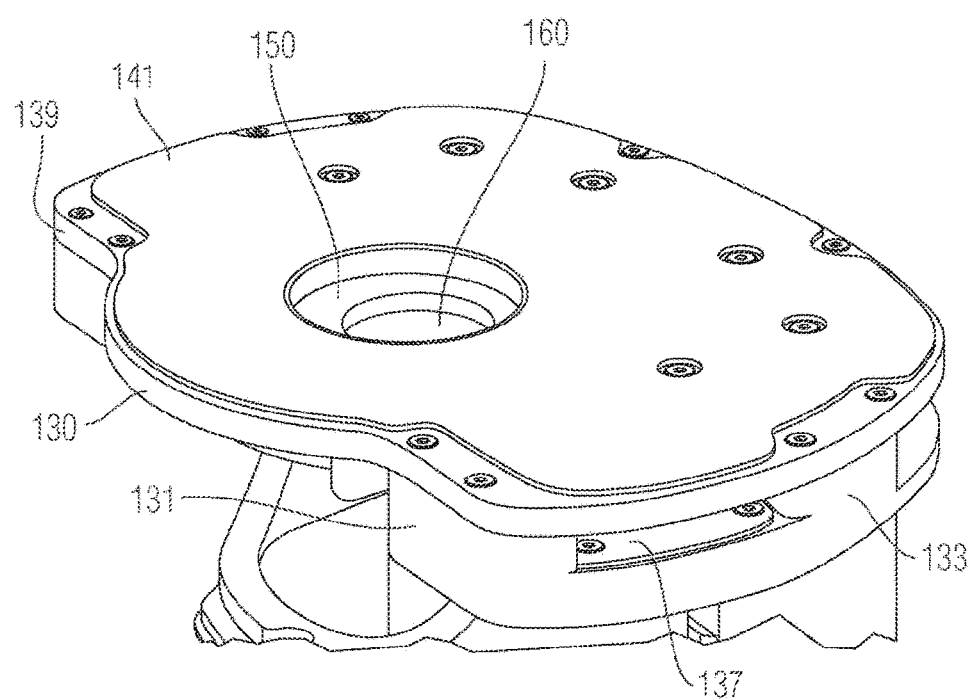
FIG. 20 provides a top view of a tool without a working member attached in accordance with an embodiment.

The lower end of the base 130 has a bottom plate 139 which encloses the stage 150 and a lower stage skid pad 151. The base 130 and bottom plate 139 are fastened to one another such as by machined screws. As seen in FIG. 20, the bottom plate 139 has a bottom skid pad 141 attached to the bottom. The bottom skid pad 141 is used to assist movement of the rig 100 along the surface of the material being worked on. The bottom skid pad 141 may be made of a high density polyethylene, Teflon, or other suitable material which is both durable and suited for sliding along the material.

Figure 21:
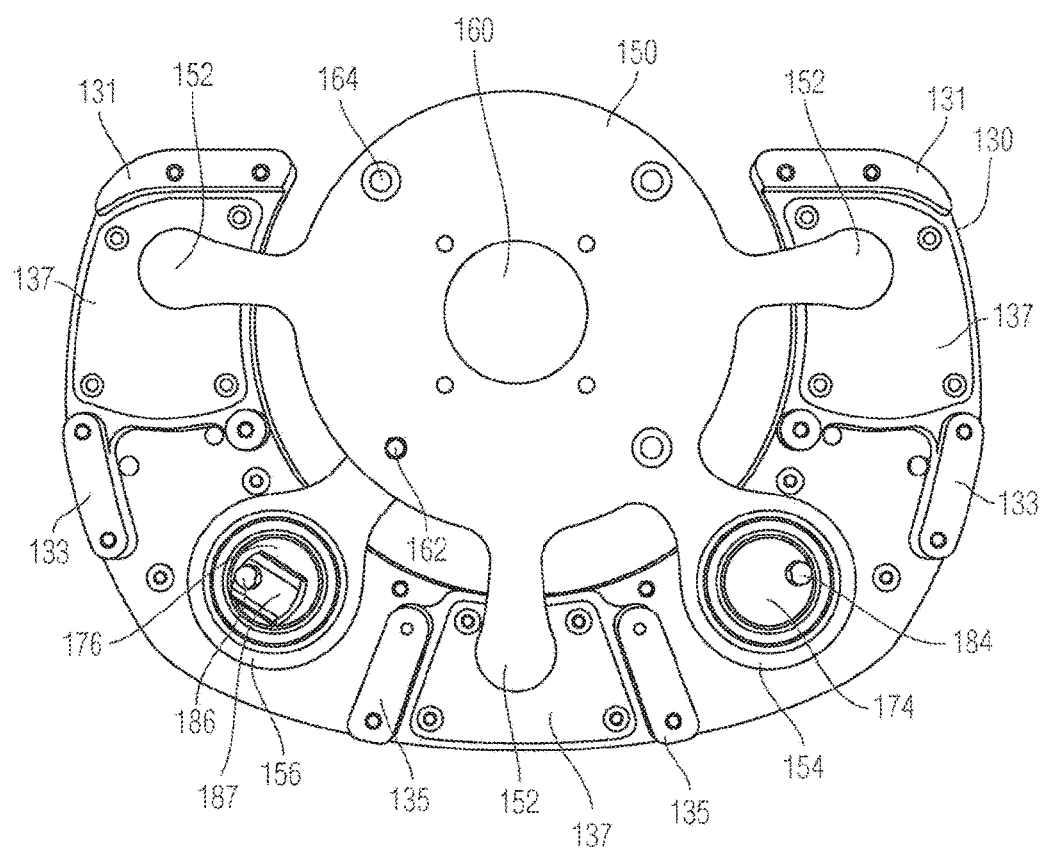
FIG. 21 provides a bottom view of the internal stage and pivot components of a tool in accordance with an embodiment.

The router 500 is added to the rig 100 by attaching the router base plate 510 to the stage 150. As seen in FIG. 21, the stage 150 has several tool attachment points 164 for attaching the router base 510 to the stage 150. The router base 510 has several router base support legs 508 which forms a cage around the router bit 512. The router 500 also has a power cord 506 and an on-off switch 504. The rig 100 may be implemented as a self-contained portable unit including an on-board source of power, such as a battery source.

The smart unit or monitor 570 can have an input cable 574 with a cable terminal or receptacle 576. If the device is a smart unit the CPU, software, and memory will be on the device itself. If the device 570 is simply a monitor then the cable 574 and receptacle 576 will connect to the CPU unit.

As shown in FIGS. 14-19, the system 100 can contain a stage motor 210 and a pivot motor 220. The stage motor 210 is used to control movement of the stage 150. The pivot motor 220 is used to control movement of the pivot arm 156 which pulls or pushes the stage 150 to convert the rotational motion of the motors 210, 220 into a relatively linear motion. The stage motor 210 and pivot motor 220 each have their own motor cap 212, 222 respectively.

The motors 210, 220 can be controlled by the stage motor driver 253 and the pivot motor driver 254 which are connected to the printed circuit board 250 and the microcontroller board 252. The microcontroller 252 processes low level instructions from the smart device or CPU unit (i.e. a laptop). The instructions would be instructions to move the motors 210, 220 to set positions (i.e. positions 150, 125) into the correct step commands to drive the motors to those positions. The motors' orientations are tracked by homing them to a zero position once and then tracking all subsequent steps taken. Alternatively, the system could use rotary encoders to keep track of the state of the motor shafts' orientations. The motors 210, 220 and the motor drivers 253, 254 are powered by connecting the power plug receptacle 255 into a power source.

Figure 15:
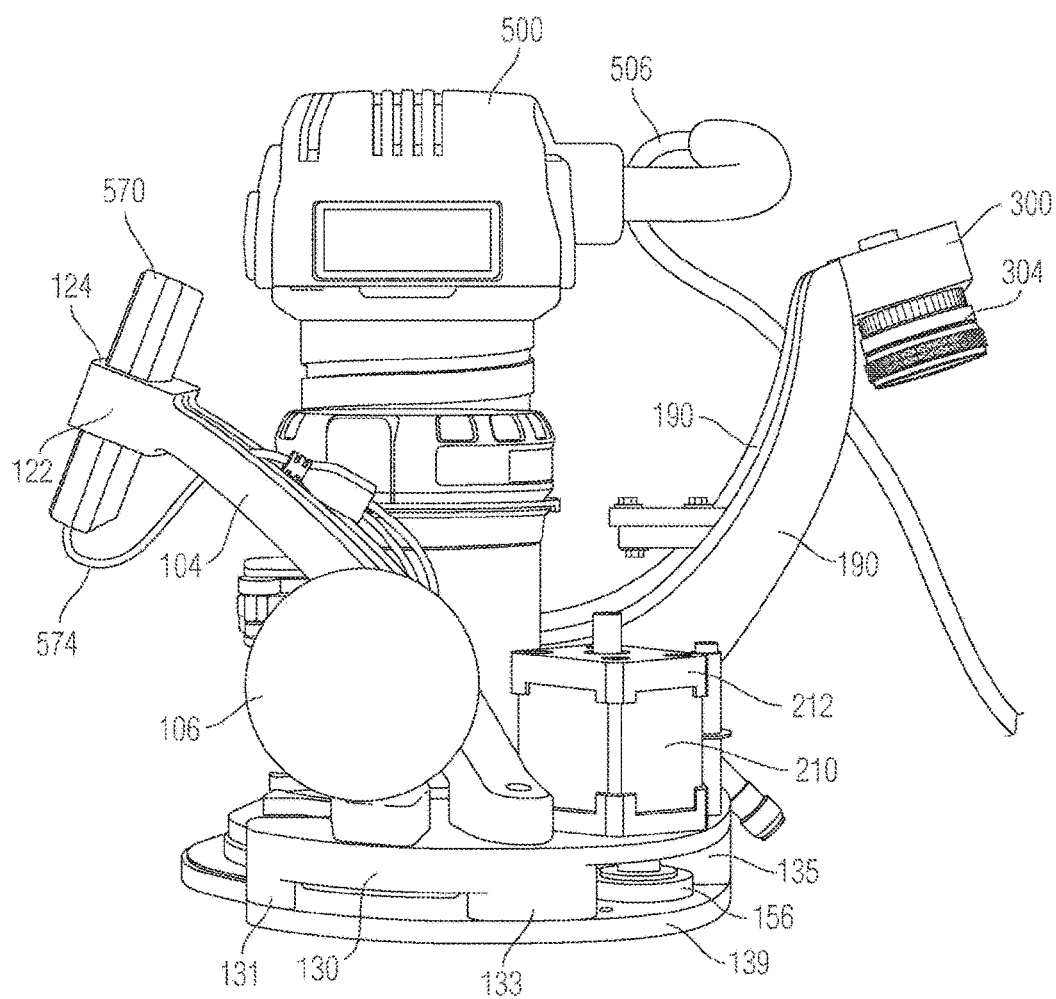
FIG. 15 provides a side view of a tool with a working member attached in accordance with an embodiment.
Figure 16:
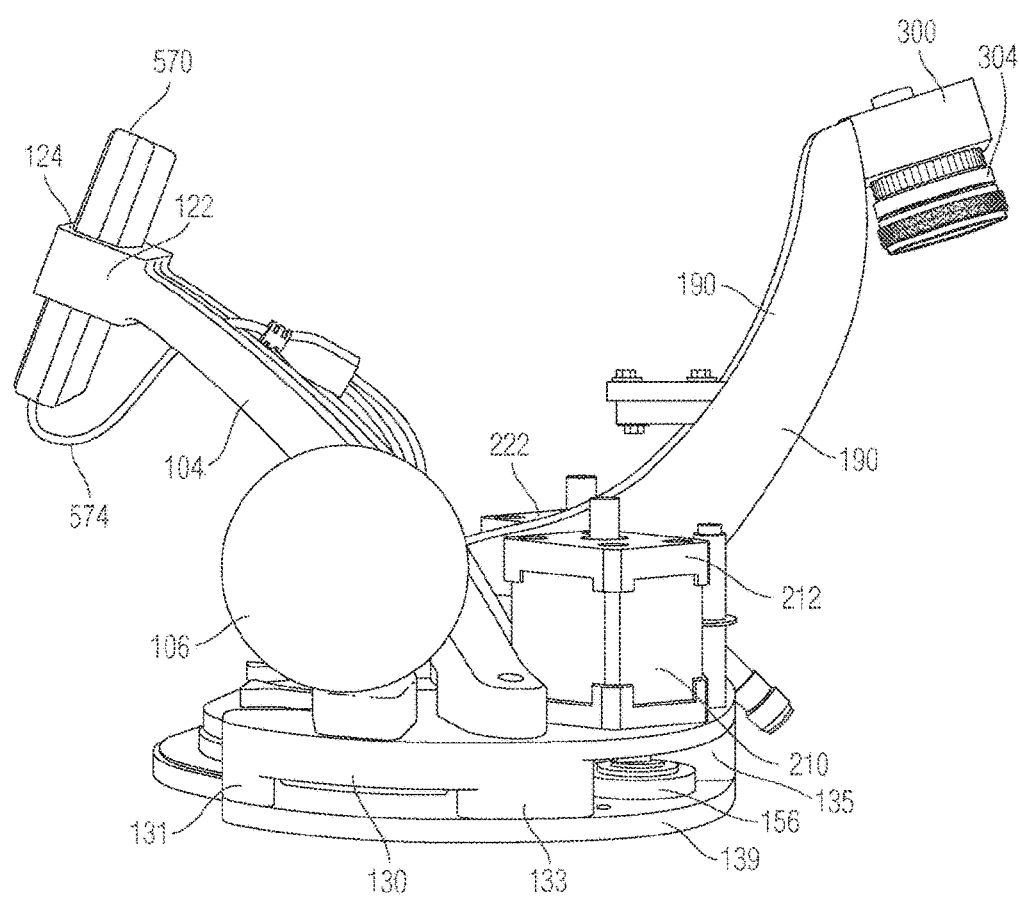
FIG. 16 provides a side view of a tool without a working member attached in accordance with an embodiment.
Figure 17:
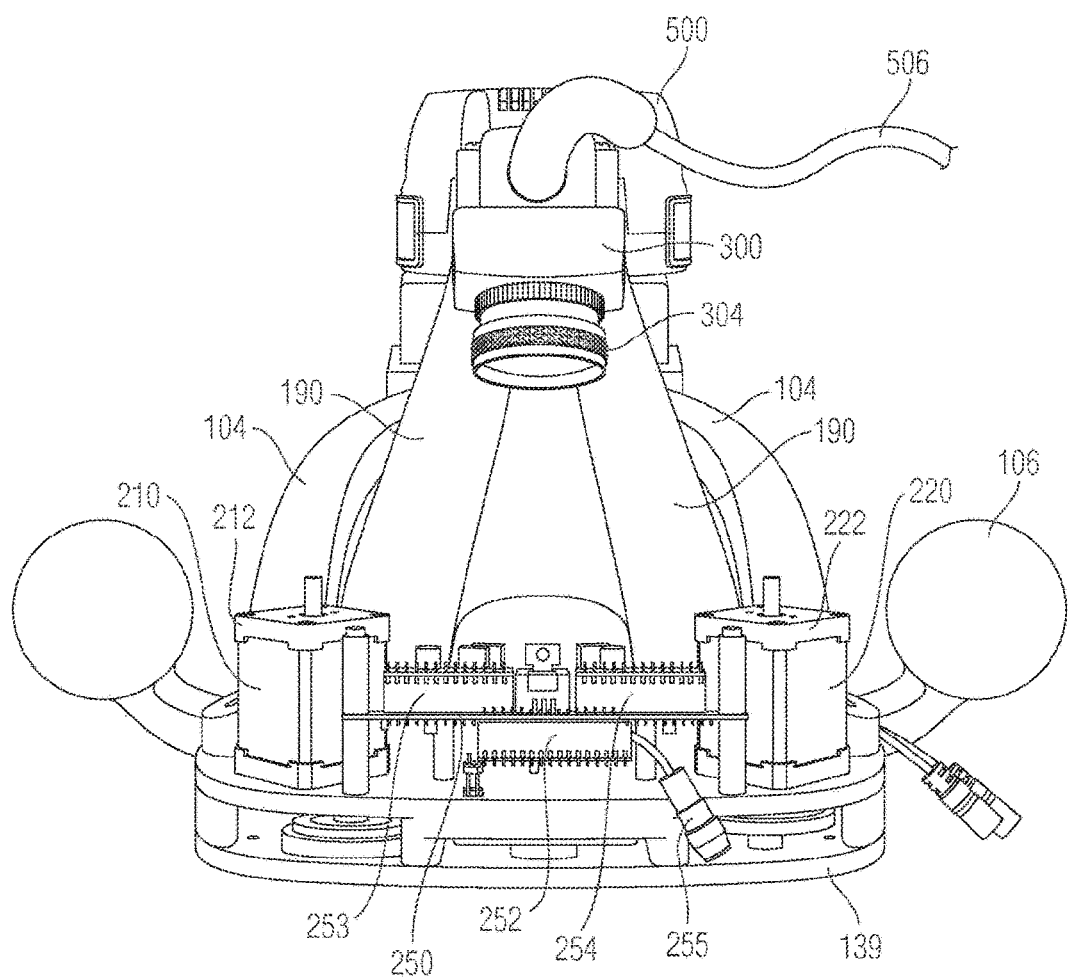
FIG. 17 provides a rear view of a tool with a working member attached in accordance with an embodiment.
Figure 18:
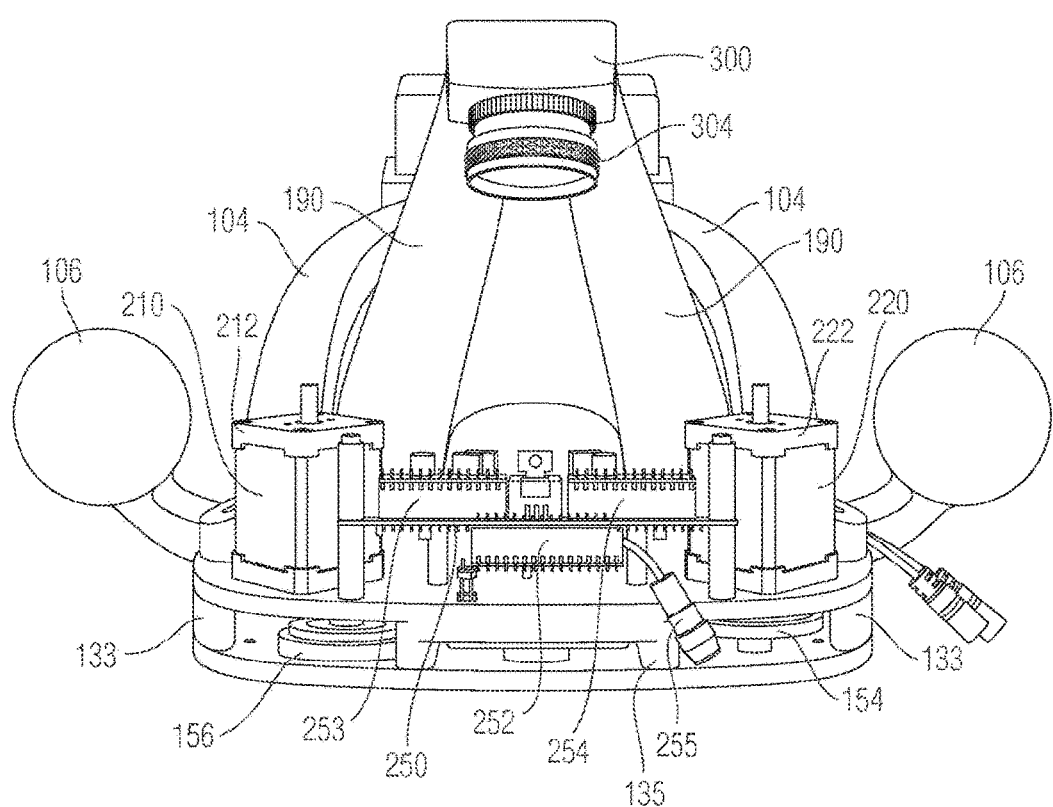
FIG. 18 provides a rear view of a tool without a working member attached in accordance with an embodiment.
Figure 19:
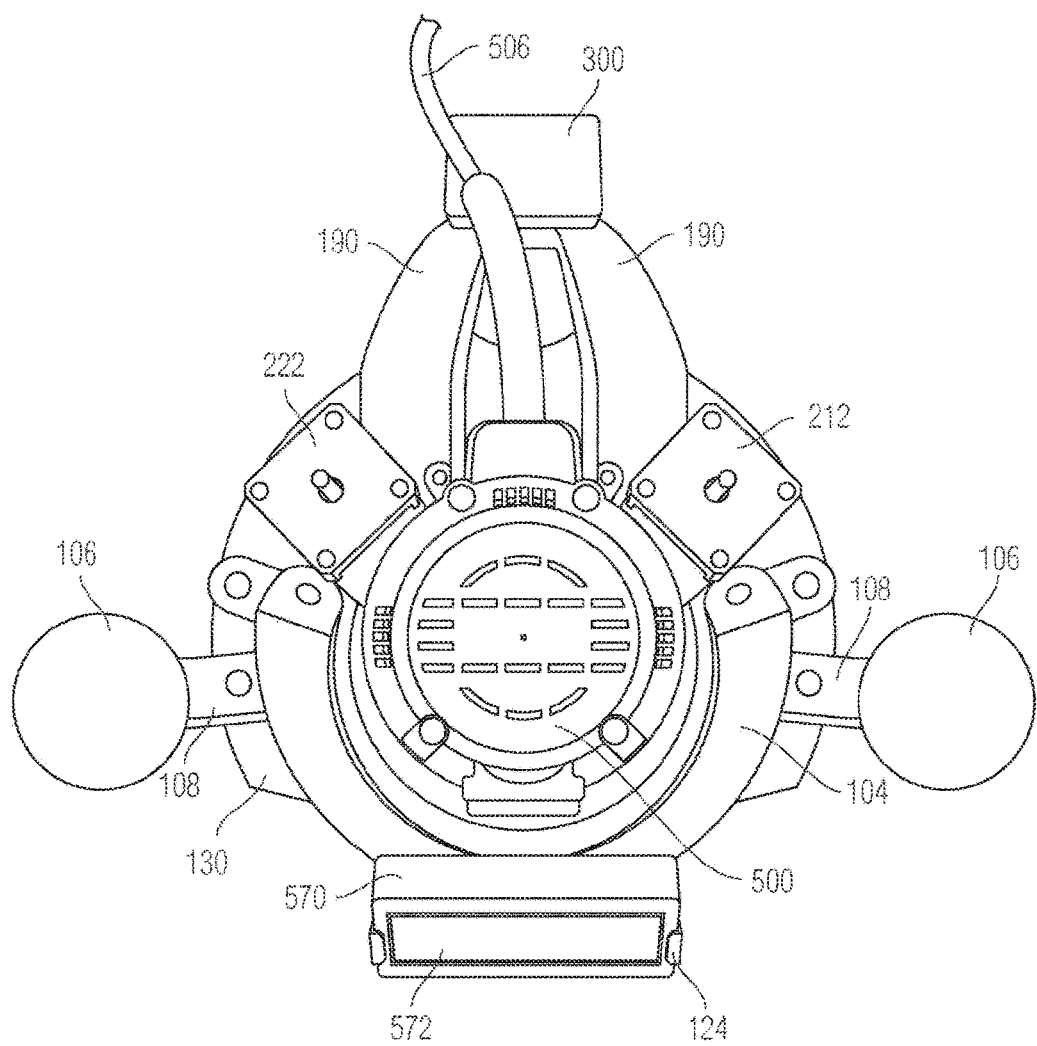
FIG. 19 provides a top view of a tool with a working member attached in accordance with an embodiment.

As shown FIGS. 15-16, the back of the rig 100 includes a camera support 190. The camera support 190 may be one or more support members which are connected to the upper stage housing 130 and terminate at the top of the rig 100 where a camera 300 is mounted. The camera 300 and a lens 304 are placed in a relatively downward position to capture images of the material being worked and the surrounding areas thereof.

The eccentrics can be used to convert the rotational motion of the motors into linear motion. Eccentrics are circular disks rotating around an off-center shaft. As the shafts are rotated, they produce linear motion in the collars wrapped around the eccentric disks. Eccentrics are able to maintain the same low backlash accuracy of a precision linear stage while being less expensive. A linear displacement range of ½" is well within the capabilities of an eccentric. The tool can include two eccentrics mounted to the frame and connected to a stage that can slide on its base. The eccentrics can be rotated by stepper motors, and by rotating them the stage can be moved within the frame. The size and shape of the various eccentrics can be varied to provide larger or smaller relative movement of the tool 699 relative to the workspace.

To constrain the stage, one eccentric can be connected directly to the stage by a ball bearing coupling, while the other is connected by a coupling and a hinge. This linkage design results in a nonlinear relationship between eccentric orientation and stage position. Near the center of the range moderate rotation of an eccentric produces moderate motion of the stage. In contrast, near the edge of the range much larger rotations are necessary to move the stage a fixed amount. In the present invention, stage displacement is limited to approximately 95% of the maximum range to avoid positions with extreme nonlinearity. This linkage design also permits back driving, in that forces acting on the tool can cause the cams to rotate away from their target positions. However, the present invention makes use of adequately powered motors which have sufficient power to preclude back driving even in the presence of significant forces.

As shown in FIG. 21, the upper stage housing 130 can be a one piece unit with spacers 131, 133, 135 machined or formed into the upper stage housing 130. The spacers 131, 133, 135 provide the required space for the stage 150 and pivot arm 156 to move. The front spacers 131, side spacers 133, and rear spacers 135 need not be formed as one unit. Instead, the front spacers 131, side spacers 133, and rear spacers 135 could be separate pieces attached to the upper stage housing 130. The upper stage housing 130 also accommodates several upper stage skid pads 137. The upper stage skid pads 137 allow the stage stabilizing arms 152 to move along the pads 137 with minimal friction.

The stage 150 is ideally made of a light but durable and strong material such as aluminum or some other alloy. The stage 150 is most likely machined to include one or more stabilizing arms 152, the stage eccentric arm member 154, tool attachment points 168, and an opening 160 where the tool extends through the stage 150. In addition, a pivot arm 156 is most likely machined from the same alloy or material as the stage 150.

In operation the stage motor 210 moves in response to rotation of the stage motor shaft 184. There is a stage eccentric cam member 174 attached to the stage motor shaft 184. When the stage motor shaft 184 rotates the stage eccentric cam 174 rotates and the cam design causes the stage arm member 154 connected to and surrounding the cam 174 to move the stage 150. A bearing ring may be used between the cam 174 and the stage arm member 154.

Additionally, when the pivot motor 220 moves the pivot motor shaft 186 rotates. There is a pivot eccentric cam member 176 attached to the pivot motor shaft 186. When the pivot motor shaft 186 rotates the pivot eccentric cam 176 rotates and the cam design causes the pivot arm member 154 connected to and surrounding the cam 176 to move the pivot arm 156 back and forth which causes the stage 150 to move relative to the pivot arm 156. A bearing ring may be used between the cam 176 and the pivot arm 156.

As the stage 150 and pivot arm 154 move, the stage stabilizing arms 152 move along the upper stage skid pads and the lower stage skid pad 151 (e.g., as in FIG. 13) to stabilize the stage 150 during movement. Further, the stage eccentric 174 and pivot eccentric 176 can include a boss. The boss gives the eccentric 174, 176 some extra material to house the set screw which clamps on the stage motor shaft 184 or pivot motor shaft 186, thus securely attaching it to the respective eccentric 174, 176. The pivot eccentric boss 187 is seen in FIG. 21. The stage eccentric boss is not shown in the figures as it is flipped relative to the pivot boss 187 because the stage 150 and the pivot arm 156 are operating on different planes.

Although various acts are described herein according to the exemplary method of this disclosure, it is to be understood that some of the acts described herein may be omitted, and others may be added without departing from the scope of this disclosure.

It will be recognized by those skilled in the art that changes or modifications may be made to the above described embodiments without departing from the broad concepts of the disclosure. It is understood therefore that the disclosure is not limited to the particular embodiments which are described, but is intended to cover all modifications and changes within the scope and spirit of the disclosure.

The systems described herein may provide multiple ones of any or each of those components and these components may be provided on either a standalone machine or, in some embodiments, on multiple machines in a distributed system. The systems and methods described herein may be implemented as a method, apparatus or article of manufacture using programming or engineering techniques to produce software, firmware, hardware, or any combination thereof. In addition, the systems and methods described herein may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs), hardware (e.g., integrated circuit chip, Field Programmable Gate Array (FPGA), Application Specific Integrated Circuit (ASIC)), electronic devices, a computer readable non-volatile storage unit (e.g., CD-ROM, floppy disk, hard disk drive). The article of manufacture may be accessible from a file server providing access to the computer-readable programs via a network transmission line, wireless transmission media, signals propagating through space, radio waves, or infrared signals. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for virtualizing audio hardware for one or more virtual machines, it will now become apparent to one of skill in the art that other embodiments incorporating the concepts of the disclosure may be used.

While various embodiments have been described and illustrated herein, those of ordinary skill in the art will readily envision a variety of other means or structures for performing the function or obtaining the results or one or more of the advantages described herein, and each of such variations or modifications is deemed to be within the scope of the embodiments described herein. More generally, those skilled in the art will readily appreciate that all parameters, dimensions, materials, and configurations described herein are meant to be exemplary and that the actual parameters, dimensions, materials, or configurations will depend upon the specific application or applications for which the teachings are used. Those skilled in the art will recognize, or be able to ascertain using no more than routine experimentation, equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, or method described herein. In addition, any combination of two or more such features, systems, articles, materials, kits, or methods, if such features, systems, articles, materials, kits, or methods are not mutually inconsistent, is included within the scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

The concept described herein may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments described herein. The computer readable medium or media can be transportable, such that the program or programs stored thereon can be loaded onto one or more different computers or other processors to implement various aspects and embodiments described herein.

The terms "program" or "software" are used herein in a generic sense to refer to any type of computer code or set of computer-executable instructions that can be employed to program a computer or other processor to implement various aspects of embodiments as discussed above. Additionally, according to one aspect, one or more computer programs that when executed perform methods or operations described herein need not reside on a single computer or processor, but may be distributed in a modular fashion amongst a number of different computers or processors to implement various aspects or embodiments described herein.

Computer-executable instructions may be in many forms, such as program modules, executed by one or more computers or other devices. Generally, program modules include routines, programs, objects, components, or data structures that perform particular tasks or implement particular abstract data types. Typically the functionality of the program modules may be combined or distributed as desired in various embodiments.

The data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. Any suitable mechanism may be used to establish a relationship between information in fields of a data structure, including through the use of pointers, tags or other mechanisms that establish relationship between data elements.

The concepts described herein may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

As used herein, the terms "light", "optical" and related terms should not but understood to refer solely to electromagnetic radiation in the visible spectrum, but instead generally refer to electromagnetic radiation in the ultraviolet (about 10 nm to 390 nm), visible (390 nm to 750 nm), near infrared (750 nm to 1400 nm), mid-infrared (1400 nm to 15,000 nm), and far infrared (15,000 nm to about 1 mm).

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all of the described terms.

In the claims, as well as in the specification above, all transitional phrases such as "comprising," "including," "carrying," "having," "containing," "involving," "holding," "composed of," and the like are to be understood to be open-ended, i.e., to mean including but not limited to.

What is claimed is:

1. A system to position a working member of a tool, comprising:
    a base coupled to the tool;
    a computing device comprising one or more processors;
    a sensor communicatively coupled to the computing device;
    a motor controlled by the computing device;
    the computing device configured to:
        identify, via the sensor, a first value of a parameter indicative of an amount of force exerted by a portion of the base towards a working surface;
        instruct the motor to extend the working member towards the working surface;

identify, via the sensor with the working member in contact with the working surface, a second value of the parameter;

compare the first value of the parameter with the second value of the parameter to identify a difference between the first value and the second value; and determine a z-axis position of the working member relative to the working surface based on the difference between the first value and the second value being greater than a threshold.

2. The system of claim 1, wherein
the computing device is configured to identify the first value of the parameter based on the portion of the base of the tool in contact with the working surface.

3. The system of claim 1, wherein
the computing device is configured to identify, via the sensor, the second value of the parameter based on the portion of the base of the tool not in contact with the working surface responsive to the motor causing the working member to contact the working surface.

4. The system of claim 1, wherein
the computing device is configured to determine the z-axis position responsive to the first value being greater than the second value.

5. The system of claim 1, wherein the parameter is based at least in part upon force measured by the sensor, and the second value is less than the first value.

6. The system of claim 1, wherein
the extending working member contacts the working surface to tilt the base of the tool, and
determining the z-axis position of the working member relative to the working surface is responsive to the working member tilting the base of the tool responsive to the working member contacting the working surface.

7. The system of claim 1, comprising:
the computing device configured to:
instruct the motor to retract the working member in contact with the working surface away from the working surface;
identify, via the sensor when the working member is not in contact with the working surface, a third value of the parameter; and
determine a second z-axis position of the working member relative to the working surface responsive to a second difference between the first value and the third value being less than a second threshold.

8. The system of claim 1, wherein the tool comprises a frame having a cavity configured to
move, away from the working member, particles of material removed from the working surface by the working member.

9. A method of positioning of a working member of a tool, comprising:
detecting, by a sensor communicatively coupled to a computing device comprising one or more processors, a first value of a parameter for a first vertical position of a base of the tool;
extending, by a motor controlled by the computing device, the working member towards the working surface;
detecting, by the sensor with the working member in contact with the working surface, a second value of the parameter indicating a second vertical position of the base of the tool;

comparing, by the computing device, the first value of the parameter with the second value of the parameter to determine a change in vertical position of the base of the tool; and determining, by the computing device, a z-axis position of the working member relative to the working surface based on the change in the vertical position of the base of the tool.

10. The method of claim 9, wherein
a portion of the base of the tool is in contact with the working surface when the first value of the parameter is detected.

11. The method of claim 9, wherein
a portion of the base of the tool is not in contact with the working surface when the second value of the parameter is detected, and the portion of the base of the tool is not in contact with the working surface responsive to the motor causing the working member to contact the working surface.

12. The method of claim 9, wherein the parameter is based at least in part upon force measured by the sensor,
and the z-axis position is further based on the first value being greater than the second value.

13. The method of claim 9, wherein the sensor comprises an image sensor and the parameter comprises a pixel, the method comprising:
capturing, by the image sensor, a first image comprising the first value of the parameter;
capturing, by the image sensor, a second image comprising the second value of the parameter; and
wherein comparing the first value with the second value further comprises comparing, by the computing device, the first image comprising the first value with the second image comprising the second value to identify the difference between the first value and the second value.

14. The method of claim 9, wherein the sensor comprises an accelerometer, detecting the first value further comprises determining, by the accelerometer, the first value, detecting the second value further comprises determining, by the accelerometer, the second value, and comparing the first value with the second value further comprises comparing, by the computing device, the first value with the second value to identify an acceleration of the base of the tool based on the working member contacting the working surface.

15. The method of claim 9, wherein
determining the z-axis position is responsive to the working member tilting the base responsive to the working member contacting the working surface.

16. The method of claim 9, comprising:
retracting, by the motor controlled by the computing device, the working member in contact with the working surface away from the working surface;
detecting, by the sensor upon the working member not being in contact with the working surface, a third value of the parameter, the third value of the parameter being greater than the second value of the parameter; and
determining, by the computing device, a second z-axis position of the working member relative to the working surface responsive to a second difference between the first value and the third value being less than a threshold.

17. The method of claim 9, comprising:
extending, by the motor, the working member towards a surface supporting the working surface, the base of the tool in contact with the working surface;

detecting, by the sensor responsive to the working member contacting the surface supporting the working surface, a third value of the parameter; and determining, by the computing device, a thickness of the working surface responsive to a second difference between the first value and the third value being greater than a threshold.

18. The method of claim 9, comprising:

determining, by the computing device, a plurality of location points based on the working member of the tool contacting the working surface, each of the plurality of location points having an x-axis coordinate, a y-axis coordinate, and a z-axis coordinate; and generating, by the computing device, a three dimensional map of the working surface using the plurality of location points.

19. The method of claim 18, comprising:

determining, by a second sensor of the tool, the x-axis coordinate and the y-axis coordinate of each of the plurality of location points using a fiducial marker placed on the working surface.

20. The method of claim 9, comprising:

moving, via a cavity of the tool, particles of material removed from the working surface by the working member; and evacuating, by a vacuum, the particles via the cavity away from the working member.

* * * * *